(12) United States Patent
Morgenthau et al.

(10) Patent No.: US 10,769,562 B2
(45) Date of Patent: Sep. 8, 2020

(54) SENSOR BASED SYSTEM AND METHOD FOR AUTHORIZING OPERATION OF WORKSITE EQUIPMENT USING A LOCALLY STORED ACCESS CONTROL LIST

(71) Applicant: Triax Technologies, Inc., Norwalk, CT (US)

(72) Inventors: Justin J. Morgenthau, South Windsor, CT (US); Benjamin Tyson Sweet, Marlborough, CT (US); Gregory Mathias Probert, Plantsville, CT (US)

(73) Assignee: Triax Technologies, Inc., Norwalk, CT (US)

( * ) Notice: Subject to any disclaimer, the term of this patent is extended or adjusted under 35 U.S.C. 154(b) by 0 days.

(21) Appl. No.: 15/803,719

(22) Filed: Nov. 3, 2017

(65) Prior Publication Data

US 2018/0121861 A1    May 3, 2018

Related U.S. Application Data

(63) Continuation-in-part of application No. 15/419,735, filed on Jan. 30, 2017.
(Continued)

(51) Int. Cl.
*H04W 12/08* (2009.01)
*H04W 12/00* (2009.01)
(Continued)

(52) U.S. Cl.
CPC ... *G06Q 10/063114* (2013.01); *G08B 21/043* (2013.01); *H04W 4/025* (2013.01); *G08B 7/06* (2013.01); *H04W 4/70* (2018.02)

(58) Field of Classification Search
CPC .......... G06Q 50/08; G06Q 10/063114; G06Q 10/0833; G08B 13/2462; G08B 7/06; G08B 21/043; H04W 4/70; H04W 4/025
See application file for complete search history.

(56) References Cited

U.S. PATENT DOCUMENTS

| 4,912,457 A | * | 3/1990 | Ladd | ................. G09F 25/00 |
| | | | | 340/286.01 |
| 5,045,839 A | | 9/1991 | Ellis et al. | |
| (Continued) | | | | |

FOREIGN PATENT DOCUMENTS

GB          2462590 A  *  2/2010  ............. G06B 21/02

OTHER PUBLICATIONS

Bandyopadhyay, S. et al., Wireless Tracking and Sensing Systems for Mine Safety, Security and Productivity Management, Management Information Systems Group of Indian Institute of Management, Calcutta, 2014, pp. 1-10. (Year: 2014).*

(Continued)

*Primary Examiner* — Scott L Jarrett
(74) *Attorney, Agent, or Firm* — Wolf, Greenfield & Sacks, P.C.

(57) ABSTRACT

A system and associated interfaces are provided that permit the monitoring of workers and equipment within the workplace environment. In one aspect, an equipment sensor having various sensing capabilities may be assigned to a piece of equipment that records various parameters that are specific to the piece of equipment. For instance, it is appreciated that there may be an equipment sensor that can be attached to the piece of equipment that is adapted to monitor certain parameters associated with the piece of equipment and its environment. For instance, an equipment sensor assigned to the piece of equipment may be capable of determining the location of the piece of equipment, along (Continued)

with motion, altitude, and the presence of an operator of the piece of equipment.

28 Claims, 27 Drawing Sheets

Related U.S. Application Data

(60) Provisional application No. 62/309,206, filed on Mar. 16, 2016.

(51) Int. Cl.
| | |
|---|---|
| *G06Q 10/06* | (2012.01) |
| *H04W 4/02* | (2018.01) |
| *H04W 4/70* | (2018.01) |
| *G08B 21/04* | (2006.01) |
| *G08B 7/06* | (2006.01) |

(56) References Cited

U.S. PATENT DOCUMENTS

| | | | |
|---|---|---|---|
| 5,212,621 A * | 5/1993 | Panter | F16P 3/12 |
| | | | 192/131 R |
| 5,335,186 A | 8/1994 | Tarrant | |
| 5,745,037 A | 4/1998 | Guthrie et al. | |
| 5,812,064 A | 9/1998 | Barbour | |
| 5,969,627 A | 10/1999 | Tarlton et al. | |
| 6,075,755 A | 6/2000 | Zarchan | |
| 6,201,476 B1 | 3/2001 | Depeursinge et al. | |
| 6,208,247 B1 | 3/2001 | Agre et al. | |
| 6,323,773 B1 * | 11/2001 | Runyon | G08B 21/24 |
| | | | 340/522 |
| 6,418,004 B1 * | 7/2002 | Mather | F16P 3/145 |
| | | | 361/160 |
| 6,433,690 B2 | 8/2002 | Petelenz et al. | |
| 6,611,783 B2 | 8/2003 | Kelly, Jr. et al. | |
| 6,735,630 B1 | 5/2004 | Gelvin et al. | |
| 6,747,675 B1 | 6/2004 | Abbott et al. | |
| 6,807,165 B2 | 10/2004 | Belcea | |
| 6,850,502 B1 | 2/2005 | Kagan et al. | |
| 6,859,831 B1 | 2/2005 | Gelvin et al. | |
| 7,185,047 B1 * | 2/2007 | Bate | H04L 63/08 |
| | | | 709/202 |
| 7,248,172 B2 | 7/2007 | Clifford et al. | |
| 7,263,379 B1 | 8/2007 | Parkulo et al. | |
| 7,298,258 B1 | 11/2007 | Hudgens et al. | |
| 7,398,153 B2 * | 7/2008 | Workman | G01S 5/0027 |
| | | | 340/988 |
| 7,423,537 B2 | 9/2008 | Bonnet et al. | |
| 7,558,622 B2 | 7/2009 | Tran | |
| 7,589,637 B2 | 9/2009 | Bischoff et al. | |
| 7,605,696 B2 * | 10/2009 | Quatro | G06Q 10/08 |
| | | | 340/539.13 |
| 7,690,051 B2 | 4/2010 | Uchida et al. | |
| 7,733,224 B2 | 6/2010 | Tran | |
| 7,741,952 B2 | 6/2010 | Denison et al. | |
| 7,797,367 B1 | 9/2010 | Gelvin et al. | |
| 7,812,712 B2 * | 10/2010 | White | A61B 5/145 |
| | | | 340/426.2 |
| 7,880,620 B2 * | 2/2011 | Hatori | G06Q 10/06 |
| | | | 235/382 |
| 7,898,403 B2 * | 3/2011 | Ritter | G06Q 10/06 |
| | | | 340/439 |
| 7,911,379 B2 * | 3/2011 | Cameron | G06Q 10/087 |
| | | | 342/357.28 |
| 7,936,878 B2 | 5/2011 | Kune et al. | |
| 7,961,109 B2 | 6/2011 | Jang et al. | |
| 8,009,013 B1 * | 8/2011 | Hirschfeld | G07C 9/27 |
| | | | 340/5.2 |
| 8,108,036 B2 | 1/2012 | Tran | |
| 8,217,756 B2 * | 7/2012 | Kumar | G07C 9/00111 |
| | | | 340/5.92 |
| 8,217,795 B2 | 7/2012 | Carlton-Foss | |
| 8,255,358 B2 * | 8/2012 | Ballew | G06Q 10/10 |
| | | | 340/679 |
| 8,260,570 B2 | 9/2012 | Nyan et al. | |
| 8,355,031 B2 | 1/2013 | Hinterberger et al. | |
| 8,381,603 B2 | 2/2013 | Peng et al. | |
| 8,408,041 B2 | 4/2013 | Ten Kate et al. | |
| 8,456,180 B2 * | 6/2013 | Sitarski | H03K 17/962 |
| | | | 324/679 |
| 8,525,673 B2 | 9/2013 | Tran | |
| 8,549,318 B2 * | 10/2013 | White | B60K 28/063 |
| | | | 701/1 |
| 8,638,228 B2 | 1/2014 | Amigo et al. | |
| 8,639,543 B2 * | 1/2014 | Boss | G06Q 10/06 |
| | | | 340/572.1 |
| 8,669,845 B1 | 3/2014 | Chakraborty et al. | |
| 8,749,391 B2 | 6/2014 | Flinsenberg et al. | |
| 8,756,032 B2 | 6/2014 | Chen | |
| 8,773,269 B2 | 7/2014 | Richardson et al. | |
| 8,824,445 B1 | 9/2014 | Berenberg et al. | |
| 8,841,987 B1 * | 9/2014 | Stanfield | G07C 9/00857 |
| | | | 340/5.61 |
| 8,860,570 B2 | 10/2014 | Thomas et al. | |
| 8,868,036 B1 * | 10/2014 | Nasserbakht | G06Q 10/109 |
| | | | 455/410 |
| 8,880,240 B2 * | 11/2014 | Grimm | H04W 4/80 |
| | | | 701/2 |
| 8,885,548 B2 | 11/2014 | Pandey et al. | |
| 8,909,497 B1 | 12/2014 | Shkolnikov | |
| 8,933,808 B2 | 1/2015 | Chakraborty et al. | |
| 8,965,841 B2 * | 2/2015 | Wallace | G06Q 10/06 |
| | | | 707/609 |
| 8,977,423 B2 * | 3/2015 | Merg | G07C 5/008 |
| | | | 701/31.4 |
| 9,060,683 B2 | 6/2015 | Tran | |
| 9,138,174 B2 | 9/2015 | Jin et al. | |
| 9,159,213 B1 | 10/2015 | Chun et al. | |
| 9,176,932 B2 | 11/2015 | Baggen et al. | |
| 9,253,635 B2 | 2/2016 | Berenberg et al. | |
| 9,400,902 B2 * | 7/2016 | Schoner | G06K 7/10366 |
| 9,402,568 B2 | 8/2016 | Barfield | |
| 9,427,177 B2 | 8/2016 | Ganyi | |
| 9,442,888 B2 | 9/2016 | Stanfield | G08G 1/20 |
| 9,462,839 B2 * | 10/2016 | Eppler, Jr. | A42B 3/046 |
| 9,499,128 B2 * | 11/2016 | Reh | G06Q 50/30 |
| 9,519,876 B2 * | 12/2016 | Wallace | G06Q 10/06 |
| 9,554,274 B1 * | 1/2017 | Castinado | H04W 12/06 |
| 9,563,919 B2 | 2/2017 | Brown et al. | |
| 9,588,135 B1 | 3/2017 | Narasimhan | |
| 9,741,225 B1 | 8/2017 | Kanan | |
| 9,811,949 B2 * | 11/2017 | Ballew | G06Q 10/06 |
| 9,858,794 B2 | 1/2018 | McCleary et al. | |
| 9,898,923 B1 | 2/2018 | Petrucci | |
| 9,959,733 B2 | 5/2018 | Gu et al. | |
| 9,980,092 B1 | 5/2018 | Wirola et al. | |
| 9,988,055 B1 * | 6/2018 | O'Flaherty | H04W 4/90 |
| 10,026,292 B2 | 7/2018 | Baker et al. | |
| 10,108,783 B2 | 10/2018 | Horseman | |
| 10,205,631 B1 * | 2/2019 | Miller | H04L 41/0806 |
| 10,210,741 B2 | 2/2019 | Chen et al. | |
| 10,325,229 B2 | 6/2019 | Morgenthau et al. | |
| 10,366,552 B2 * | 7/2019 | Dackefjord | G07C 9/28 |
| 10,384,646 B2 * | 8/2019 | Kim | B60R 25/24 |
| 10,515,489 B2 * | 12/2019 | Jefferies | B60R 25/01 |
| 10,528,902 B2 | 1/2020 | Morgenthau et al. | |
| 2001/0022558 A1 | 9/2001 | Karr, Jr. et al. | |
| 2002/0022979 A1 * | 2/2002 | Whipp | G06Q 10/02 |
| | | | 705/5 |
| 2002/0049054 A1 | 4/2002 | O'Connor et al. | |
| 2003/0095039 A1 * | 5/2003 | Shimomura | B60R 25/1004 |
| | | | 340/426.1 |
| 2003/0191955 A1 | 10/2003 | Wagner et al. | |
| 2004/0073440 A1 * | 4/2004 | Garbers | G06Q 10/02 |
| | | | 705/5 |
| 2004/0100375 A1 | 5/2004 | Tanguay | |
| 2004/0214594 A1 | 10/2004 | Holman | |
| 2004/0217864 A1 * | 11/2004 | Nowak | G06K 17/0022 |
| | | | 340/572.1 |
| 2004/0248556 A1 | 12/2004 | Rickhoff et al. | |

(56) References Cited

U.S. PATENT DOCUMENTS

| | | | |
|---|---|---|---|
| 2005/0068712 A1* | 3/2005 | Schulz | E05B 81/78 361/287 |
| 2005/0073415 A1* | 4/2005 | Shafir | G06K 19/0672 340/572.1 |
| 2005/0075116 A1 | 4/2005 | Laird et al. | |
| 2005/0110636 A1 | 5/2005 | Ghaffari | |
| 2005/0146418 A1 | 7/2005 | Caren | |
| 2005/0179448 A1* | 8/2005 | Kirchner | H03K 17/962 324/686 |
| 2006/0049922 A1* | 3/2006 | Kolpasky | B60R 25/257 340/426.13 |
| 2006/0128349 A1 | 6/2006 | Yoon | |
| 2006/0131412 A1* | 6/2006 | O'Brien | G07C 9/00103 235/451 |
| 2006/0145842 A1 | 7/2006 | Stilp | |
| 2006/0220837 A1* | 10/2006 | Kozlay | G07C 9/00087 340/539.11 |
| 2007/0026869 A1 | 2/2007 | Dunko | |
| 2007/0027732 A1 | 2/2007 | Hudgens | |
| 2007/0121937 A1 | 5/2007 | Kochevar et al. | |
| 2007/0188323 A1 | 8/2007 | Sinclair et al. | |
| 2007/0213045 A1 | 9/2007 | Hermansson et al. | |
| 2007/0258508 A1 | 11/2007 | Werb et al. | |
| 2007/0272023 A1 | 11/2007 | Dwyer et al. | |
| 2008/0001755 A1* | 1/2008 | Puzio | G08B 13/14 340/572.1 |
| 2008/0049700 A1 | 2/2008 | Shah et al. | |
| 2008/0077326 A1* | 3/2008 | Funk | G01C 21/165 701/500 |
| 2008/0117067 A1 | 5/2008 | Abel et al. | |
| 2008/0154107 A1 | 6/2008 | Jina | |
| 2008/0189142 A1* | 8/2008 | Brown | G06Q 10/00 705/4 |
| 2009/0040878 A1 | 2/2009 | Domes et al. | |
| 2009/0069642 A1 | 3/2009 | Gao et al. | |
| 2009/0135009 A1 | 5/2009 | Little et al. | |
| 2009/0154437 A1 | 6/2009 | Kim et al. | |
| 2009/0161637 A1 | 6/2009 | Ruy et al. | |
| 2010/0007502 A1 | 1/2010 | Noury et al. | |
| 2010/0054307 A1 | 3/2010 | Strohm | |
| 2010/0069115 A1 | 3/2010 | Liu | |
| 2010/0081377 A1 | 4/2010 | Chatterjee et al. | |
| 2010/0081473 A1 | 4/2010 | Chatterjee et al. | |
| 2010/0083012 A1 | 4/2010 | Corbridge et al. | |
| 2010/0121603 A1 | 5/2010 | Nyan et al. | |
| 2010/0142510 A1 | 6/2010 | Park et al. | |
| 2010/0146308 A1 | 6/2010 | Gioscia et al. | |
| 2010/0167646 A1 | 7/2010 | Alameh et al. | |
| 2010/0241464 A1* | 9/2010 | Amigo | G06Q 40/08 705/4 |
| 2010/0241465 A1 | 9/2010 | Amigo et al. | |
| 2011/0022350 A1 | 1/2011 | Chatterjee | |
| 2011/0069611 A1 | 3/2011 | Chung et al. | |
| 2011/0093913 A1 | 4/2011 | Wohlert et al. | |
| 2011/0095873 A1 | 4/2011 | Pratt et al. | |
| 2011/0111728 A1 | 5/2011 | Ferguson et al. | |
| 2011/0116414 A1 | 5/2011 | Lee et al. | |
| 2011/0128118 A1* | 6/2011 | Gilleland | B60R 25/24 340/5.2 |
| 2011/0140913 A1 | 6/2011 | Montenero | |
| 2012/0012415 A1* | 1/2012 | Oettinger | B60K 28/04 180/272 |
| 2012/0062366 A1* | 3/2012 | Pappu | G06K 7/10009 340/10.1 |
| 2012/0075072 A1 | 3/2012 | Pappu | |
| 2012/0078388 A1 | 3/2012 | Collins et al. | |
| 2012/0081289 A1 | 4/2012 | Sirpal et al. | |
| 2012/0098654 A1* | 4/2012 | Ebert | E02F 9/24 340/438 |
| 2012/0106397 A1 | 5/2012 | Abedi | |
| 2012/0130751 A1 | 5/2012 | McHugh et al. | |
| 2012/0155039 A1 | 6/2012 | Jeftic-Stojanovski et al. | |
| 2012/0200393 A1 | 8/2012 | Veni, III | |
| 2012/0218080 A1 | 8/2012 | Gu et al. | |
| 2012/0314901 A1 | 12/2012 | Hanson et al. | |
| 2013/0012786 A1 | 1/2013 | Horseman | |
| 2013/0039230 A1 | 2/2013 | Lee et al. | |
| 2013/0053652 A1* | 2/2013 | Cooner | A61B 5/0476 600/301 |
| 2013/0067544 A1* | 3/2013 | Kwark | H04W 12/08 726/4 |
| 2013/0072223 A1 | 3/2013 | Berenberg et al. | |
| 2013/0076515 A1 | 3/2013 | Flynt et al. | |
| 2013/0094430 A1* | 4/2013 | Mills | H04W 24/06 370/315 |
| 2013/0110415 A1 | 5/2013 | Davis et al. | |
| 2013/0120147 A1 | 5/2013 | Narasimhan et al. | |
| 2013/0122849 A1 | 5/2013 | Doezema et al. | |
| 2013/0137079 A1* | 5/2013 | Kahle | G01C 15/00 434/365 |
| 2013/0137468 A1* | 5/2013 | Kahle | G01C 15/00 455/457 |
| 2013/0138464 A1* | 5/2013 | Kahle | G06Q 10/063114 705/7.15 |
| 2013/0138465 A1* | 5/2013 | Kahle | G06Q 10/063114 705/7.15 |
| 2013/0138466 A1* | 5/2013 | Kahle | G06Q 10/063114 705/7.15 |
| 2013/0138606 A1* | 5/2013 | Kahle | G06F 17/30129 707/609 |
| 2013/0176107 A1* | 7/2013 | Dumas | G07C 9/00571 340/5.61 |
| 2013/0217352 A1 | 8/2013 | Pan et al. | |
| 2013/0271274 A1* | 10/2013 | Ebert | E02F 9/24 340/435 |
| 2013/0285813 A1 | 10/2013 | Kasama | |
| 2013/0293349 A1* | 11/2013 | Templ | G07C 9/00111 340/5.61 |
| 2014/0004910 A1 | 1/2014 | Goldman | |
| 2014/0035726 A1* | 2/2014 | Schoner | G06K 7/10366 340/8.1 |
| 2014/0091934 A1 | 4/2014 | Vallance et al. | |
| 2014/0111339 A1 | 4/2014 | Beckett | |
| 2014/0118498 A1 | 5/2014 | Lee et al. | |
| 2014/0132183 A1 | 5/2014 | Van Herpen | |
| 2014/0159866 A1* | 6/2014 | Hwang | G08C 17/02 340/5.64 |
| 2014/0208829 A1 | 7/2014 | Lechner et al. | |
| 2014/0218169 A1* | 8/2014 | Chih | G05B 1/03 340/5.81 |
| 2014/0247151 A1* | 9/2014 | Proud | A61B 5/0024 340/870.02 |
| 2014/0313032 A1 | 10/2014 | Sager et al. | |
| 2014/0317631 A1 | 10/2014 | Ryshakov et al. | |
| 2014/0336850 A1 | 11/2014 | Kim et al. | |
| 2015/0015401 A1 | 1/2015 | Wedig et al. | |
| 2015/0059204 A1 | 3/2015 | Alexander et al. | |
| 2015/0073741 A1 | 3/2015 | Wüest et al. | |
| 2015/0074797 A1 | 3/2015 | Choi et al. | |
| 2015/0123787 A1 | 5/2015 | Watson et al. | |
| 2015/0161553 A1* | 6/2015 | Eggleston | G06Q 10/063114 705/7.15 |
| 2015/0161834 A1* | 6/2015 | Spahl | G07C 9/00111 340/5.61 |
| 2015/0173021 A1 | 6/2015 | Lim | |
| 2015/0187194 A1 | 7/2015 | Hypolite et al. | |
| 2015/0200738 A1 | 7/2015 | Wetterwald et al. | |
| 2015/0276521 A1 | 10/2015 | Moore, Jr. et al. | |
| 2015/0302719 A1 | 10/2015 | Mroszczak et al. | |
| 2015/0310565 A1 | 10/2015 | Fairbanks et al. | |
| 2015/0326053 A1 | 11/2015 | Amano et al. | |
| 2015/0338852 A1* | 11/2015 | Ramanujam | G01C 21/26 701/2 |
| 2015/0351084 A1 | 12/2015 | Werb | |
| 2015/0366518 A1 | 12/2015 | Sampson | |
| 2016/0004314 A1 | 1/2016 | Burckard | |
| 2016/0128619 A1* | 5/2016 | Geller | A61B 5/6803 600/595 |
| 2016/0171633 A1* | 6/2016 | DeWalt | G06Q 50/08 705/7.15 |
| 2016/0191511 A1 | 6/2016 | Tijerina et al. | |

(56) References Cited

U.S. PATENT DOCUMENTS

| | | | |
|---|---|---|---|
| 2016/0232774 A1 | 8/2016 | Noland et al. | |
| 2016/0246935 A1 | 8/2016 | Cerny et al. | |
| 2016/0345317 A1 | 11/2016 | Leevesque et al. | |
| 2017/0017815 A1* | 1/2017 | Caso | G06K 7/10257 |
| 2017/0032302 A1* | 2/2017 | Lete | G06Q 10/06313 |
| 2017/0048707 A1* | 2/2017 | Ortiz | H04W 12/06 |
| 2017/0055104 A1 | 2/2017 | Wegelin et al. | |
| 2017/0068925 A1 | 3/2017 | Sudo et al. | |
| 2017/0078899 A1* | 3/2017 | Li | H04W 64/006 |
| 2017/0107090 A1* | 4/2017 | Mondal | B66F 17/006 |
| 2017/0109829 A1 | 4/2017 | Amigo et al. | |
| 2017/0140617 A1* | 5/2017 | Klein | G06K 7/10366 |
| 2017/0142501 A1 | 5/2017 | Jakobsson | |
| 2017/0162020 A1 | 6/2017 | Pham et al. | |
| 2017/0163785 A1* | 6/2017 | Kim | H04M 1/7253 |
| 2017/0169533 A1 | 6/2017 | O'Brien | |
| 2017/0205784 A1 | 7/2017 | Huseth et al. | |
| 2017/0206534 A1 | 7/2017 | O'Brien | |
| 2017/0222676 A1 | 8/2017 | Piccioni | |
| 2017/0263105 A1 | 9/2017 | Shoari et al. | |
| 2017/0263113 A1 | 9/2017 | Tiberi et al. | |
| 2017/0270461 A1 | 9/2017 | Morgenthau et al. | |
| 2017/0270462 A1 | 9/2017 | Morgenthau et al. | |
| 2017/0270463 A1 | 9/2017 | Morgenthau et al. | |
| 2017/0270464 A1 | 9/2017 | Morgenthau et al. | |
| 2017/0270481 A1 | 9/2017 | Morgenthau et al. | |
| 2017/0281056 A1 | 10/2017 | Raanan et al. | |
| 2017/0296092 A1 | 10/2017 | Jones et al. | |
| 2017/0303187 A1 | 10/2017 | Crouthamel et al. | |
| 2017/0353829 A1* | 12/2017 | Kumar | H04W 4/029 |
| 2017/0372184 A1* | 12/2017 | Manci | G06K 19/0725 |
| 2017/0372188 A1* | 12/2017 | Simon | G06K 19/07762 |
| 2018/0113006 A1 | 4/2018 | Tyrer | |
| 2018/0132285 A1* | 5/2018 | Jackson | H04W 76/10 |
| 2018/0151037 A1 | 5/2018 | Morgenthau et al. | |

OTHER PUBLICATIONS

Park, JeeWong et al., Framework of Automated Construction Safety Monitoring Using Cloud Enabled BIM and BLE Mobile Tracking Sensors, Journal of Construction Engineering, vol. 143, No. 2, 2017 (Year: 2017).*

Nan-Hai, Lo et al., Enhancing Worker Onsite Safety Management Using RFID Technology in Construction the Thirteenth East Asia Pacific Conference on Structural Engineering and Construction, Sep. 11-13, 2013 (Year: 2013).*

Zou, Patrick X.W. et al., A Real-Time Monitoring System for Improving Construction Workers Health and Safety Proceedings of CIB W099, Sep. 10-11, 2015 (Year: 2015).*

Spot-R by Triax, Purdue Emerging Construction Technologies, Purdue University, Jan. 30, 2018 (Year: 2018).*

Mayton, Brian et al., TRUSS: Tracking Risk with Ubiquitous Smart Sensing. 2012 IEEE Sensors (Year: 2012).*

Application of Tracking Technology to Access-control System Hitachi, 2004 (Year: 2004).*

Facts About Smart Access System Toyota, 2016 (Year: 2016).*

Thompson, Jason, How to prevent unauthorized use of a forklift: access control Raymond Handling Concept Corporation, Apr. 11, 2015 (Year: 2015).*

Invitation to Pay Additional Fees dated Apr. 27, 2017 in connection with International Application No. PCT/US2017/02270.

International Search Report and Written Opinion dated Jul. 12, 2017 in connection with International Application No. PCT/US2017/022270.

International Preliminary Report on Patentability dated Sep. 27, 2018 in connection with International Application No. PCT/US2017/022270.

Azhari et al., On the Performance of Off-Body Links for a Wireless Body Area Network in an Underground Mining Environment, International Journal of Computer Science and Innovation, vol. 2015, No. 2, pp. 53-67, 2015 (Year: 2015).

Bagala et al., Evaluation of Accelerometer Based Fall Detection Algorithms on Real-World Falls. PLoS One. May 2012; 7(5):e37062. 9 pages.

Bourke et al., A threshold based fall detection algorithm using a bi-axial gyroscope sensor. Medical Engineering & Physics. 2008; 30:84-90.

Bourke et al., Evaluation of a threshold based tri-axial accelerometer fall detection algorithm. Gait & Posture. 2007; 26:194-199.

Bourke et al., Evaluation of waist mounted tri-axial accelerometer based fall detection algorithms during scripted and continuous unscripted activities. Journal of Biomechanics. 2010; 43:3051-7.

Chen et al., Wearable Sensors for Reliable Fall Detection. Proceedings of the 2005 IEEE Engineering in Medicine and Biology 27th Annual Conference. Sep. 1-4, 2005; 4 pages.

Ciabattoni et al., An Open and Modular Hardware Node for Wireless Sensor and Body Area Networks, Journal of Sensors, vol. 2016, 2016 (Year: 2016).

Costin et al., RFID and BIM-Enabled Worker Location Tracking to Support Real-Time Building Protocol Control and Data Visualization, Journal of Information Technology in Construction, Dec. 2015 (Year: 2015).

Delahoz et al., Survey of Fall Detection and Fall Prevention Using Wearable External Sensors, Sensors, vol. 14, 2014 (Year: 2014).

Fang et al., A smartphone-based detection of fall portents for construction workers, Procedia Engineering, vol. 85, pp. 147-156, 2014 (Year: 2014).

Ge et al., Detecting Falls Using Accelerometers by Adaptive Thresholds in Mobile Devices. Journal of Computeres. Jul. 2014; 9(7):1553-9.

Giang, Companies Are Putting Sensors on Employees to Track Their Every Move, Business Insider, Mar. 14, 2013 (Year: 2013).

Giretti et al., Design and First Development of an Automated Real-time Safety Management System for Construction Sites, Journal of Civil Engineering and Management, vol. 15, No. 4, 2009 (Year: 2009).

Huynh et al., Optimization of an Accelerometer and Gyroscope Based Fall Detection Algorithm. Journal of Sensors. 2015; 2015: 8 pages.

Li et al., Accurate, Fast Fall Detection Using Gyroscopes and Accelerometer Derived Posture Information. 2009 Sixth International Workshop on Wearable and Implantable Body Sensor Networks. 2009; 6 pages.

Luque et al., Comparison and Characterization of Android Based Fall Detection Systems. Sensors. 2014; 14:18543-74.

Mubashir et al., A survey on fall detection: Principles and approaches. Neurocomputing. 2013; 100:144-152.

Senyurek et al., Monitoring Workers Through Wearable Transeivers for Improving Safetry, IEEE, 2011 (Year: 2011).

Shanesy, New Smart Wearable Protects Workers on the Job. Builder. May 25, 2017. retrieved from Internet [https://www.builderonline.com/building/safety-healthfulness/new-smart-wearable-protects-workers-on-the-job]. Last accessed Feb. 14, 2019.

Solepower.com Web pages—Smartboots, Apr. 21, 2017, Retrieved from Archive.org Oct. 3, 2018 (Year: 2018).

Thomas et al., SmartHat: A Battery-free Worker Safety Device Employing Passive UHF RFID Technology, 2011 IEEE International Conference on RFID, 2011 (Year: 2011).

Triax Technologies Web pages—Spot-r, www.triaxtec.com, Oct. 11, 2016, Retrieved from Archive.org Oct. 3, 2018 (Year: 2016).

Wu et al., Development of a Wearable Sensor Based Fall Detection System, International Journal of Telemedicine and Applications, vol. 2015 (Year: 2015).

Yang et al., Automated Detection of Near-miss Fall incidents in Iron Workers Using Inertial Measurement Units, Construction Research Congress, ASCE, 2014 (Year: 2014).

Zhu et al., Bridging e-Health and the Internet of Things: The SPHERE Project, IEEE Computer Society, Jul./Aug. 2015 (Year: 2015).

U.S. Appl. No. 16/696,823, filed Nov. 29, 2019, Morgenthau et al.

Ahamed, Review and Implications of Time Division Multiple Access Techniques for Wireless Environment Services and Applications. Journal of Theoretical and Applied Information Technology. 2008; 807-812.

(56) References Cited

OTHER PUBLICATIONS

Akyildiz et al., Wireless mesh networks: a survey. Computer Networks. 2005; 1-43.
BORCOCi, Wireless Mesh Networks Technologies: Architectures, Protocols, Resource Management and Applications. University Politechnia Bucharest, Infoware Conference Aug. 2009; 212 pages.
Burri et al., Dozer: Ultra-Low Power Data Gathering in Sensor Networks. ACM, IPSN'07, Apr. 2007; 10 pages.
Dai et al., Mobile phone based pervasive fall detection. Personal and ubiquitous computing. Oct. 1, 2010;14(7):633-43.
DAS, Wireless Mesh Networking.Stony Brook University. Dec. 2012; 53 pages.
Djukic, Scheduling Algorithms for TDMA Wireless Multihop Networks. University of Toronto, 2008; 219 pages.
El-Hoiydi et al., WiseMAC: An Ultra Low Power MAC Protocol for Multi-hop Wireless Sensor Networks. ALGOSENSORS 2004, LNCS. 2004; 3121:18-32.
Ernst, Scheduling Techniques in Wireless Mesh Networks. Thesis, The University of Guelph. Apr. 2009; 85 pages.
Gonga, Mobility and Multi-channel Communications in Low-power Wireless Networks. KTH Royal Institute of Technology. Doctoral Thesis, Nov. 2015; 161 pages.
He et al., Fall detection by built-in tri-accelerometer of smartphone. Proceedings of 2012 IEEE-EMBS International Conference on Biomedical and Health Informatics Jan. 5, 2012:184-7.
Hegde et al., Technical Advances in Fall Detection System—A Review International Journal of Computer Science and Mobile Computing. Jul. 2013; 2(7):152-60.
Kanzaki et al., Dynamic TDMA Slot Assignment in Ad Hoc Networks. IEEE Computer Society, Proceedings of the 17th International Conference on Advanced Information Network and Applications. 2003; 6 pages.
Ko et al., Distributed Channel Assignment in Multi-Radio 802.11 Mesh Networks. 2007 Wireless Communications and Networking. IEEE Conference. 2007; 6 pages.
Kulkarni et al., TDMA Service for Sensor Networks. International Workshop on Assurance in Distribute Systems and Networks. 2004; 6 pages.
Larranaga et al., An Environment Adaptive ZigBee-based Indoor Positioning Algorithm. 2010 International Conference on Indoor Positioning and Indoor Navigation. Sep. 2010; 8 pages.
Lin et al., An Open-Source Wireless Mesh Networking Module for Environmental Monitoring. IEEE. 2015. 6 pages.
Mardeni et al., Efficient Mobile Asset Tracking and Localization in ZigBee Wireless Network. Journal of Advances in Computer Networks. Mar. 2015; 3(1):1-6.
Mathie et al., A System for Monitoring Posture and Physical Activity Using Accelerometers. 2001 Proceedings of the 23rd Annual EMBS International Conference. Oct. 25-28, 2001:3654-7.
Musaloiu-Elefteri, Practical Wireless Mesh Networks and Their Applications. John Hopkins University. Jan. 2010; 123 pages.
Rezaei et al., Energy Saving in Wireless Sensor Networks. International Journal of Computer Science & Engineering Survey (IJCSES). Feb. 2012; 3(1): 23-37.
Saxena et al., Efficient Power Utilization Techniques for Wireless Sensor Networks—A Survey. International Journal on Computer Science and Engineering. (IJCSE). Feb. 2011; 3(2):905-925.
Suman et al., A Dynamic TDMA Slot Scheduling (DTSS) Scheme for Efficient Channel Application in Tactical Ad Hoc Networks. International Conference on Computing, Communication and Automation. 2015; 502-507.
Tolkiehn et al., Direction Sensitive Fall Detection Using Triaxial Acceleromoter and a Barametric Pressure Sensor. IEEE International Conference of Engineering in Medicine and Biology Society. Aug. 30, 2011:369-72.
Wu et al., Adaptive TDMA slot Assignment in Mesh Wireless Networks. Proceedings of the 2009 IEEE International Conference on Networking, Sensing and Control. Mar. 2009; 5 pages.

\* cited by examiner

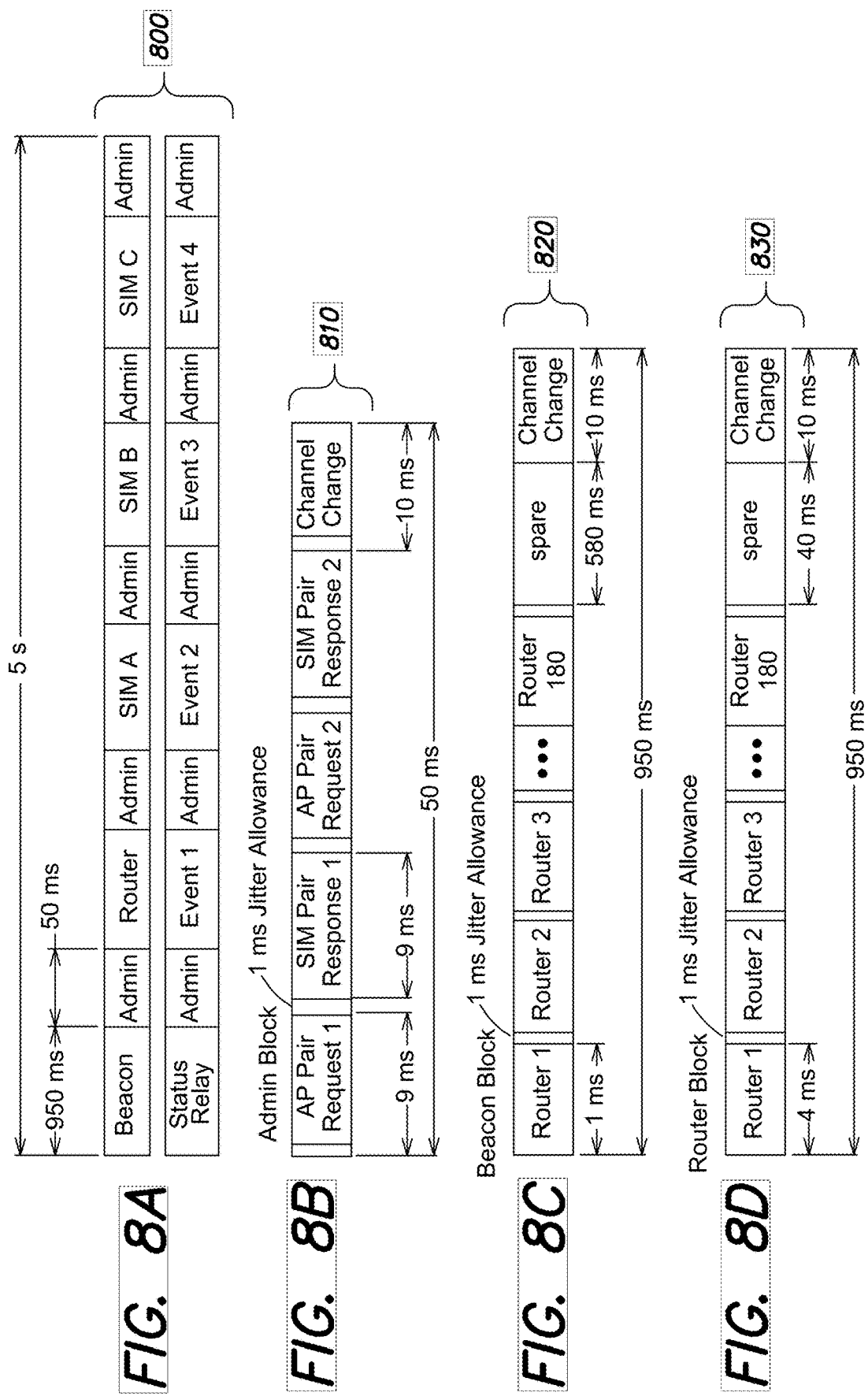

Resource Calendar

March 2016

| Sunday | Monday | Tuesday | Wednesday | Thursday | Friday | Saturday |
|---|---|---|---|---|---|---|
|  |  | 1 | 2 | 3 | 4 | 5 |
| 6 | 7 | 8 | 9 | 10  2 Carpenters<br>3 Electricians<br>4 Field Engineers<br>5 Plumbers | 11  5 Carpenters<br>6 Electricians<br>7 Field Engineers<br>8 Plumbers | 12 |
| 13 | 14 | 15 | 16 | 17 | 18 | 19 |
| 20 | 21 | 22 | 23 | 24 | 25 | 26 |
| 27 | 28 | 29 | 30 | 31 |  |  |

*FIG. 24*

SENSOR BASED SYSTEM AND METHOD FOR AUTHORIZING OPERATION OF WORKSITE EQUIPMENT USING A LOCALLY STORED ACCESS CONTROL LIST

RELATED APPLICATIONS

This Application claims the benefit under 35 U.S.C. § 120 of U.S. application Ser. No. 15/419,735, entitled "SYSTEM AND INTERFACES FOR MANAGING WORKPLACE EVENTS" filed on Jan. 30, 2017, which is herein incorporated by reference in its entirety. Application Ser. No. 15/419,735 claims priority under 35 U.S.C. § 119(e) to U.S. Provisional Application Ser. No. 62/309,206, entitled "SYSTEM AND INTERFACES FOR MANAGING WORKPLACE EVENTS" filed on Mar. 16, 2016, which is herein incorporated by reference in its entirety.

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

SUMMARY

Systems exist that alert users to dangerous working conditions, such as radiation, physical, chemical, air quality, and other dangers. However, it is appreciated that it would be useful to have personalized monitors in the workplace that could store and communicate events associated with particular workers. Such monitors would be particularly useful in the construction industry where slips/falls and other workplace accidents are commonplace. Existing systems and software tools used to monitor workplace conditions are not sufficient in identifying what has occurred to a specific worker at a specific location within the workplace.

What is needed is a system and associated interfaces that permits the monitoring of workers within the workplace environment. In one embodiment, a monitor having various sensing capabilities may be assigned to a worker (e.g., referred to herein as a monitored subject) that records various parameters that are personal to the worker. For instance, it is appreciated that there may be sensor that can be attached to the monitored subject (e.g., at the belt line) that is adapted to monitor certain parameters associated with the worker's environment. For instance, a sensor assigned to the monitored subject may be capable of determining the location of the subject, along with motion, impacts, altitude, and other environmental parameters that could affect the health or other condition of the worker. In some embodiments, the sensor is worn at the beltline to accurately measure movement of a wearer's core.

Further, it is appreciated that it may be helpful to be able to detect slips and falls at the worksite and to alert appropriate personnel in real time. A system may be provided that includes personalized sensors that record and detect environmental parameters that could affect a worker, and a distributed computer system infrastructure that is capable of processing events received from sensors, sending alerts to management personnel, reporting, showing location status among other functional capabilities. Such a system may be helpful in decreasing response time to accidents. Another benefit may include providing a record of any accidents for use in managing workers compensation claims.

It is further appreciated that it may be useful to monitor equipment at a worksite. A system may be provided that detects the presence of an operator of a piece of equipment and determines whether the operator is authorized to operate the piece of equipment. The system may determine a location of the piece of equipment, and report various statistics associated with the piece of equipment, such as fuel consumption. Such a system may be helpful, for example, in monitoring the utilization of various pieces of equipment, allowing for a supervisor to equalize the amount of time each piece of equipment is in use.

In another implementation, the system may be capable of tracking the worker as a resource in providing information to other computer systems to facilitate resource management and productivity tracking. For instance, the system may be capable of reporting when workers are on or off site, as well as their approximate locations onsite. For instance, such information may be used by a resource management and planning application to indicate when particular types of workers (e.g., plumbers) are at a construction site for a particular period of time. In one example, it may be useful to know and track in real-time how many plumbers were on a particular jobsite for how many hours for budgeting purposes.

In one implementation, individual sensors are assigned to monitored subjects, and these sensors are capable of communicating over a communication network. In one embodiment, the communication network takes the form of a wireless mesh network comprising a number of nodes that are capable of passing messages received from sensors. The mesh network may also be coupled to a distributed computer system that is capable of receiving and processing event data received from the sensors. Such event data may be received, stored, and processed and may result in alert messages being sent to particular manager users. Further, such data may be analyzed and presented to manager users for the purposes of monitoring individual and groups of users, reporting, determining compliance, budgeting, resource planning, as well as other management operations.

According to one implementation, the sensor may be a wearable portion of the system. In one example, the sensor is a small battery-powered unit worn on the body of the monitored subject. For instance, the sensor may be worn on the belt, although in some cases it may be worn in a pocket of a safety vest or may be integrated into other apparel/equipment. In one example implementation, the sensor is worn on a belt around a subject's waist which allows the sensor to accurately measure movement of a person's core.

In one implementation, the sensor may include one or more controls and/or indications that may be used by a monitored subject. In one example implementation, the sensor may include a button that permits the wearer to indicate to others that an emergency or other situation is occurring, causing a message and/or alert to be sent to a management system (e.g., a manager's device and/or sensor). In another example, the sensor may include one or more indicators, such as lights (e.g., LEDs), audio indicators (e.g., a piezo sound transducer), to indicate a sensor/wearer status, indicate event status, and/or provide feedback to the wearer or other user.

As discussed, the system may be used to perform a number of functions associated with monitoring a subject at the worksite. For instance, the system may be capable of determining certain types of events that may be detrimental to the subject (e.g., slips/falls, fall off of a ladder/building, impacts, throwing of the sensor, dropping of the sensor, running, jumping, etc.). For instance, the system may determine, in association with an event, the location of the event, the time that the event occurred, and any associated parameters that may be necessary to understand the nature of the event. For example, the system made be able to determine how high of a fall the subject experienced, how hard the fall, the type of fall, etc. The system may also be capable of determining whether the sensor was actually worn by the subject at the time of the event (e.g., to prevent fraudulent worker's compensation claims). In another implementation, the system may be configured to determine the subject's altitude at a particular location to determine their location (e.g., in a building).

The system may also perform a number of identification/compliance functions such as determining if the subject is on a jobsite at a particular time, geo-fencing functions such as, for example, determining whether a person is permitted in a particular area, and other monitoring activities and functions. Such information may be capable of being used for resource management, budgeting, safety, compliance and other functions.

Further, it is appreciated that it may be helpful to have a sensor device that improves battery life. Accordingly, certain features including, but not limited to, how the sensor communicates, when the sensor is active, and how the sensor responds to events can contribute towards a longer battery life. In one embodiment, the sensor communicates using a protocol wherein the sensor communicates only during predetermined time slots. For instance, upon assignment to a particular monitored subject, system components may assign a particular sensor a timeslot in which it communicates on the mesh network. Because the sensor communicates only during this period, the amount of time that the sensor needs to be active (e.g., and powering antennas and other interface circuits), is reduced. Further, the detection of particular inputs from the sensor may cause the sensor to become active. Other modes of sensor and/or system operation may be provided that are conducive to preserving power.

Further, specialized communication nodes may be provided that are configurable in a mesh-type communication network. Such nodes may be distributed throughout the workplace and facilitate sensor communication of event and status information. Some nodes repeat information received by sensors to other nodes, and other types (e.g., gateway nodes) are connectable to other types of data networks (e.g., a conventional data network) and communicate the sensor data to computer systems using standard protocols (e.g., TCP/IP).

According to one aspect of the present invention, a system is provided comprising a plurality of communication nodes configured in a wireless mesh network, a sensor, assigned to a monitored subject, comprising a wireless network interface adapted to communicate with the mesh network, a processor adapted to detect a plurality of workplace events occurring to the monitored subject and wherein the processor is further adapted to communicate an event message over the wireless mesh network to a managing computer system, wherein the event message comprises a location of the event, information indicating that the monitored subject experienced at least one event of a group comprising a fall event, a jump event, and a slip and fall event. According to one embodiment, the sensor further comprises at least one accelerometer, a gyroscopic element, and a pressure sensor.

According to another embodiment, the sensor is further adapted to detect, responsive to a trigger, data for a defined period of time from the at least one accelerometer, gyroscopic element, and pressure sensor, and communicate the data within the event message. According to another embodiment, the system is adapted to analyze at least one of the plurality of workplace events, the analysis of at least one event including a determination of a freefall duration, a detection of a jump, an altimeter analysis, an impact detection, a rotational analysis, a post-fall analysis, and a proximity sensor analysis.

According to another embodiment, the system further comprises a managing computer system having an interface through which a user is capable of viewing information relating to the plurality of workplace events. According to another embodiment, the sensor further comprises a proximity sensor that senses when the sensor is being worn by the assigned subject, and wherein an indication of the proximity sensor is used by the system to determine a validity of at least one of the workplace events. According to another embodiment, the plurality of communication nodes and sensor are adapted to transmit information using a plurality of communication channels, wherein each transmitter has specific time slots in which to transmit the information. According to another embodiment, the system is adapted to dynamically assign time slots for each of the transmitters.

According to another embodiment, the system further comprises a check-in system that assigns the sensor to the monitored subject, the check-in system including a reader that is adapted to scan an identifier associated with the sensor, and to create a record of an association between the scanned sensor and the monitored subject. According to another embodiment, the sensor is adapted to determine the location of the sensor based on detection of one or more of the plurality of communication nodes in the wireless mesh network. According to another embodiment, the determination of the location is determined responsive to detected signal strength of the one or more of the plurality of communication nodes in the wireless mesh network. According to another embodiment, the processor is adapted to determine an altitude of the monitored subject.

According to another embodiment, the managing computer system further comprises at least one user interface control that when selected, causes the interface to display event information relating to at least one workplace event that has occurred with the monitored subject. According to another embodiment, the managing computer system further comprises at least one user interface that displays one or more events associated with the monitored subject. According to another embodiment, the managing computer system further comprises at least one user interface that displays a graphic representation of a workplace site and a representation of one or more monitored subjects located one on the graphic representation responsive to a determination of locations of one or more sensor devices associated with respective ones of the one or more monitored subjects.

According to another embodiment, the sensor comprises an accelerometer adapted to detect a free fall event. According to another embodiment, the sensor is configured to operate in a low power mode wherein the processor operates in a stand-by mode and wherein the gyroscopic element is powered off. According to another embodiment, the sensor is adapted to transition from the low power mode to an active mode responsive to encountering a triggering event. According to another embodiment, the processor, responsive to the triggering event, is adapted to transition to an operating mode, and is adapted to power on the gyroscopic element and record data from the at least one accelerometer, gyroscopic element, and pressure sensor. According to another embodiment, the triggering event occurs responsive to a detection by the at least one accelerometer.

According to another embodiment, the sensor comprises a sensor element that indicates whether the sensor is being worn by the monitored subject. According to another embodiment, the sensor element includes a proximity sensor adapted to detect a presence of a monitored subject. According to another embodiment, the sensor element includes a clip switch adapted to indicate a change in status of a clip that attaches the sensor to the monitored subject. According to another embodiment, the processor is adapted to detect one or more false events. According to another embodiment, the one or more false events includes at least one of a group comprising a sensor drop event and a sensor throw event.

According to another aspect of the present invention, a non-volatile computer-readable medium is provided encoded with instructions for execution on a computer system, the instructions when executed, provide a system comprising a plurality of communication nodes configured in a wireless mesh network, a sensor, assigned to a monitored subject, comprising, a wireless network interface adapted to communicate with the mesh network, a processor adapted to detect a plurality of workplace events occurring to the monitored subject and wherein the processor is further adapted to communicate an event message over the wireless mesh network to a managing computer system, wherein the event message comprises a location of the event, information indicating that the monitored subject experienced at least one event of a group comprising a fall event, a jump event, and a slip and fall event. According to another embodiment, the sensor further comprises at least one accelerometer, a gyroscopic element, and a pressure sensor.

According to another embodiment, the sensor is further adapted to detect, responsive to a trigger, data for a defined period of time from the at least one accelerometer, gyroscopic element; and pressure sensor, and communicate the data within the event message. According to another embodiment, the system is adapted to analyze at least one of the plurality of workplace events, the analysis of at least one event including a determination of a freefall duration, a detection of a jump, an altimeter analysis, an impact detection, a rotational analysis, a post-fall analysis, and a proximity sensor analysis.

According to another embodiment, the system further comprises a managing computer system having an interface through which a user is capable of viewing information relating to the plurality of workplace events. According to another embodiment, the sensor further comprises a proximity sensor that senses when the sensor is being worn by the assigned subject, and wherein an indication of the proximity sensor is used by the system to determine a validity of at least one of the workplace events. According to another embodiment, a plurality of communication nodes and sensor are adapted to transmit information using a plurality of communication channels, wherein each transmitter has specific time slots in which to transmit the information.

According to another embodiment, the system is adapted to dynamically assign time slots for each of the transmitters. According to another embodiment, the system further comprises a check-in system that assigns the sensor to the monitored subject, the check-in system including a reader that is adapted to scan an identifier associated with the sensor, and to create a record of an association between the scanned sensor and the monitored subject. According to another embodiment, the sensor is adapted to determine the location of the sensor based on detection of one or more of the plurality of communication nodes in the wireless mesh network.

According to another embodiment, the determination of the location is determined responsive to detected signal strength of the one or more of the plurality of communication nodes in the wireless mesh network. According to another embodiment, the processor is adapted to determine an altitude of the monitored subject.

According to another embodiment, the managing computer system further comprises at least one user interface control that when selected, causes the interface to display event information relating to at least one workplace event that has occurred with the monitored subject. According to another embodiment, the managing computer system further comprises at least one user interface that displays one or more events associated with the monitored subject. According to another embodiment, the managing computer system further comprises at least one user interface that displays a graphic representation of a workplace site and a representation of one or more monitored subjects located one on the graphic representation responsive to a determination of locations of one or more sensor devices associated with respective ones of the one or more monitored subjects. According to another embodiment, the sensor comprises an accelerometer adapted to detect a free fall event.

According to another embodiment, the sensor is configured to operate in a low power mode wherein the processor operates in a stand-by mode and wherein the gyroscopic element is powered off. According to another embodiment, the sensor is adapted to transition from the low power mode to an active mode responsive to encountering a triggering event. According to another embodiment, the processor, responsive to the triggering event, is adapted to transition to an operating mode, and is adapted to power on the gyroscopic element and record data from the at least one accelerometer, gyroscopic element, and pressure sensor. According to another embodiment, the triggering event occurs responsive to a detection by the at least one accelerometer.

According to another aspect, a device is provided comprising a memory element, a processor coupled to the memory element; and an accelerometer, wherein the processor is adapted to determine, based on an output signal of the accelerometer, whether the device should be placed in a programming mode. According to one embodiment, the processor is activated responsive to a signal produced by the accelerometer. According to another embodiment, the processor is adapted to determine whether the device is placed in a particular orientation, and if so determined, the processor places the device in the programming mode.

According to another embodiment, the device is a sensor capable of being programmed for a particular application. According to another embodiment, the processor is further adapted to, after placing the device in the programming mode, search for a signal from a programming device. According to another embodiment, the device is a part of a group of one or more similar devices packaged together.

According to another embodiment, the group of one or more similar devices can be programmed simultaneously if the group of one or more similar devices are placed in the particular orientation. According to another embodiment, the processor is adapted to place the device in the programming mode responsive to the device being placed in the particular orientation during a predetermined time period. According to another embodiment, the processor is adapted to place the device in the programming mode responsive to the device being placed in a sequence of two or more orientations.

According to another embodiment, the device is assigned to a monitored subject. According to another embodiment, the device is designed to detect a plurality of workplace events experienced by the monitored subject. According to another embodiment, the device, when placed in the programming mode, receives a set of predetermined parameters from a programming device. According to another embodiment, at least one of the set of predetermined parameters includes an operating parameter associated with a specific worksite.

According to another aspect, a sensor is provided comprising an element that is adapted to attach the sensor to a monitored subject, a wireless network interface adapted to communicate with a network of communication nodes, a processor adapted to detect a plurality of workplace events occurring to the monitored subject and wherein the processor is further adapted to communicate an event message over the network to a managing computer system, wherein the event message comprises a location of the event, and information indicating that the monitored subject experienced at least one event of a group comprising a fall event, a jump event, and a slip and fall event. In one embodiment, the sensor further comprises at least one of a group of elements comprising at least one accelerometer, a gyroscopic element, and a pressure sensor.

According to another embodiment, the sensor is further adapted to detect, responsive to a trigger, data for a defined period of time from the at least one accelerometer, gyroscopic element, and pressure sensor, and communicate the data within the event message to a management system. According to another embodiment, the sensor is adaptively coupled to the management system, and wherein the management system is adapted to analyze at least one of the plurality of workplace events, the analysis of the at least one event including a determination of a freefall duration, a detection of a jump, an altimeter analysis, an impact detection, a rotational analysis, a post-fall analysis, and a proximity sensor analysis. According to another embodiment, the sensor further comprises a proximity sensor that senses when the sensor is being worn by the monitored subject, and wherein an indication of the proximity sensor is used by the system to determine a validity of at least one of the workplace events.

According to another embodiment, the sensor and the network of communication nodes are adapted to transmit information using a plurality of communication channels, wherein each transmitter has specific time slots in which to transmit the information. According to another embodiment, the sensor, when not in the sensor's specific time slot in which to transmit the information, operates in a low power mode. According to another embodiment, the sensor further includes a check-in capability, wherein the check-in capability associates the sensor with the monitored subject and communicates the association over the network to the managing computer system. According to another embodiment, the check-in capability is performed using RFID.

According to another embodiment, the sensor is adapted to determine the location of the sensor based on detection of one or more communication nodes in the network of communication nodes. According to another embodiment, the determination of the location is determined responsive to detected signal strength of the one or more communication nodes in the network of communication nodes. According to another embodiment, the sensor is adapted to determine an altitude of the monitored subject.

According to another embodiment, the sensor comprises an accelerometer adapted to detect a free fall event. According to another embodiment, the sensor is configured to operate in a low power mode wherein the processor operates in a stand-by mode and wherein the gyroscopic element is powered off. According to another embodiment, the sensor is adapted to transition from the low power mode to an active mode responsive to detecting a triggering event. According to another embodiment, the processor, responsive to the triggering event, is adapted to transition to an operating mode, and is adapted to power on the gyroscopic element and record data from the at least one accelerometer, gyroscopic element, and pressure sensor.

According to another embodiment, the triggering event occurs responsive to a detection by the at least one accelerometer. According to another embodiment, the sensor comprises a sensor element that indicates whether the sensor is being worn by the monitored subject. According to another embodiment, the sensor element includes a proximity sensor adapted to detect a presence of the monitored subject. According to another embodiment, the sensor element includes a clip switch adapted to indicate a change in status of a clip that attaches the sensor to the monitored subject.

According to another aspect, a communication system is provided comprising a plurality of communication nodes configured in a wireless mesh network, the plurality of communication nodes including a plurality of router nodes, and a plurality of sensor nodes in communication with one or more of the plurality of router nodes, wherein the plurality of router nodes are capable of routing event data generated by the plurality of sensor nodes to a management system, and wherein at least one router system is configured to provide location data to the management system.

According to one embodiment, the at least one router system is configured to provide location data to the management system via a gateway node. According to another embodiment, the plurality of router nodes are positioned at fixed locations within a workplace, and wherein the plurality of router nodes are used to determine a location of at least one of the plurality of sensor nodes. According to another embodiment, at least one of the plurality of sensor nodes is adapted to detect at least one event experienced by a monitored subject, the at least one event being determined from a group comprising a fall event, a jump event, and a slip and fall event.

According to another embodiment, the at least one of the plurality of sensor nodes is adapted to detect at least one event experienced by a monitored subject, the at least one event being a false event including at least one of a sensor drop event and a sensor throw event. According to another embodiment, the plurality of communication nodes and the plurality of sensor nodes are adapted to transmit information using a plurality of communication channels, wherein each transmitter has specific time slots in which to transmit the information.

According to another embodiment, the communication system is adapted to dynamically assign time slots for each of the transmitters. According to another embodiment, the plurality of sensor nodes and the plurality of communication nodes communicate by utilizing a time division multiple access scheme wherein each transmitter has an assigned time slot in which the respective transmitter is allowed to transmit.

According to another embodiment, each sensor node in the plurality of sensor nodes, when not communicating in the sensor node's assigned time slot, operates in a low power mode. According to another embodiment, each sensor node in the plurality of sensor nodes communicates to the plurality of communication nodes on a predetermined frequency. According to another embodiment, no two adjacent router nodes in the plurality of router nodes transmit on the same communication channel.

According to another embodiment, the plurality of router nodes determine the location of at least one of the plurality of sensor nodes by detecting signal strength. According to another embodiment, the plurality of router nodes and the plurality of sensor nodes are adapted to transmit information using a plurality of communication channels, wherein each transmitter has specific time slots in which to transmit information. According to another embodiment, the system is adapted to dynamically assign time slots for each of the transmitters.

According to another embodiment, the system further comprises a check-in system that assigns at least one of the plurality of sensor nodes to the monitored subject, the check-in system including a reader that is adapted to scan an identifier associated with the at least one sensor node, and to create a record of an association between the at least one sensor node and the monitored subject. According to another embodiment, the sensor is adapted to determine the location of at least one of the plurality of sensor nodes based on detection of one or more of the plurality of communication nodes in the wireless mesh network. According to another embodiment, the determination of the location is determined responsive to detected signal strength of the one or more of the plurality of communication nodes in the wireless mesh network.

According to another embodiment, the management system is adapted to determine an altitude of at least one of the plurality of sensor nodes. According to another embodiment, the management system is adapted to determine a location within a worksite of a monitored subject associated with the at least one sensor node based on a detected altitude of the at least one sensor node and a geographic location of the at least one sensor node. According to another embodiment, the management system stores for a worksite, a map of signal strengths and altitudes to particular worksite locations.

According to another aspect, a sensor is provided comprising an element that is adapted to attach the sensor to a monitored subject; and an element that is adapted to sense if the sensor is removed from the monitored subject. According to another embodiment, the element adapted to sense includes a proximity sensor. According to another embodiment, the element adapted to sense includes a switch integrated into the element adapted to attach the sensor to the monitored subject.

According to another embodiment, the sensor includes a processor adapted to detect a plurality of workplace events occurring to the monitored subject within a workplace. According to another embodiment, the sensor further comprises at least one of a plurality of elements comprising at least one accelerometer, a gyroscopic element, and a pressure sensor. According to another embodiment, the sensor further comprises a processor adapted to store event data relating to the sensed removal of the sensor from the monitored subject.

According to another embodiment, the processor is further adapted to send an event message including the event data to an event monitoring entity. According to another embodiment, the event monitoring entity is adapted to send an alert responsive to receipt of the event message. According to another embodiment, the sensor is adapted to detect one or more false events. According to another embodiment, the one or more false events includes at least one of a group comprising a sensor drop event and a sensor throw event.

According to another embodiment, the sensor further determines whether it is attached to an animate or inanimate object. According to another embodiment, the sensor further comprises an altimeter and a proximity sensor. According to another embodiment, the sensor, in determining if the sensor is removed from the monitored subject, employs one or more of a group comprising, jump detection, motion integration, altimeter analysis, impact detection, rotation analysis, post-fall analysis, and proximity sensor analysis. According to another embodiment, the sensor is further adapted to detect if the monitored subject is wearing more than one sensor.

According to another embodiment, the sensor is assigned to a specific monitored subject, and the sensor is adapted to detect if the sensor is attached to a subject other than the specific monitored subject.

According to another embodiment, an equipment sensor is provided, comprising: a mechanical interface configured to attach the equipment sensor to a piece of equipment; a proximity sensor configured to detect a presence of an operator within a range of the piece of equipment; at least one altimeter adapted to detect an altitude of the piece of equipment; at least one accelerometer adapted to detect motion of the piece of equipment; and a wireless network interface adapted to communicate data to an external system, the data comprising at least one of a group of information including: the altitude of the piece of equipment; the presence of the operator of the piece of equipment; and the motion of the piece of equipment.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

FIG. 8A shows an example message format according to various aspects of the present invention;

FIG. 8B shows an example admin block message according to various aspects of the present invention;

FIG. 8C shows an example beacon block message according to various aspects of the present invention;

FIG. 8D shows an example router block message according to various aspects of the present invention;

FIGS. 13-24 show several management interfaces according to various aspects of the present invention;

DETAILED DESCRIPTION

According to one implementation, a system is provided that is capable of monitoring subjects and equipment throughout the workplace. For instance, the system may include a monitor having various sensing capabilities that may be assigned to a monitored subject, the monitor being capable of recording various parameters that are personal to the worker. For instance, it is appreciated that there may be a sensor that can be attached to the monitored subject (e.g., at the belt line) that is adapted to monitor certain parameters associated with the worker's environment. As discussed, according to one embodiment, the belt line of a worker (or other center of mass location) may be beneficial for monitoring the location of the worker, detecting accurately slip, fall, and other events, and avoiding false events. For instance, a sensor assigned to the monitored subject may be capable of determining the location of the subject, along with motion, impacts, altitude, and other environmental parameters that could affect the health or other condition of the worker. Further, it is appreciated that it may be helpful to record and visualize various information from individual or a collection of workers that are obtained through the monitoring function.

In another instance, the system may include an equipment monitor having various sensing capabilities that may be assigned to a piece of equipment, the equipment monitor being capable of recording various parameters associated with the piece of equipment. For instance, the equipment monitor may be attached to the piece of equipment and may monitor certain parameters associated with the piece of equipment's environment. The equipment monitor may be capable of determining the location of the piece of equipment, along with motion, altitude, and other parameters that may affect the state or condition of the piece of equipment. Further, the equipment monitor may be capable of analyzing these parameters using a set of programmable coefficients and thresholds to determine the operating mode or state of a particular type of equipment. The equipment monitor may be located on the piece of equipment in a location such that the equipment monitor may determine if an operator is present at the piece of equipment. The equipment monitor may emit a Radio Frequency signal which may be receiver by a sensor worn by a worker such that the worker's sensor can determine relative proximity to the equipment sensor. Further, it is appreciated that it may be helpful to record and visualize various information from individual or a collection of pieces of equipment that are obtained through the monitoring function.

Figure 1:
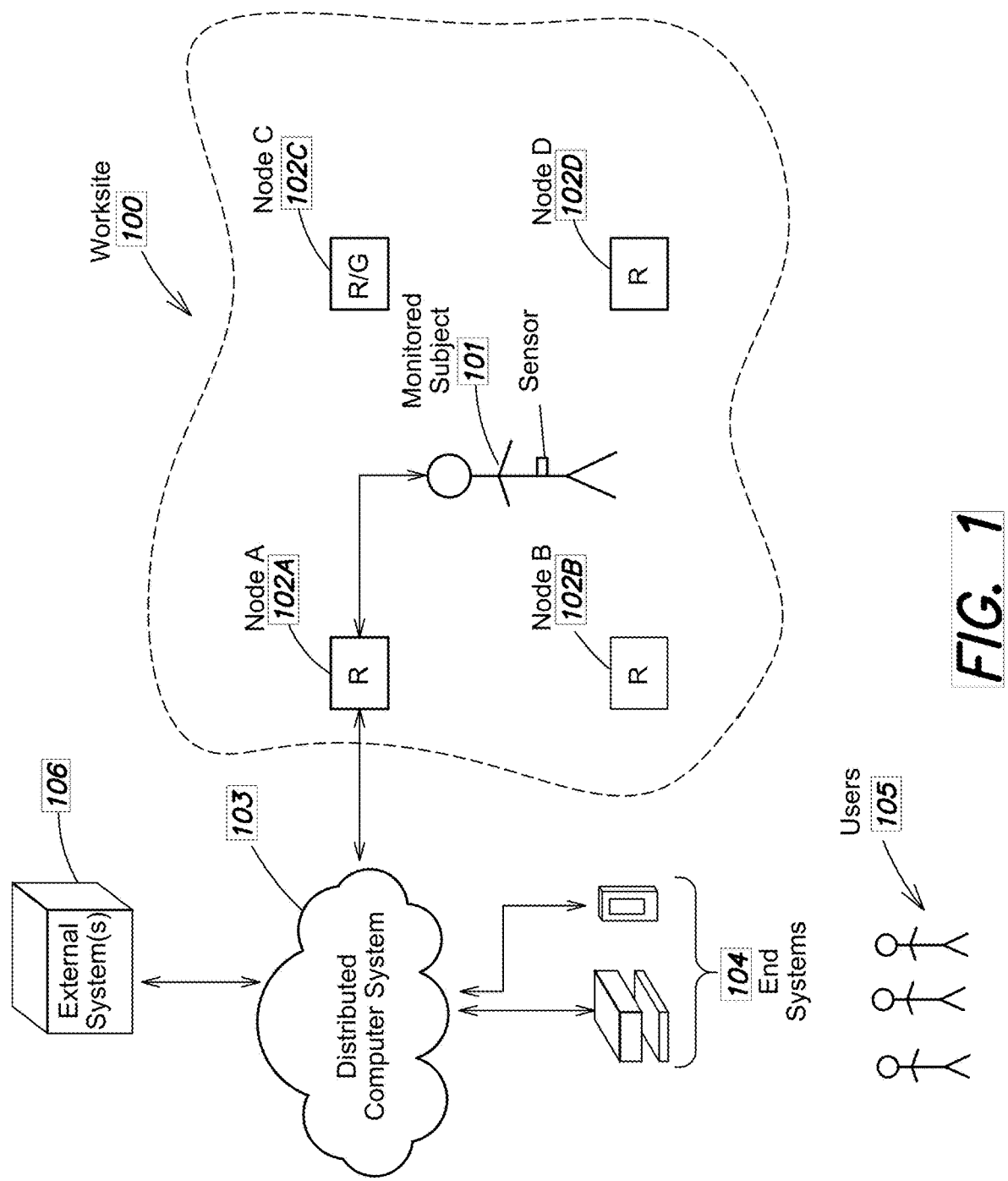
FIG. 1 shows a block diagram of a distributed computer system capable of implementing various aspects of the present invention.

FIG. 1 shows a block diagram of a distributed computer system 103 capable of implementing various aspects of the present invention. In particular, distributed system 103 includes one or more end systems 104, one or more nodes (e.g., nodes 102A-102D) configured in a wireless network, and one or more sensors assigned to monitored subjects (e.g., monitored subject 101). Some or all of these entities may be coupled through a one or more communication networks, such as by a wireless network, the Internet, and the like.

Generally, users such as a managing user at a particular worksite (e.g., users 105 at worksite 100) may access a management program through a client application that is executed on one or more of end systems (e.g., end systems 104). End systems 104 may include, for example, a desktop computer system, mobile device, tablet or any other computer system having a display.

As discussed, various aspects of the present invention relate to interfaces through which the user can interact with a management system (e.g., management system 101) to monitor subjects and equipment and perform management functions using their monitored data. To this end, a client application may be provided that may include one or more interfaces through which management users access the distributed computer system 103. Other applications may be provided that permit management users to assign sensors to monitored subjects and equipment at the worksite, and to retrieve and reassign sensors after a particular monitored subject has left the worksite or a piece of equipment is no longer in use. Some system aspects relate to monitoring workers and equipment that travel from one site to another as well.

Further, sensor data including events, indications of the location of an event, the time at which an event occurred, and any parameters associated with that event may be communicated through a communication network to the distributed computer system (e.g. computer system 103). In one embodiment, a logical location (e.g., a specific room on a specific floor of a building) may be inferred by the system, responsive to an altitude of the sensor, and determined location of the user or the piece of equipment (e.g., based on relative position of the sensor to one or more fixed locations). As discussed, the communication network may be a wireless network that is configured and arranged on a particular worksite (e.g., worksite 100). In one implementation, the wireless network may be constructed of a number of wireless nodes (e.g., nodes 102A-102D) that communicate together to form a mesh-type network.

According to one embodiment, a sensor associated with a monitored subject or piece of equipment may experience certain environmental parameters within the workplace, and may store events within a memory of the sensor device. In one embodiment, the sensor periodically communicates with a computer system (e.g., distributed computer system 103) to transfer event messages. Such event messages may be received and stored within one or more storage elements of the distributed computer system. Information associated with those events may be presented, for example, within a management interface, within an event message sent to management users, and/or sent to one or more external systems (e.g., a resource planning system).

Figure 2:
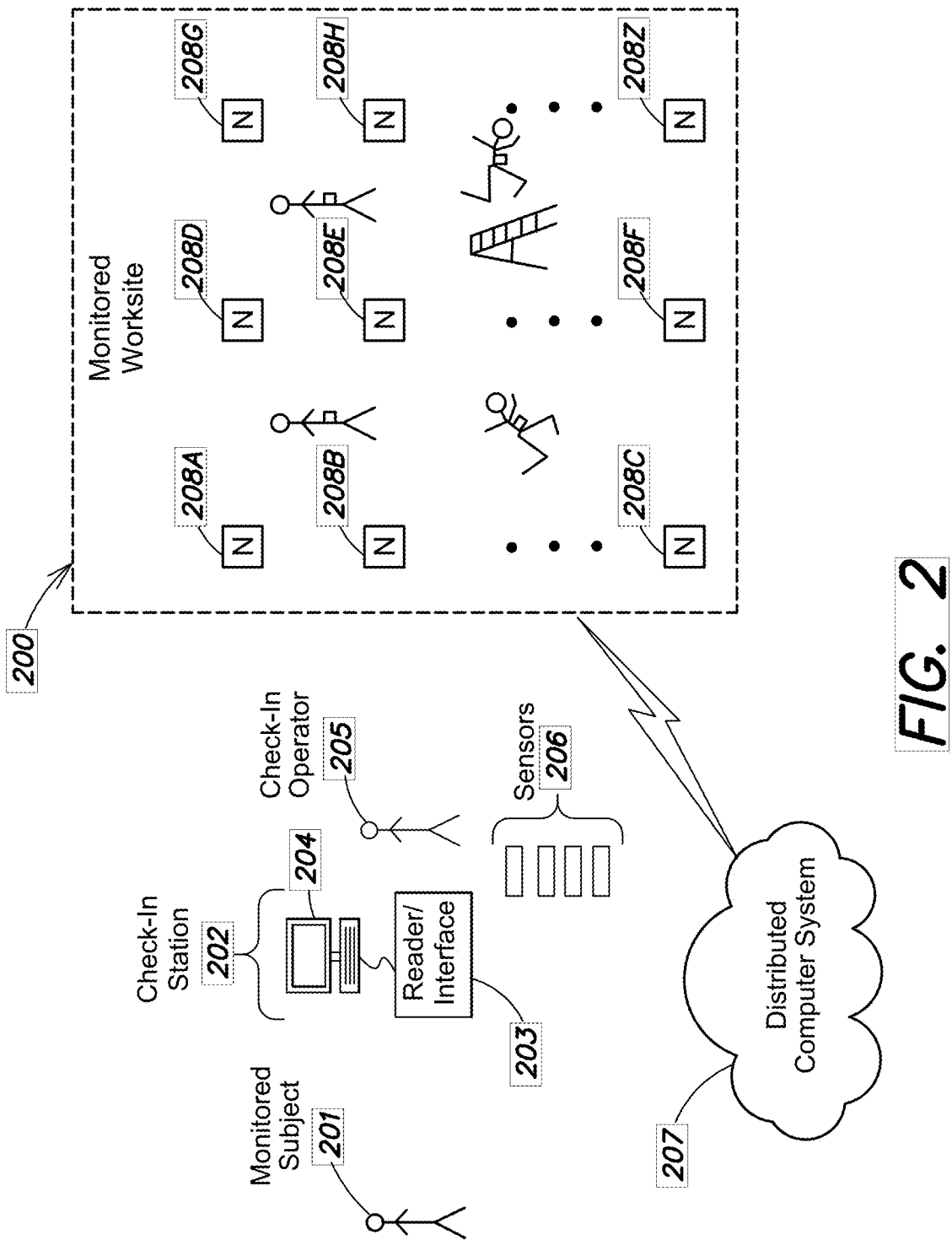
FIG. 2 shows an example check-in station according to one embodiment of the present invention.

FIG. 2 shows an example check-in station (e.g. check-in station 202) according to one embodiment of the present invention. In one embodiment, a check-in station may be provided that permits one or more check-in operators (e.g., operator 205) to associate monitored subjects (e.g., monitored subject 201) with respective sensors (e.g., sensors 206). To this end, check in station 202 may include one or more computer systems (e.g., system 204) having one or more management interfaces that allow the check-in operator to associate a sensor with a monitored subject. In one implementation, system 204 includes a reader/interface 203 that has the capability of identifying sensors individually during the check-in process. For instance, reader/interface 203 may identify a sensor using RFID.

System 204 may also be capable of identifying a monitored subject 201 at the worksite (e.g., worksite 200). For instance, the monitored subject may have one or more user identifications that can be read by one or more systems (e.g., system 204). Thus, an operator user may scan an ID of a subject or perform any other method for identifying the subject (e.g., receive biometric data, view a picture of the subject and visually identify him/her, or the like) and by scanning a sensor using a computer system at the checkpoint, the computer system associates the monitored subject with a particular sensor. A record identifying that particular monitored subject to be stored within the memory of the distributed computer system (e.g., distributed computer system 207). Thereafter, the system may monitor events and other parameters associated with the assigned sensor as the monitored subject operates within the monitored worksite.

As discussed earlier, a wireless communication network may be configured on the worksite including one or more nodes (e.g., nodes 208A-208ZZ) that are interconnected within a mesh network. Monitored subjects (e.g., monitored subject 101) operating within the monitored worksite (e.g., worksite 200) encounter various conditions within the worksite, and their assigned sensor devices track and record events associated with those particular conditions. Further, the sensors communicate over the mesh network by communicating with one or more nodes which relay the messages to the distributed computer system (e.g., computer system 207). Distributed computer system 207 may include one or more management interfaces used for the purpose of monitoring users, events, and their associated data.

In one embodiment, the system is capable of supporting a worker or piece of equipment traveling between sites. For instance, the sensor may, according to one implementation, be capable of identifying and joining a mesh network at any one of multiple geographically distinct locations. Upon joining any network, all of the features of the sensor will be available, along with identification of the site's network to which the sensor is connected. The system may be associated (e.g., using a management system) to associate the sensor with multiple mesh networks, and when the sensor comes within a communication range of the network, the sensor automatically joins the network. This may be useful, for example, for a supervisory worker or other role that requires visits to multiple locations.

In another embodiment, the system is capable of supporting a worker or piece of equipment traveling between sites wherein events may be locally stored within the sensor along with location data. For instance, the sensor may, according to one implementation, be capable of storing alerts detected when not connected to the mesh network, or alternatively, transmitting them through an alternate network (e.g., cell phone network, Bluetooth, or other communication capability). The sensor may also be configured to transition to an unconnected mode when not in range of the mesh network (or any other network).

Figure 3:
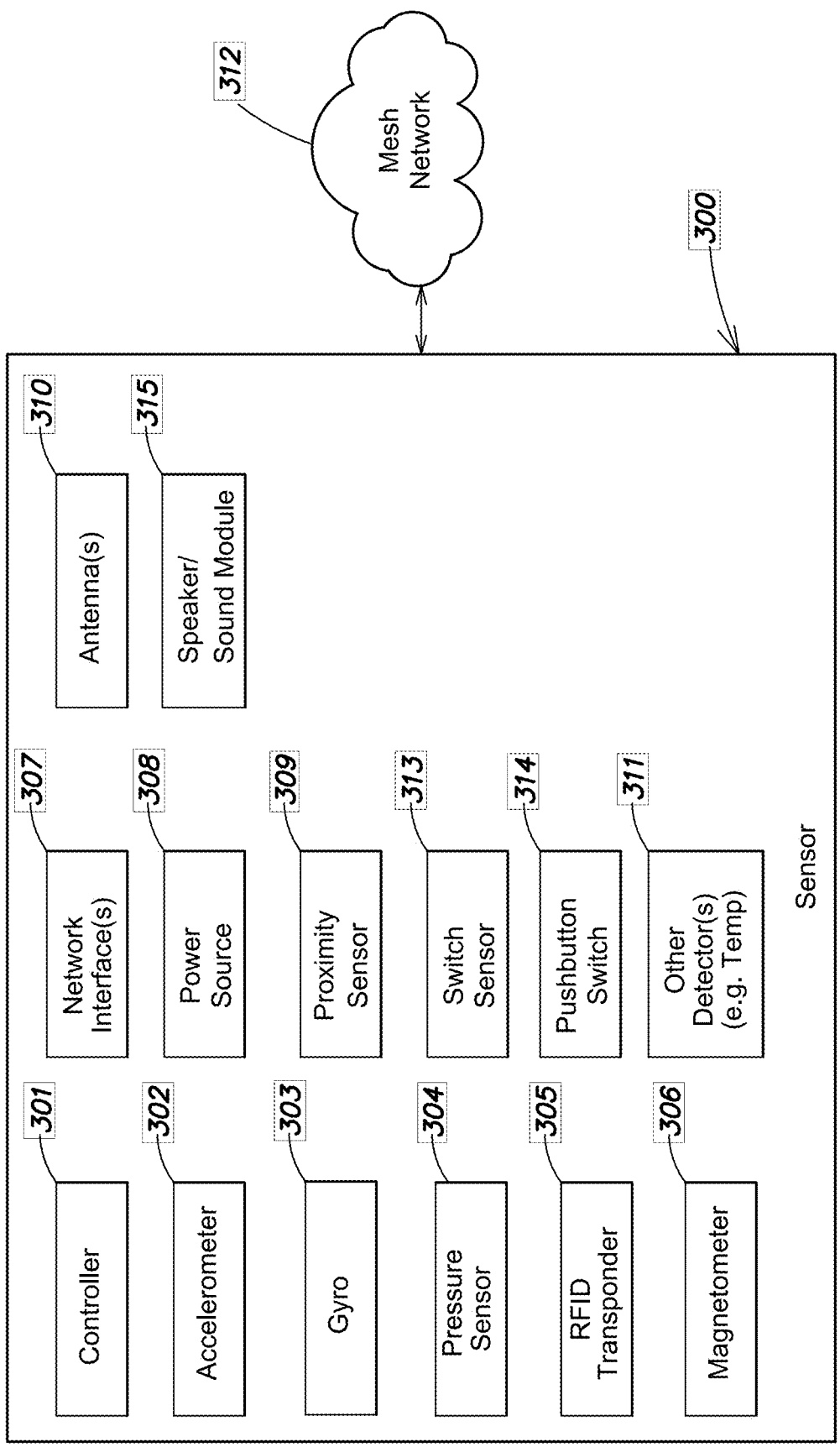
FIG. 3 shows an example sensor architecture according to one embodiment of the present invention.

FIG. 3 shows one embodiment of a sensor device according to various embodiments of the present invention. For instance, sensor 300 may include one or more components including a processing component that includes, but is not limited to, a controller 301 that is capable of processing data. Controller 301 may be, for example, a microprocessor, microcontroller or other processing entity that is capable of receiving event data, performing analyses of the data, and communicating information over one or more communication interfaces. Components may be coupled to the controller internal to the sensor using one or more connections, circuits, busses or other connection elements.

Device 300 may also include one or more sensing elements, such as accelerometers (e.g., accelerometer 302), gyros (e.g. Gyro 303), pressure sensors (e.g., pressure sensor 304), magnetometers (e.g., magnetometer 306), or any other detector type (e.g., other detectors 311 (e.g., temperature)). As discussed, device 300 may be RFID capable, and to this end, device 300 may include an RFID transponder (e.g. transponder 305). When scanned, the RFID transponder may provide an identifier of the particular sensor device (e.g., device 300). The RFID transponder or tag may be an active tag, a passive tag, battery-assisted passive tag, or other implementation. The RFID function can be implemented in conjunction with or separate from other sensor functions. In an alternative embodiment, RFID capability may be built in to one or more of the mesh network nodes, and a control on the node may be provided that permits a sensor to be admitted to the network without a separate computer system (e.g., at a check-in location). In such a case, the network node, after scanning the RFID of the sensor, sends a message over an administration channel to admit the sensor to the network.

Device 300 may also include one or more network interfaces (e.g., network interface 307) through which the sensor device communicates information to other systems. To this end, sensor device 300 may also include one or more antennas 310 that permit the sensor to communicate wirelessly to one or more mesh nodes within the mesh network (e.g., mesh network 312). System 300 may also include a power source 308, such as a battery. In one model implementation, the system is architected to minimize the amount of power drawn on the battery such that the sensors need not be recharged at the worksite.

According to another embodiment, sensor 300 includes a proximity sensor 309 that is used to determine whether or not the sensor is being worn by an actual human subject. For instance, in a situation involving fraud, a sensor may be purposefully dropped, thrown, or tied to some other object that experiences certain environmental conditions. To avoid false alarms, workplace fraud, and other indications not involving the assigned monitored subject, system 300 may have a proximity sensor that is capable of nullifying an alert, or otherwise qualifying information that may be provided by the sensor. Such a proximity sensor may include, for example, one or more detection elements such as an IR or capacitive proximity sensing element as known in the art. In certain cases, it may be beneficial to place the sensor device in a low power mode until the sensor is actually attached to a user in the prescribed manner and to eliminate false indications and reporting.

In addition to or in substitute for the proximity sensor, sensor 300 may include a switch integrated into the sensor that detects when the sensor is attached to the user. In one implementation, the switch is incorporated within a clip of the sensor (e.g., switch sensor 313) that attaches the sensor to the user. The switch is configured to provide an indication when the clip is attached to something. Such a switch can be used for power saving, as the sensor may be transformed to a low-power mode when the clip is not attached. Further the use of the switch may be recorded, and can be used for fraud prevention, such as the case when a fall is detected. For instance, if the device is unclipped immediately before an event, it raises questions about the authenticity of that event. In one implementation, the sensor is capable of detecting and recording detachments of 100 milliseconds or more, so that when the device is moved from one person (e.g., to another person or object), the removal is detected and recorded. For instance, even if the sensor is quickly removed for one person to another, or from a person to an object, the device may store an event in the sensor and/or communicate that event to the system (e.g., a supervisor, management system, etc.) via a message sent on the mesh network.

According to another embodiment, the sensor may include a switch (e.g., pushbutton switch 314) that permit the user/wearer to perform a manual alert. In particular, the user may push a button on the sensor to alert others of a safety issue. For instance, depending on the settings associated with the button, an activation of the button could indicate a witnessed safety violation, an emergency condition, or other workplace situation. According to various embodiments, certain button selection patterns may be used by the user to create different types of manual alerts. For instance, a single press may be a safety alert, a triple press may be an emergency situation, among others.

Also, according to another embodiment, the sensor may include a speaker, sound module, transducer, or other type of sound generating component to generate audio alerts. For instance, in one embodiment, the sound-generating component may be configured to generate sounds upon certain conditions (e.g., pressing of a pushbutton, making a chirp sound, etc.). Other capabilities may be provided by similar sound-generating component, such as providing a centralized evacuation alert, where an action taken by a supervisor or computer system can cause all sensors on a site or sublocation to start alarming. In another implementation, the system may be configured to allow for a supervisor's sensor to make an audible alert when any worker experiences an event. In such a case, the supervisor may check their sensor or other computer system (e.g., a mobile device) for details regarding the event. Further, responsive to a visual (e.g., LED) and/or audio alert, the wearer may use a feedback component such as a push button to acknowledge an event and communicate information to the system. For instance, the sensor may include an LED indicator when a push button is pressed. In the case of an emergency alert, the LED may be configured to indicate a different color/pattern when the alert has been acknowledged. For example, a message may be sent to the sensor if acknowledged, indicating to the wearer that help is on the way. The sensor may be configured to provide an alert acknowledgement that is audible as well. It should be appreciated that one or more statuses of an alert may correspond to one or more indicators, or indicator combinations.

Also, as discussed, the sensor may include a pressure sensor (e.g., pressure sensor 304) used to assist in determining the altitude of the sensor. In particular, the wearer's altitude may be determined by comparing the barometric pressure as measured by the wearer's sensor with pressure measured by one or more nearby mesh network nodes. According to one implementation, the altitude of particular network nodes is a known entity (e.g., they can be determined a priori and may be stored in memory of the node devices). Such information may be determined a priori during installation, or may be determined using a pressure detection element located within a network node (e.g., within a router).

These known heights may be used to determine what floor of a structure the user is located using a table (or other date structure) including heights for each floor, the data being stored in a database accessible through a communication network. An absolute altitude may be determined by comparing the sensor's pressure measurement to the values stored in the database. Once an altitude is determined, a floor of a particular structure may be determined based on a comparison with the pressure values of the known node devices. Once a floor is determined, possible regions/zones may be determined on that floor using relative signal strengths to mesh nodes. By using both altitude and relative signal strengths, a more accurate location within the worksite may be determined.

In a more detailed embodiment, the sensor (e.g., sensor 300) may include a low-power microcontroller. Such a microcontroller may include one or more radios (e.g., a radio operating in the 900 MHz band). The sensor may include a 6-axis MEMS accelerometer and gyroscope to perform detection of events. The sensor may include other components, such as, for example, rechargeable batteries, barometric sensor, a capacitive proximity sensor, RFID transponder, among others.

Figure 4:
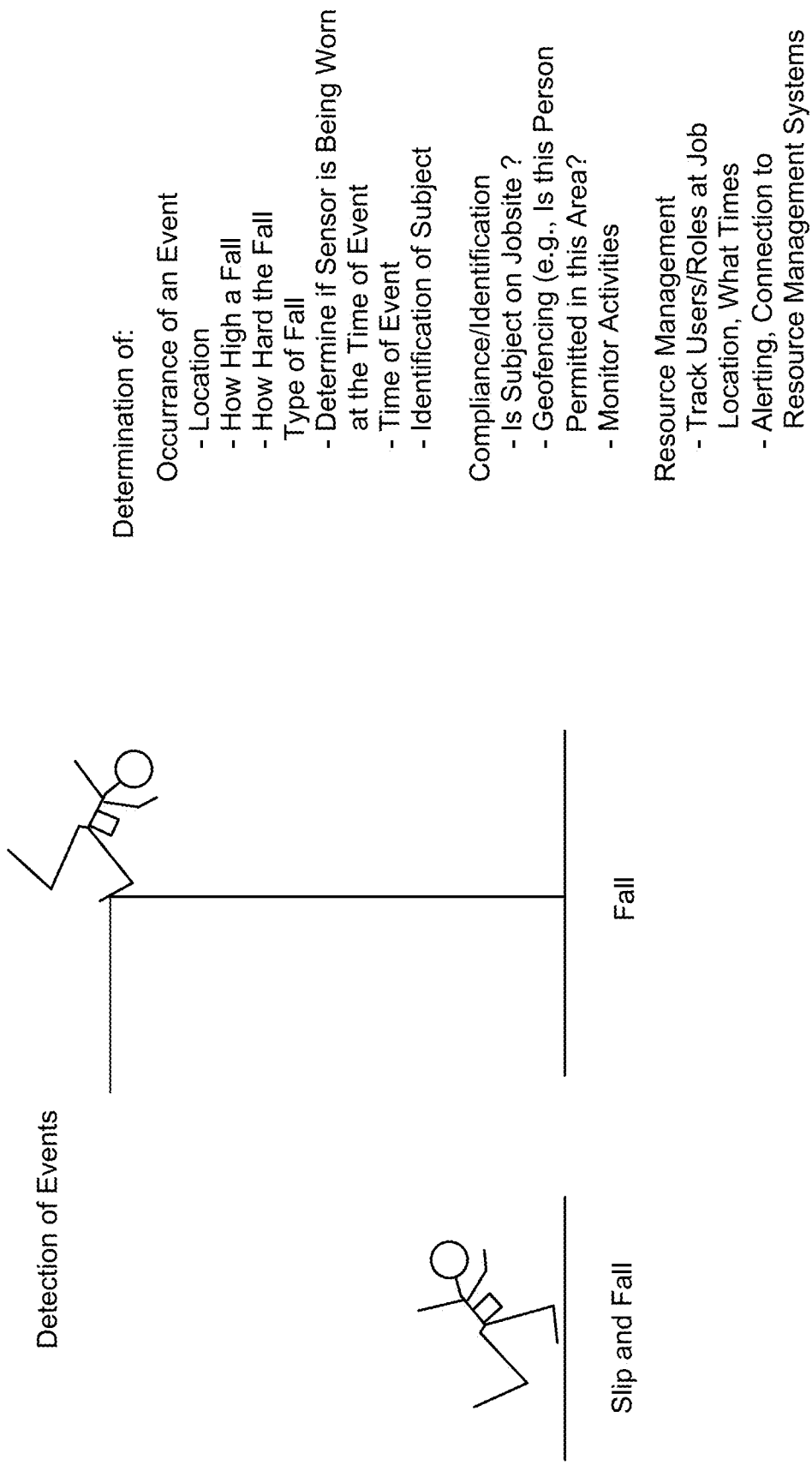
FIG. 4 shows example event management functions that the system according to various embodiments of the present invention may perform.

FIG. 4 shows example event management functions that the system according to various embodiments of the present invention may perform. For example, it would be beneficial to have a system that can determine whether a worker or other subject being monitored experienced a workplace accident or other condition. For instance, it would be highly advantageous to be able to detect, record, and alert for workplace accidents such as slips and falls, falls from ladders or other height conditions, among other types of events.

With each event, the sensor may determine whether an event occurred, along with parameters associated with that event. For instance, the sensor may indicate the location of the event. This may be determined, for example, by determination that a particular sensor is within range of a particular router node. Location may also be interpolated based on relative signal strength received from one or more router nodes. Location may also be determined through triangulation or some other method. It may be useful to have real-time alerts for certain accident types that includes location information, as emergency personnel may be dispatched to the identified location in less time. To this end, the system may also be configured to communicate with emergency systems (e.g., a 911 system) for the purpose of receiving emergency service in a more expedited manner.

The sensor may also be capable of determining how high and how hard a particular fall was associated with an event. The sensor may be capable of determining the type of fall (e.g., forward, backward, number of rotations or altitude during the fall, etc.) based on parameters detected by the accelerometers and/or gyroscopic devices within the sensor.

The sensor may also be capable of determining whether the sensor is being worn properly or at all at the time an event occurred. Such an indication may be used to eliminate false signals and/or alerting, or may be used to qualify (or disqualify) a particular reading or event.

The sensor may include a memory element that stores event data, along with a time at which the event occurred. Time information may be generated, for example, by a controller, and the controller may receive time indications from a centralized system (such that all sensors have the same or similar absolute time setting). Time settings may periodically be sent by system elements to synchronize time settings among the components and sensors. Sensors may also receive a centralized time setting upon admission to the network.

Also as discussed, each sensor is associated with a particular monitored subject, and this association may be used to identify the subject that experiences the workplace condition and/or generally monitor the subject. As indicated earlier, a secondary function of the system may include performing compliance and identification functions. For instance, it may be helpful to have a system that can verify whether the subject being monitored is actually at the jobsite, during the time that the subject is expected there. The system may also be helpful in performing a geofence function with certain areas of the jobsite. For example, there may be locations that have a certain level of security, have a dangerous condition, need a certain level of training, etc. and having a system that can track the location of users and alert on entry of the monitored subject to such locations would be advantageous. In one implementation, the system may include a management interface through which one or more geofence areas may be defined and/or monitored. Further, there may be a need to simply monitor locations of subjects at the workplace, and the system may be capable of providing this function. Further, because the system is capable of determining what workers are (or are not) on a particular jobsite, the system may also be used in the case of a sitewide emergency response where workers need to be accounted for, along with their locations.

Yet another set of functions the system could perform relates to resource management and tracking. For instance, it would be beneficial to be able to track and identify certain resources (e.g., roles such as a plumber) at particular job locations and to automatically record their presence there. In one example implementation, the system could send updated reports and/or alerts when particular parameters are triggered (e.g., exceeding the amount of allocated hours for plumbers for a particular job and/or job location in a defined period). Such information may be communicated to other systems, such as resource management systems, that provide tracking and budgeting functions for a particular job. For instance, a resource management system can measure the number of hours plumbers are located on a particular job, and can compare this measurement to a budgeted amount for a particular task. The resource management system may be configured to provide alerts and/or reports based on such information.

Figure 5:
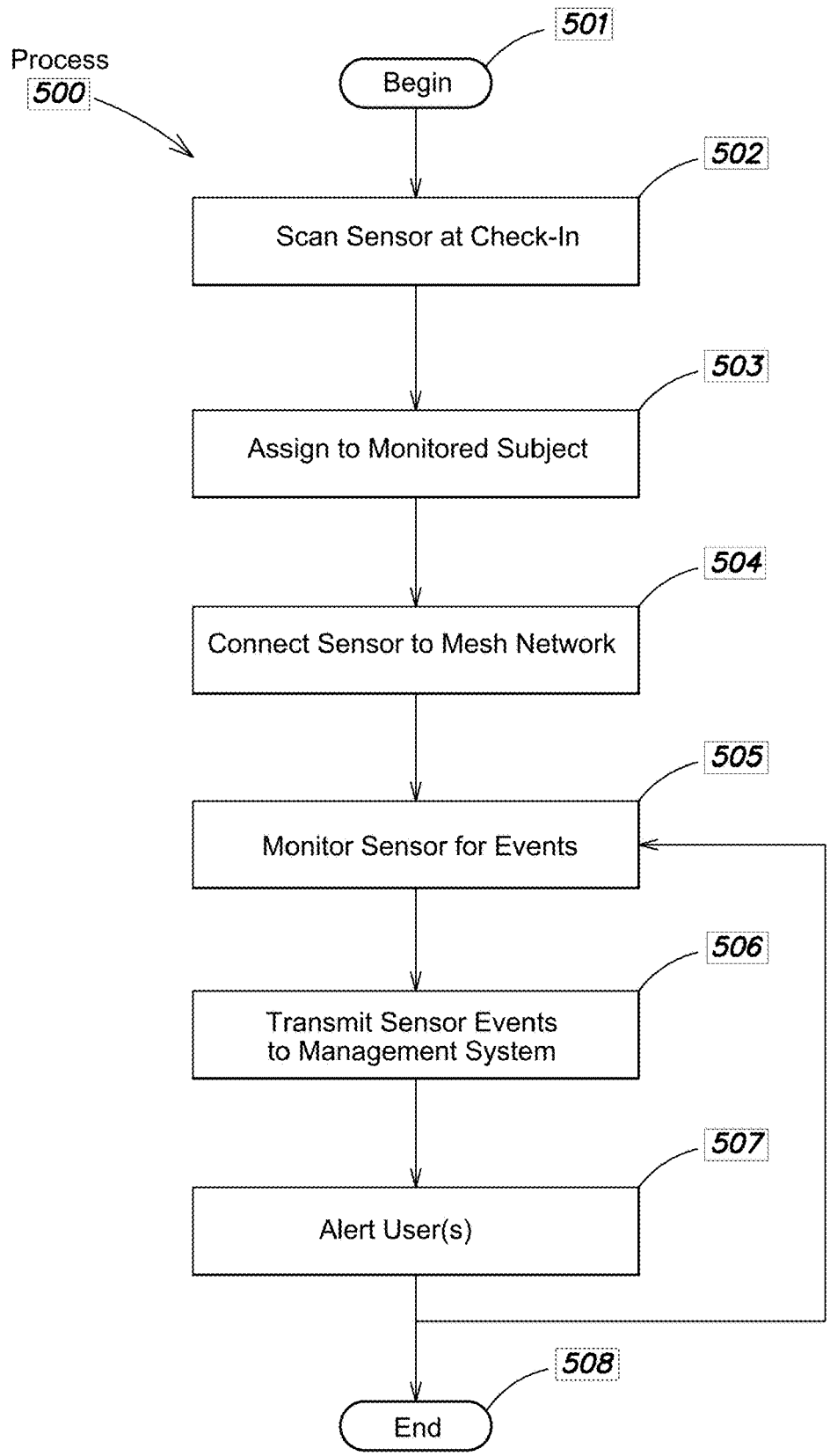
FIG. 5 shows an example process for managing sensor devices and workplace events according to one embodiment of the present invention.

FIG. 5 shows an example process 500 for managing sensor devices and workplace events according to one embodiment of the present invention. At block 501, process 500 begins. At block 502, the sensor is scanned at a check-in station as discussed above. For instance, a computer system assigned to a check-in station having a reader device can be used to identify a particular sensor (e.g., using an RFID reader). At block 503, the system assigns the sensor to a monitored subject. The worker may have some identification information (e.g., an ID badge) that can be scanned at the check-in site, and that can be associated with an assigned sensor.

At block 504, the sensor may be connected to the mesh network or otherwise admitted to the communication network. In one embodiment, a communication protocol may be used to assign the sensor to the network. In another example implementation, the network assigns the sensor to a particular timeslot for transmission of event data. The sensor may need other communication information, such as site identification information, radio channels being used at the site, network topology information, among other site communication information. Such information may be provided to the sensor by one or more nodes of the network, the site information being formatted within an administrative message communicated to the sensor over an administration channel.

After the sensor is admitted to the network, the system monitors the sensor for events at block 505. In one implementation, the sensor transmits events generated within a predefined period during its assigned timeslot. At block 506, the sensor transmits events to the management system. Optionally, the system may alert the user (e.g., at block 507) of particular events received from a particular sensor. The monitoring process is continually performed, with sensors being admitted and removed from the network in real-time.

Figure 6:
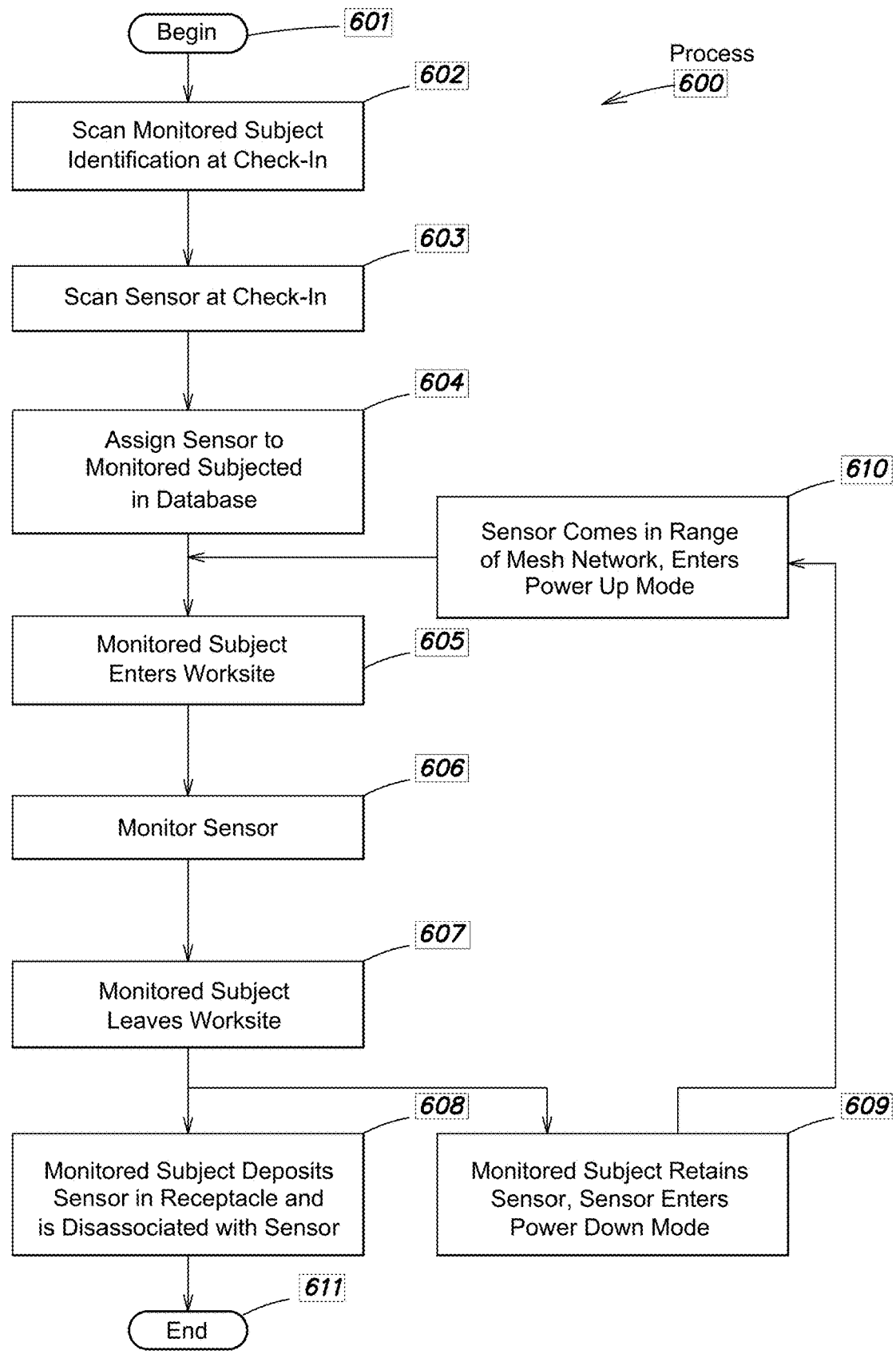
FIG. 6 shows another example process for operating sensors in a mesh network according various aspects of the present invention.

FIG. 6 shows another example process 600 for operating sensors in a mesh network according various aspects of the present invention. At block 601, process 600 begins. At block 602, system scans a monitored subject identification at a check-in location. For instance, a computer system at the check-in site be used to scan and ID badge or other identification from the monitored subject. Block 603, the system scans the sensor at the check-in site, by reading, for example an RFID tag associated with the sensor. At block 604, the system assigned to sensor to the monitored subject within the database.

At block 605, the monitored subject enters the worksite. At block 606, the system admits the sensor to the mesh network and monitors the sensor for the occurrence of events. In one implementation, a management system passively receives event and other status information from one or more sensor devices. When the monitored subject leaves the worksite at 607, the subject can return the sensor devices when they leave the jobsite, or the monitored subject may keep the assigned sensor without needing to revisit the check-in site.

In one example, the monitored subject may deposit the sensor in a receptacle at the worksite, and the sensor may then be disassociated with the monitored subject. Thereafter, the sensor may be reassigned to another monitored subject. Alternatively, the monitored subject may leave the worksite and retain the sensor. The sensor, after leaving the worksite and being out of range of the network may enter a power down mode (e.g., after a predetermined amount of time) at block 609. If temporarily out of range of the network, the sensor may still record event data for a predetermined amount of time, and may transmit the information when the sensor is readmitted to the network. At block 610, the monitored subject may return to the worksite and may come into range of the mesh network. The sensor may then enter a power-up mode and may be admitted to the network. At block 611, process 600 ends.

Figure 7:
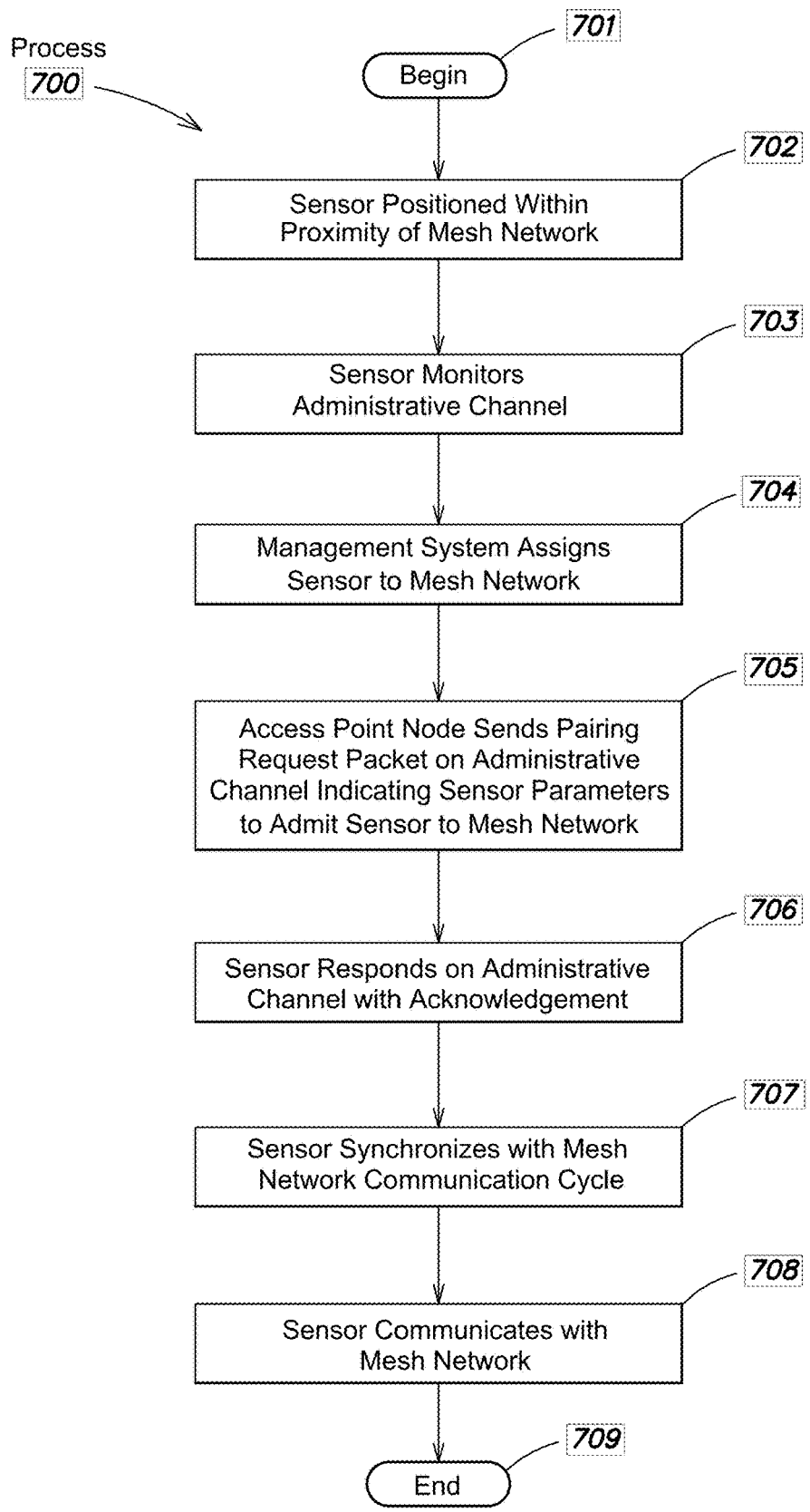
FIG. 7 shows an example process for admitting a sensor to a mesh network according to various aspects of the present invention.

FIG. 7 shows an example process 700 for admitting a sensor to a mesh network according to various aspects of the present invention. In particular, one aspect of the present invention relates to a process for admitting sensors to the mesh network. At block 701, process 700 begins.

At block 702, the sensor is positioned within proximity of the mesh network. In one embodiment, the system uses a special administrative channel to perform administrative functions with sensors, and uses the administrative channel to facilitate sensors joining the network.

At block 703, a sensor that has not yet joined the network monitors and administrative channel. At block 704, the management system assigns the sensor to the mesh network. This may be performed, for example, responsive to a computer system at a check-in point making an association between the sensor and a particular monitored subject (e.g., as an association between an ID badge and a sensor ID).

After assignment, an access point note sends a pairing request packet on the administrative channel indicating the sensor to be admitted to the mesh network (e.g., block 705). According to one embodiment, the administrative channel is operated at a low power setting in relation to general data transmission channels so that signals will not interfere between other nodes in the network. However, the signal is operated at a level that nearby sensors are able to receive the signal and be admitted to the network. Further, operating the administrative channel frequency at a relatively low power permits multiple check-in sites to be operated relatively close to one another.

In one embodiment, the pairing request packet may include information identifying the sensor such as a serial number, network identifier, or other indicator. The pairing request may also include information that identifies a communication slot assigned to the sensor that uniquely identifies the slot in which a particular sensor sends status messages. For instance, the pairing request may include an indication of a time offset from the start of a communication cycle. The pairing request may send other information such as timestamp information (e.g., to provide a system time setting for synchronization purposes), a common channel for communicating in the particular mesh network.

At block 706, the sensor responds on the administrative channel with an acknowledgement message indicating that the particular sensor has received its configuration. At block 707, the sensor synchronizes with the network communication cycle, and begins communicating with the mesh network at block 708, periodically sending status messages within its assigned timeslot. At block 709, process 700 ends.

Example Protocol

According to one embodiment, a protocol may be provided for communicating between nodes and sensors for monitored subjects and pieces of equipment. According to one aspect an RF wireless communication protocol is provided that includes a hybrid time-division/cellular approach to facilitating communication between a large number of sensors in a sensor network and a cloud-based server. Here, according to one implementation, the term cellular refers to the fact that the network is organized into cells, not a cellular telephone network such has 3G or LTE, although it should be appreciated that any type of network may be used.

In one implementation, the network protocol may be implemented as a specialized protocol operating over multiple channels in the 900 MHz ISM band. In one example, the protocol utilizes a Time Division Multiple Access (TDMA) scheme wherein each transmitter has specific time slots in which it is allowed to transmit. This arrangement allows large numbers of transmitters to share a single channel without interfering with each other.

The network protocol, according to one embodiment, also may be based around a periodic cycle. This cycle can be nominally 10 seconds in one implementation, but could be longer or shorter depending on the requirements for number of transmitters and maximum latency. The cycle may be further broken up into blocks, each of which provides a specific function to the system. Because, according to one embodiment, the sensors have information in advance when they need to receive beacons, they can keep their radios turned off much of the time, resulting in very low power consumption.

Nodes in the network can be three primary types:

Coordinator/Gateway—Coordinates communication activity within a cell and routes data from nodes in that cell to the cloud server (e.g., via the Internet). These nodes are powered externally and have some form of network connectivity (e.g., Internet). One coordinator in the network is designated the master and drives the timing for the entire network.

Router—Routers can be used as most of the fixed-position nodes in the sensor network. In one implementation, router nodes are responsible for providing the mobile nodes with location data and relaying data to the Gateway nodes. Routers are placed within communication range of a Coordinator/Gateway. In one implementation, router nodes are capable of being battery-powered, allowing for easy deployment.

Mobile Nodes—The mobile nodes, according to one implementation, router nodes include the sensors. According to various embodiments, these sensors are worn by personnel, and attached to pieces of equipment, moving around the job site. They report status, location, and events to the nearest router or gateway node. The nearest router or gateway node may be determined, for example, by comparing values of Received Signal Strength Indication (RSSI) as measured from the perspective of each sensor. The nearest router or gateway node may be selected as the entity with the highest value of RSSI.

The design parameters met by at least one version of this protocol are as follows:
- Support for 500 SIMs
- Support for 180 fixed nodes (covering over 18 million square feet)
- Update SIM location and status every 10 seconds
- Retrieve event details within 20 seconds
- Support a sustained event rate of 1.5 events per second per cell
- Low SIM radio duty cycle (<0.5% while in active use)
- Link up to 2 SIMs per second at gate stations.
- In one implementation, the system continues to operate during a
- network outage (with local storage of events in Gateway nodes)

In one implementation, the system may implement the following specifications:
- RF data rate of 5 kB/s (50 kBaud base rate minus overhead)
- AP range of 100 yards Protocol Design Communication Cycle According to one embodiment, the protocol is based on a time-division scheme using a 10-second cycle. This cycle is broken up into blocks, each of which has a specific purpose and is further broken into timeslots. FIG. 8A shows blocks within the 10-second cycle, and as shown, the cycle is broken into alternating Normal Blocks and Admin Blocks. Normal blocks are used for most of the functions of the system, and are transmitted on the operating channel selected for the site. According to one implementation, Normal Blocks 800 are 950 ms long. Admin Blocks are used for pairing of SIMs, always transmitted on channel 0, and are 50 ms long. In one implementation, block reserves a 10 ms window at the end for changing channels.

Channel Assignment and Use

In one implementation, the network uses multiple channels to allow adjacent cells to operate independently while allowing mobile nodes to move between cells seamlessly. In one example system, the following channels are assigned:

Admin Channel—According to one embodiment, this is hardcoded (e.g., to a designated channel such as channel 0), and is used only for pairing SIMs with the network. The admin channel may be used at reduced signal strength to prevent interference with other nearby deployments.

Common Channel—This is the channel used by all nodes in the network during the Beacon, Router and SIM blocks. This channel may be assigned to the network during deployment, and passed to the SIMs during pairing.

Cell Channel—Each cell is assigned a channel such that no two adjacent cells have the same channel. Some cells may use the Common Channel as their Cell channel.

For example, according to one implementation, a network with square cells would need four (4) cell channels to operate, and a network with hexagonal cells would require three (3) cell channel.

Packet Header

In one implementation, each packet sent in a timeslot contains a standard header comprising the following fields:
- Project ID (1 byte)
- Packet Length (2 bytes)
- Packet Type (1 byte)
- Source ID/status flags (2 bytes)

Note that, according to one embodiment, destination ID information is not part of the header, as many of the packets in the system are considered to be broadcast. Certain packet types may add a destination ID, however. In addition, according to one implementation, each packet contains a 2-byte CRC.

Admin Block and Pairing

According to one protocol implementation, when a sensor (e.g., a SIM) is first activated (e.g., powered on, woken from sleep, etc.), the SIM starts listening continuously on channel 0. The normal process includes scanning the SIM at the Gate Station, and which causes the AP to send a pairing request packet in the next admin block. The pairing request, according to one embodiment, contains the following:
- Identifier of activated SIM
- Time offset from start of cycle
- System Timestamp
- Common channel
- Site number of APs
- SIM timeslot assignment The SIM responds with an acknowledgment, and then synchronizes to the communication cycle (using the time offset in the pairing request) and begins transmitting during its SIM timeslot. An example implementation of an admin block 810 is shown in FIG. 8B. The admin block contains timeslots for two pairs of pairing requests/responses. Both the request and response have room for up to 45 bytes. In one embodiment, the admin channel 0 communication is performed at a reduced power level, and that no two gates are within range of each other to cause interference.

Beacon Block

According to one embodiment, the Beacon Block supports the following functions:
- Synchronization of communication cycle
- Allow SIMs to determine a closest Router node According to one implementation (e.g., beacon block 820 as shown in FIG. 8C), the beacon utilizes very short packets to minimize the amount of time the SIM needs to have its receiver active. Each packet, according to one embodiment, comprises the following information:
- Project ID (1 byte)
- Router ID (1 byte)
- Status flags (1 byte)
- Checksum (1 byte)

According to another implementation, the SIMs listen to the beacon block to determine the closest router. Once the closest router is located, the SIM needs only to listen for beacons from that router and its neighbors. The list of neighbors and other information about the router is determined by listening to the router block.

Router Block

According to one embodiment the Router Block allows SIMs to gather information about network topology which is required for efficient use of the network. FIG. 8D shows one example implementation of the Router Block 830. The block is divided into timeslots for up to 180 Router or Gateway Nodes. During the Router Block, each router transmits information regarding the topology of the network:
- Header/CRC (8 bytes)
- Cell ID/timeslot (1 byte)
- Cell Channel (1 byte)
- Distance from Master (hops, 1 byte)
- Neighbor router IDs (8 bytes)

The timeslots allow for 1 millisecond of "dead air" between timeslots of different transmitting devices to allow for jitter. This feature may be consistently implemented throughout the protocol.

The Routers monitor each other during the Router Block as well. This allows resynchronization of both the communication cycle and the system timestamp. A master router (e.g. Router 1) may, in one implementation, to be considered the master, and Routers should use the timing information from the router with the lowest master distance they receive from to allow propagation through the network.

SIM Block

Figure 8E:
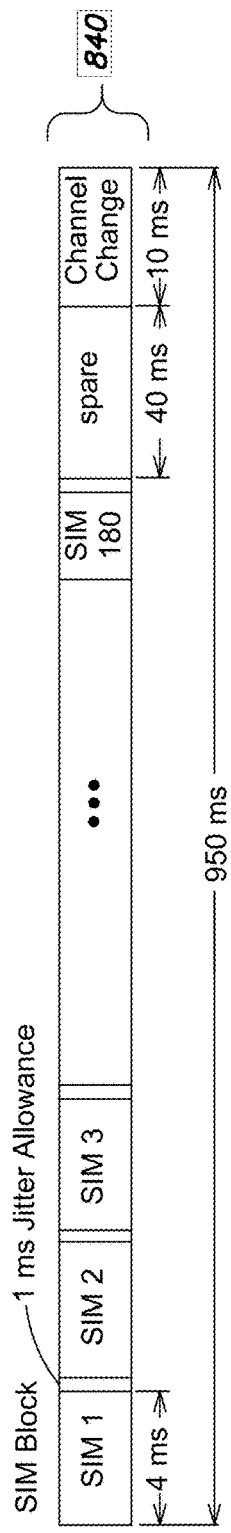
FIG. 8E shows an example SIM block message according to various aspects of the present invention.

In one implementation, there are 3 SIM blocks in the cycle, each of which provides timeslots for 180 SIMs to transmit their status. FIG. 8E shows the timeslot division of the SIM Block 840. In one implementation, the SIM packets are short (up to 20 bytes). The following information is contained in each:

Header/CRC (8 bytes)
Event count (1 byte)
Battery level/status (1 byte)
Nearest routers/RSSI values (4 routers, 8 bytes)

Status Relay Block

Figure 8F:
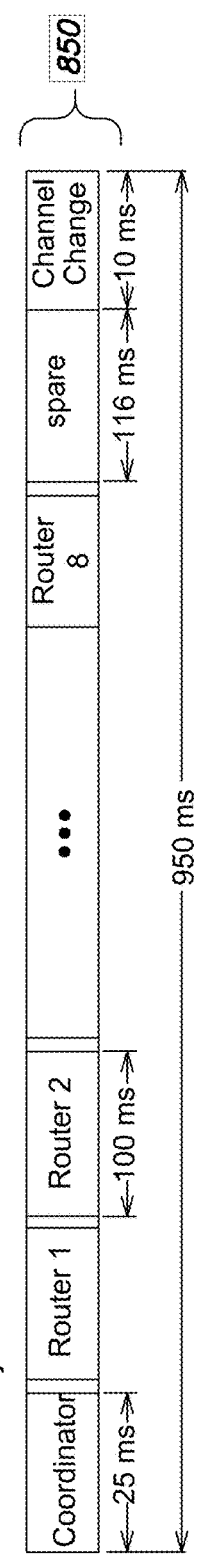
FIG. 8F shows an example status relay block message according to various aspects of the present invention.

According to another embodiment, a Status Relay Block allows each of the router nodes in a cell to relay SIM status and routing information to the cell's Coordinator node. Within the Status Relay Block (e.g., block 850 as shown in FIG. 8F), the Coordinator first sends a packet containing any commands for the routers. According to one implementation, the command may include commands that control the routers to change network organization (e.g. join a different cell) or power down for a period of time, or perform other functions. Following the Coordinator timeslot, each Router in the cell transmits a packet in its designated timeslot containing its own status and the SIM statuses it has received in the current cycle:

Header/CRC (8 bytes)
Status/Battery (4 bytes)
SIM Status (up to 40 SIMs):
SIM ID (2 bytes)
Nearest Routers/RSSI Values (4 routers, 8 bytes)
Battery level/status (1 byte)
Event count (1 byte)

In one example implementation, if more than 40 SIMs report to a single Router, not all statuses are able to be sent to the coordinator in the current cycle. One possible way to mitigate this is to have the router alternate between ascending and descending ordering of SIMs, so that any missed SIMs should be reported in the following cycle. In addition, adjacent routers could use opposite ordering, to improve the chances that one of the routers would be able to report the status. By the end of the Status Relay Block, the coordinator has (e.g., stored in memory) the current status and event count for all SIMs within the cell, which it can then use to allocate timeslots and routing for the Event Block.

Event Block

Figure 8G:
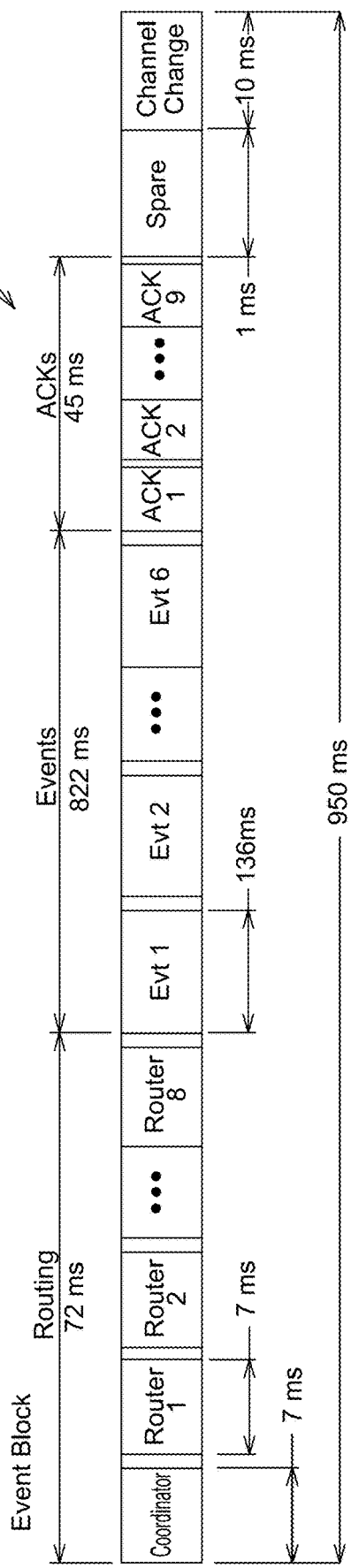
FIG. 8G shows an example even block message according to various aspects of the present invention.

In one example implementation, the communication cycle contains 4 event blocks, each of which can hold 6 events. In one network arrangement, events generally require two hops to make it to the Gateway, so this arrangement provides for a sustained rate of 1.2 events per second within each cell. FIG. 8G shows an example breakdown of an Event Block 860 according to one implementation. The first portion of the Event Block is dedicated to routing, where the event timeslots are allocated to SIMs and Routers in such a way to allow event packets to be relayed to the Gateway. First the Coordinator sends a routing packet, which is then repeated by each of the routers so that all nodes get the information.

The routing packet, according to one example, comprises a Message ID, Source ID, and Destination ID for each of the six (6) event timeslots. This information indicates to the nodes in the system when they should be receiving and transmitting to relay event packets from SIM to Gateway. The next portion of the Event Block is the event timeslots.

In one implementation, each event timeslot has room for a 680 byte payload. This is sufficient, for example, to handle 100 samples on each of the accelerometer and gyro axes, forty (40) samples from the altimeter, plus additional timestamp, initial conditions, location, and status information.

The final portion of the Event Block is the ACK timeslots, in one implementation. In one example, each ACK timeslot contains flags for the acknowledgment of events that were transmitted. First the coordinator sends its ACKs, and then each of the routers relay these ACKs to all SIMs in the cell. This block provides significant room for expansion as the block allows routing of arbitrary packets between nodes within a cell. For instance, this may be used for initial autoprovisioning of the network, reconfiguration of the nodes, and/or support of new sensor types.

Cell Organization

Figure 9:
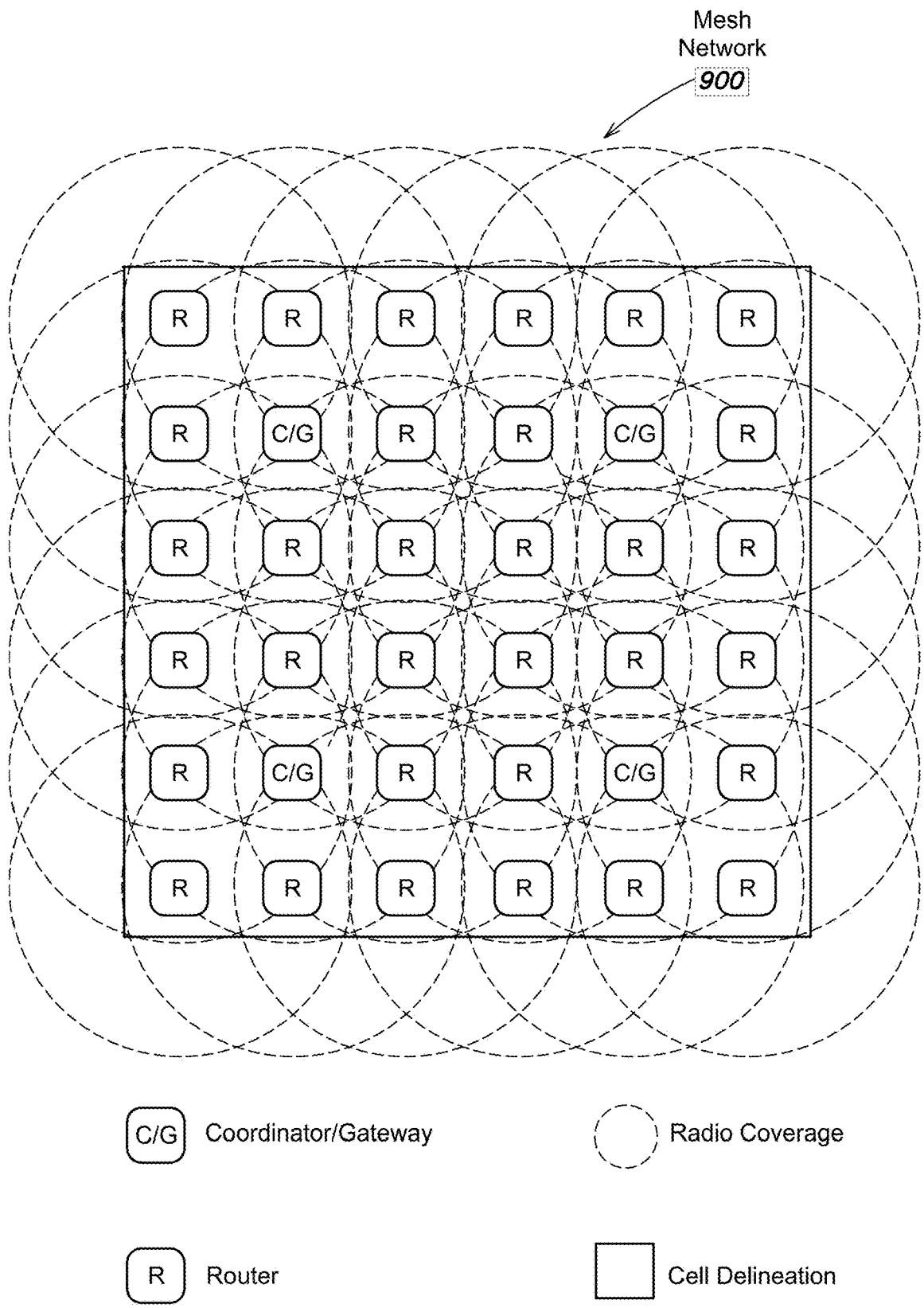
FIG. 9 shows an example mesh network configuration according to various aspects of the present invention.
Figure 10:
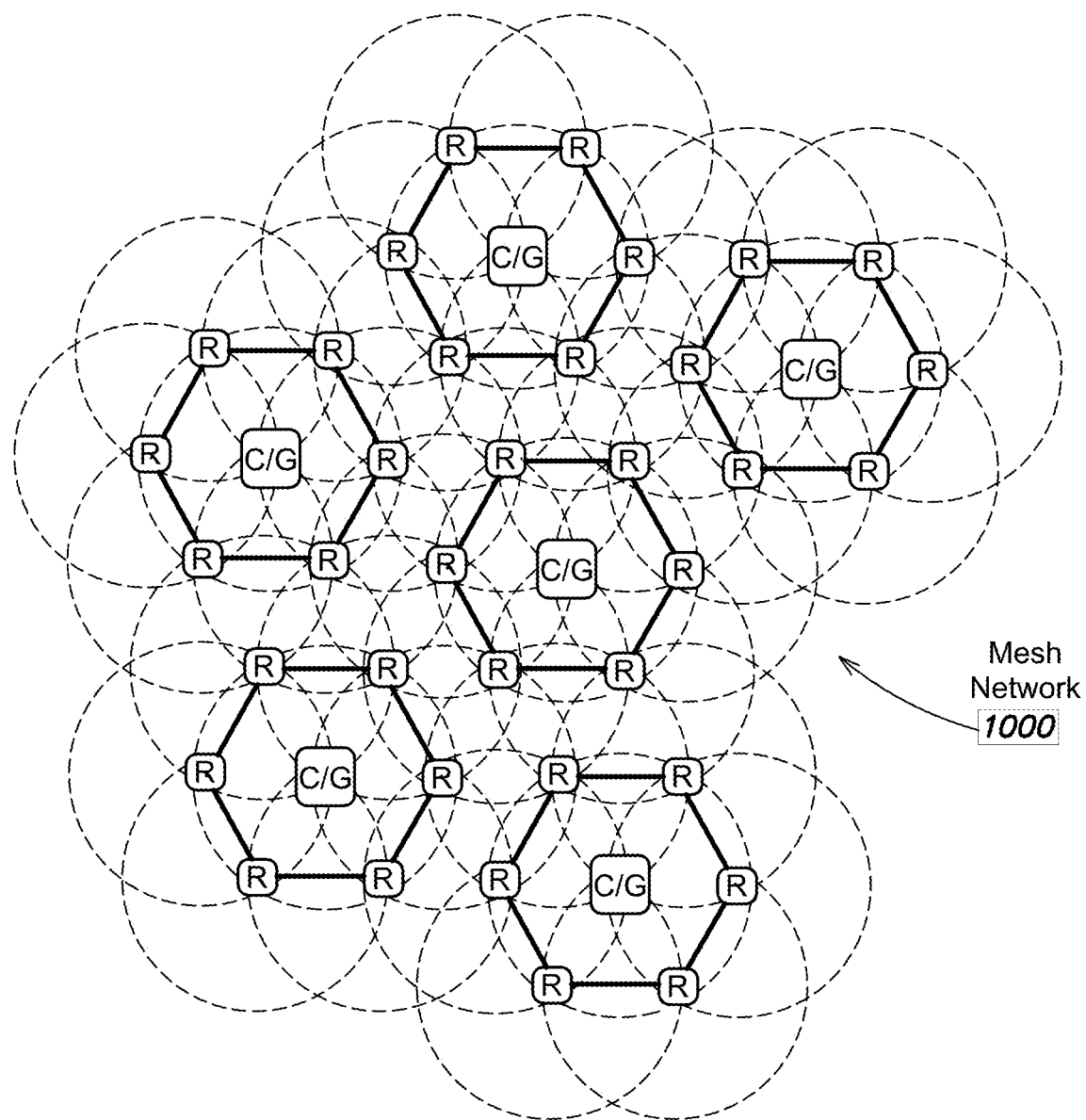
FIG. 10 shows another example mesh network configuration according to various aspects of the present invention.

FIGS. 9 and 10 show example implementations of possible matrixes of router nodes and coordinator/gateway devices in one or more mesh networks (e.g., mesh networks 900 and 1000). In particular, FIG. 9 shows a network organization of a mesh network 900 using four cells in a square-grid layout. This layout could cover, for example, over 2 million square feet using four (4) Gateways and thirty-two (32) Routers.

FIG. 10 shows a hexagonal arrangement of cells in a mesh network 1000. This arrangement covers area more efficiently than a square grid and requires one fewer channels to operate, however, this arrangement may be more difficult to deploy and provision.

SIM Power Consumption

Various aspects of the present invention relate to reducing power consumption within sensor devices (e.g., SIMs). During nominal operation, according to one implementation, the SIM may be required to have the receiver active during the Beacon Block, and to transmit during its designated timeslot in the SIM block. When receiving the Beacon block, the SIM can typically monitor at most nine (9) of the timeslots, corresponding to the closest node from the previous cycle and up to eight (8) of its neighbors. This represents 18 milliseconds out of a 10 second cycle, or a 0.18% duty cycle. Transmission in the SIM block is a short 4 ms packet once per 10 s cycle, or a 0.04% duty cycle.

When an event needs to be transmitted, the SIM can perform the following with the radio:

Listen for a routing message from the nearest router (8 ms)
Transmit the event (136 ms)
Listen for an ACKs (45 ms)

Therefore, each event adds 53 ms of RX time and 136 ms or TX time. If 100 events are expected over an 8-hour shift (most of these false events filtered by cloud), this results in an additional 0.02% RX duty cycle and 0.05% TX duty cycle. When the SIM moves within range of a router for the first time, the SIM listens to the corresponding packet in the router block, which is a rare occurrence in most example deployments.

Total radio duty cycle: RX: 0.20%, TX: 0.09%, Total: 0.29%

Those numbers represent if the device was active 24-hours a day. If the device is only used for a single 8-hour shift, then the total duty cycle is <0.1%.

To cut this further, it may not be necessary for the SIM to listen to every Router block, especially if the accelerometer/gyro indicates that the device has not moved significantly. Such implementations may permit sensors to remain in the field for longer periods, and to extend the time periods between recharges.

Event Analysis

Once an event has been recorded, according to one embodiment, it is analyzed to determine whether the event represents a real fall or other type of event. In one implementation, a basic version of this analysis is performed within the sensor, in order to reduce network bandwidth utilized sending false events.

The analysis of an event may include one or more of the following components:

Freefall duration: In a simple freefall, the duration in freefall can be used to compute the height of the fall using:

$$h = \frac{1}{2}at^2$$

where h is the fall height in meters, t is the duration of freefall in seconds, and a is the acceleration of gravity (9.8 m/s^2)

Jump Detection: it is appreciated that the above equation used to determine freefall duration may not provide accurate results in the case of a jump, where the user accelerated upwards at the start of the freefall duration. To account for this, the pre-trigger accelerometer data is examined for a jump. This can be represented as an upward acceleration immediately prior to the freefall. Through discrete integration the upward velocity can be approximated, and used in the modified equation:

where h is the fall height in meters, v0 is the initial upwards velocity, t is the duration of freefall in seconds, and a is the acceleration of gravity (9.8 m/s^2)

Motion Integration: Optionally, if sufficient angular velocity data from the gyro is available, all of the acceleration samples can be placed in a reference frame relative to the ground, thus allowing the vertical displacement during the fall to be computed as the second integral of acceleration.

Altimeter Analysis: The altimeter data can be correlated with the fall height computed above to provide a more accurate estimate of fall height and higher confidence in the legitimacy of the event.

Impact Detection: the acceleration at the end of freefall can be examined to determine whether the subject experienced a hard or soft landing. This can be used to help determine whether the fall was intentional (such as hopping down from the bed of a truck) or unintentional. The severity of the landing can be recorded with the event in the cloud database, and events with severity below some threshold will be hidden from reports by default (e.g., to lessen the number of false reports).

Rotation Analysis: The gyro data may be examined for angular velocity during freefall. This is used to discriminate the type of fall. For example, a forward rotation indicates the user probably tripped over an obstacle, while a backwards rotation may indicate the user slipped and lost their footing.

Post-fall Analysis: The accelerometer and gyro data may be examined in the period immediately post-landing to determine whether the subject continued walking normally or stayed on the ground for some time, and if the subject stayed on the ground, a determination may be made whether the subject rolled around or lay still. These conditions is indicated on the event report.

Proximity Sensor Analysis: The data from the proximity sensor may be examined to determine whether the sensor was being worn before, during, and after the fall.

According to one embodiment, the system may be capable of detecting and reporting false events. In one implementation, there are two types of false events that the system is capable of identifying:

Probable Sensor Throw—These events occur when a user throws a sensor up in the air, either catching it or letting it fall. In one embodiment, these events are characterized by a high acceleration immediately prior to the period of freefall. This acceleration is greater than if the user jumps or falls during a genuine event, and can be used to discriminate this event type from other event types. The system compares the average magnitude of the acceleration vector during a period (for instance, 0.4 seconds) immediately before freefall, and if this acceleration exceeds a pre-set threshold (2.4 g) the event is marked as a probable sensor throw.

Probable Sensor Drop—These events occur, for example, when the user drops their sensor, or the sensor is knocked off their belt and falls to the ground. These events are characterized by a high rate of rotation upon impact, followed by a period of no rotation as the unit sits at rest on the ground. In one implementation, the algorithm is only applied to falls that have a measured height of less than a predetermined height (e.g., 2 meters). The system may be configured to identify the peak angular velocity during the period starting when the device is in freefall through a predetermined time (e.g., 1 second) after the end of freefall. If the peak angular velocity exceeds a set threshold (e.g., 800 degrees per second) then the system checks for inactivity by calculating the RMS angular velocity during a period after impact. If the RMS angular velocity is below a set threshold (e.g., 5 degrees per second) then the device is assumed to be at rest, and the event is marked as a probable sensor drop. Input from the proximity or clip sensor may be used to increase the confidence of this filter function.

Location Determination

According to one implementation, the system is able to determine the approximate location of each sensor by comparing the signal strength between the sensor and each node in the mesh network (e.g., via measurement of RSSI), and interpolating the position between the nodes. In one example implementation, the sensor records the received signal strength of each Beacon packet and returns this information in its status packet. The Gateway and Relay nodes also record the received signal strength from each sensor, and send this information along to a management system (e.g., an application program executing on one or more server systems in a cloud-based environment (referred to herein as the "Cloud server"). In one example, the Cloud server can combine the signal strengths for a more accurate estimate of the distance between the sensor and each node.

It should be noted that buildings can be complex environments for tracking location in this way, as structures can both block and reflect radio waves. Several strategies can be used to improve location accuracy:

Filtering: Because people generally move at a walking pace on a job site, and tend to move in regular paths, a significant amount of filtering can be done on the location data to prevent the reported position from jumping around.

Pedometer: The pedometer function of the accelerometer can be utilized to estimate the distance a user has walked in a given period of time, further improving the filtering that can be performed.

Calibration map: For fixed installations, part of the deployment can be mapping signal strengths across the job site, which can then be used to provide much more accurate location measurements. For instance, in one application, a signal from the altimeter is used as an input to determine which floor a user or piece of equipment is on, and then responsive to the floor determination, a calibration map may be selected that is linked to the particular floor. Calibration maps may be determined when the system is first installed, and may associate actual logical locations (e.g., via a map or other locational construct) with a pattern of RSSI values from multiple mesh nodes.

Fraud Prevention

Fake Event Generation

In some cases, a user may try to simulate a slip or fall in order to fake an injury. In most cases, this will require taking the sensor off the body. The proximity sensor or clip-based switch in the device will detect that the sensor is not being worn, and any events that occur while not worn is disregarded. Further, in one example implementation, the proximity sensor has the ability to discriminate between an animate object (such as a human body) and most inanimate materials, such as wood and stone. In this way, for example if a user takes off his sensor and attaches it to a sack of concrete and then pushes it off the back of the truck, the system will know that this was not a real fall. Further, the system will contain a record of the attempted fraud, so that appropriate action may be taken.

Location Tracking

In some cases, a user may want to bypass the location tracking of the sensor by taking it off. If the user takes off the sensor and leaves it somewhere, according to one embodiment, the system detect it is not being worn (via, for example, the proximity sensor and/or clip switch) and that it is not moving (via the accelerometer) and the sensor may alert the supervisor or other system. If a user tries to bypass the system by having another user wear his sensor (in addition to that user's own sensor), this situation may be more difficult to detect. Within the Cloud server, the system may be adapted to run correlations on the position and motion of the sensors to detect if a single individual is wearing more than one sensor. In this case, an alert can be generated and sent to the supervisor.

User Identification

According to yet another implementation, gateway nodes can be outfitted with an RFID scanner capable of scanning both the sensors as well as standard RFID access cards or tokens. In a deployment where sensors are to be kept on site, on arrival the user will first scan his badge, then take a sensor and scan the sensor as well. This capability allows the system to associate that sensor with a particular user or piece of equipment. When leaving the site, the user just scans his badge, and deposits the sensor in a receptacle. The system may then automatically disassociate the user from the sensor.

Note that access cards may be replaced with keychain fobs or stickers placed on hardhats or other gear, with the rest of the operation staying the same. In scenarios where the user keeps the same sensor day-to-day, they do not need to badge-in at all. Instead, the system may be adapted to automatically register the user when a user has come within range of the mesh network and mark them as having arrived on site. When the sensor leaves range of the mesh network for a specified duration, the user is marked as having left the site.

The above situation may work optimally when the site is fully covered by the mesh network. In cases where the site has "blind spots" not covered by the network, it may be necessary for users to badge in and out. In this case, the users can scan their badges, and not their sensors.

Dynamic Sensor Provisioning

To function within the mesh network at a specific site, the sensor requires configuration information regarding the site, such as site identification, radio channels being utilized, network topology, etc. This information is collectively called the "site configuration." In one specific implementation, the system contains a mechanism for automatically associating sensors with the network such that a new sensor from the factory can be utilized at any job site with no manual configuration.

To achieve this, all gateway nodes periodically transmit on a fixed frequency, known as the "admin channel". These transmissions are performed at a reduced signal strength, so that only nearby sensors can receive it and so that the signals do not interfere with other gateway nodes in the network. These admin transmissions contain the site configuration required for a sensor to find the mesh network. Further, packets targeting a specific sensor may be sent on the admin channel, containing sensor-specific configuration such as protocol timeslot assignments. This may be done following a scan of the sensor's RFID tag or automatically upon detection of a new sensor.

Sensor Device

Figure 11A:
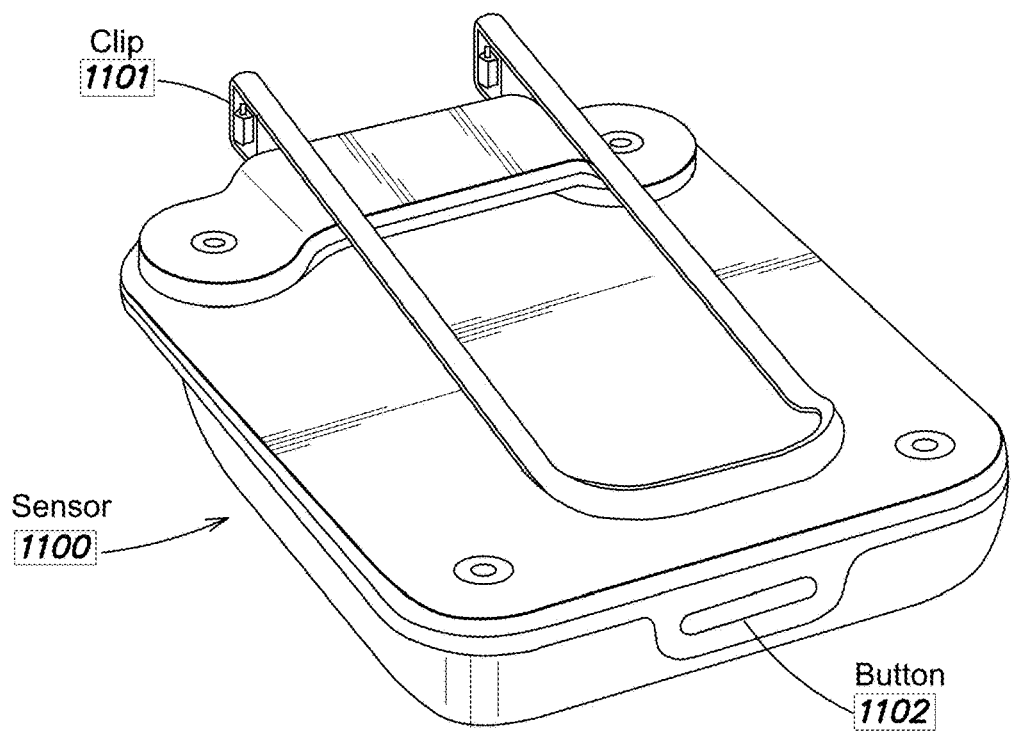
FIGS. 11A-11B show several views of a sensor device according to various aspects of the present invention.
Figure 11B:
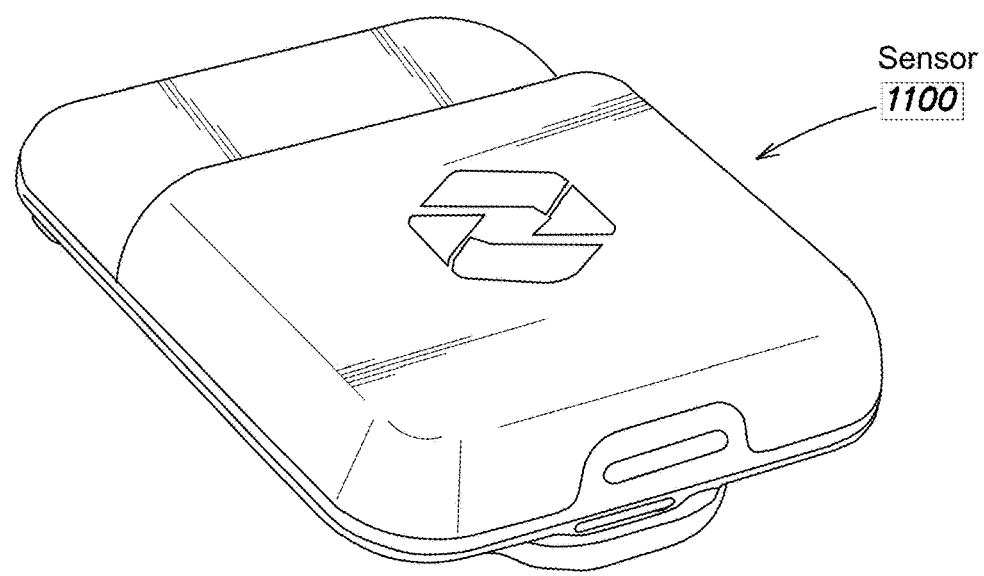
Figure 12C:
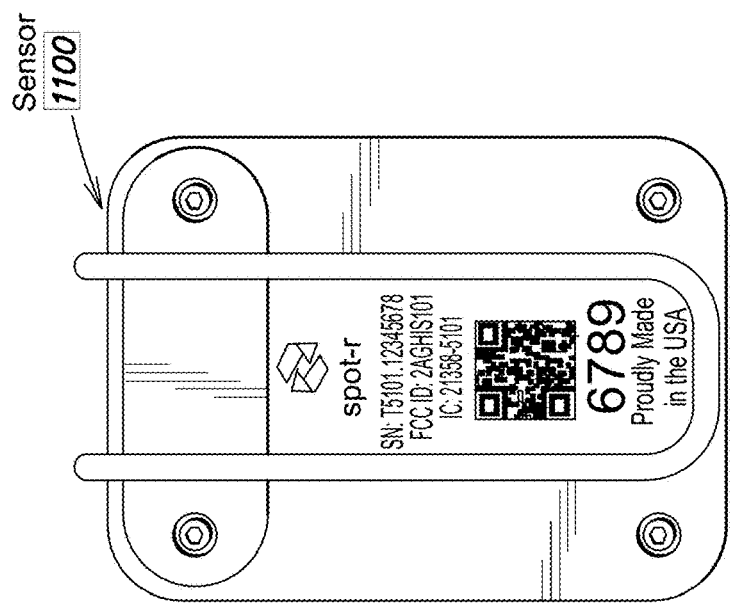
FIGS. 12A-12C show additional views of a sensor device according to various aspects of the present invention.
Figure 12B:
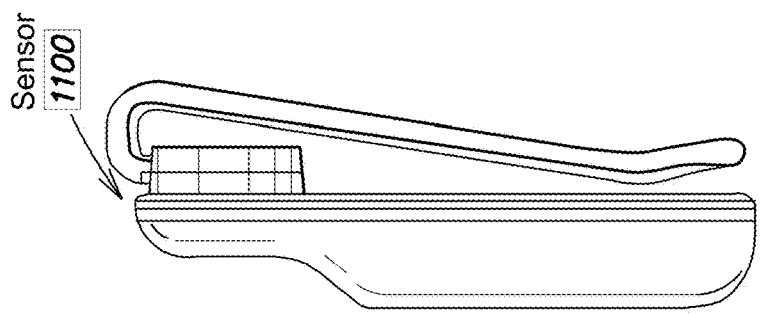
Figure 12A:
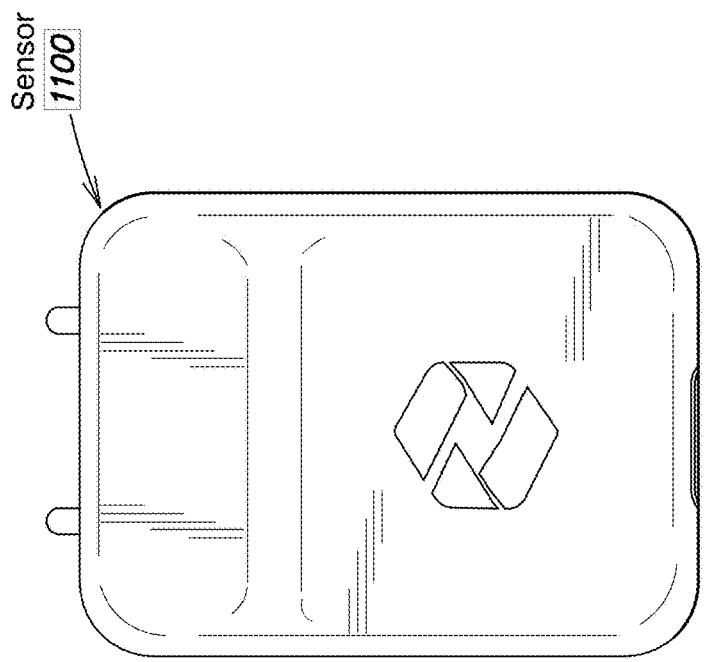

According to one embodiment, as discussed above, the sensor device that worn the beltline by a particular subject. To this end, the sensor system may have one or more attachments that are used to affix sensor to the monitored subject. FIGS. 11A and 11B show varies embodiments of a sensor 1100 that may be used to monitor a particular subject. Sensor 1100 include, for example, a clip 1101 that attaches sensor 1100 to the user. Clip 1101 may include an internal mechanism that, when clipped to the user, a switch is activated. The switch may be used alone or in conjunction with other sensors (e.g., a proximity sensor) to determine whether the sensor is coupled to the user. Further, as discussed above, the sensor 1100 may also include a button 1102 that is used by the user to initiate manual alerts. The sensor may be responsive to one or more different patterns of button presses to indicate different types of alerts. Also, FIGS. 12A-12C show different perspective views of an example sensor 1100 that may be used by the system in accordance with various embodiments.

Cloud Server System

As described above, a gateway node may be configured to send all events, statuses and scan operations to the Cloud server by utilizing web services. The Cloud server may include logic that decodes the events, status and scan operations and store the appropriate decoded information, along with the source into its database for further processing and for display to the user via one or more user interfaces (e.g., a Cloud Dashboard). The Cloud server system may be accessible by one or more user types through one or more networks. The Cloud server may also include one or more management interfaces (e.g., as shown by way of example in FIGS. 13-24 discussed below) through which the system may be configured, alerted and monitored.

Resource Management

The Cloud server and its associated management interfaces may allow for various users to set resource budgeting information, such as how many hours on site a particular role (e.g. framer, plumber) will be on site and on what days. This information can also be loaded via an API for integration with existing resource management software. Either via scan operations or a sensor device coming into and out of the mesh network the cloud will know the time a worker is on site. It can present this information on its own for planning purposes (via direct detailed records, or via charts), or it can compare this to the resource budgeting to identify whether the appropriate amount of hours are being used against budget.

Location Management

The Cloud server can indicate the location of workers and equipment on the job site, by overlaying pins or dots over a graphic representation of the site such as a blueprint. Dot locations may be determined by interpolation of RSSI values, altitude, pressure, and/or other measurement data. In one example implementation, the pins can be animated, though with refreshes of statuses, the pin associated with a particular user or piece of equipment may not necessarily move with every step, but a management user (e.g., a supervisor) can be shown the current position of all workers and equipment. In one embodiment, the sensor may have a more real-time view of the person's location for the purpose of event reporting. In the case of an emergency or event condition, the user's location may be reported and/or determined at a higher resolution.

Event Notification

The Cloud server may be adapted to show (e.g., within a management interface) a running list of recent events, as well as allow a user to drill into workers or sites and see events that have occurred. Real-time notifications can be presented when an event occurs. This can be shown on the dashboard, but can also be sent via email or SMS to users such as foremen or site managers.

Status Digest Emails

The Cloud server may be configured to send emails containing consolidating information for a job on a scheduled basis (e.g., every morning, every Monday, etc.). These emails can include events that have occurred since the previous email, numbers and hours of workers, etc. In one implementation, the content of status digest emails can be formatted by a user.

Example Management Interfaces

As discussed, a Cloud server may be capable of performing one or more management functions with the sensor-based system. Such management functions may include monitoring sensor devices and locations, viewing events, performing analysis of events, allocating sensors to individuals and pieces of equipment, monitoring employee performance, and monitoring equipment usage, among other functions. To this end, the Cloud server may include one or more management interfaces to facilitate these functions.

Figure 13:
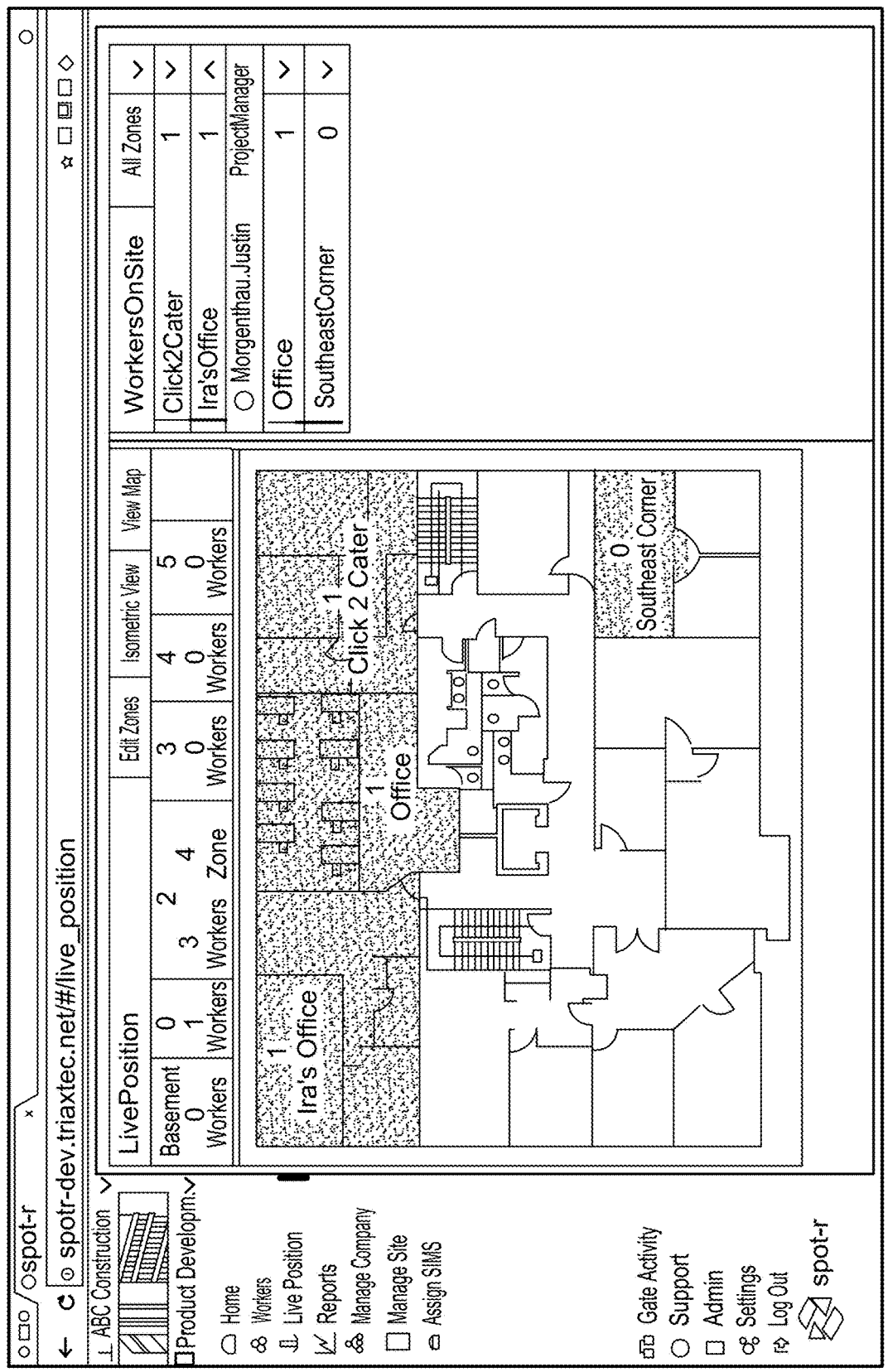

For example, FIG. 13 shows a map layout of a particular workplace within a management interface presented to the user (e.g., an administrator). The interface may have the capability of mapping the live position of the worker or piece of equipment within certain designated areas of the workplace. An administrator may be capable of configuring zones and monitoring workers within those zones.

Figure 14:
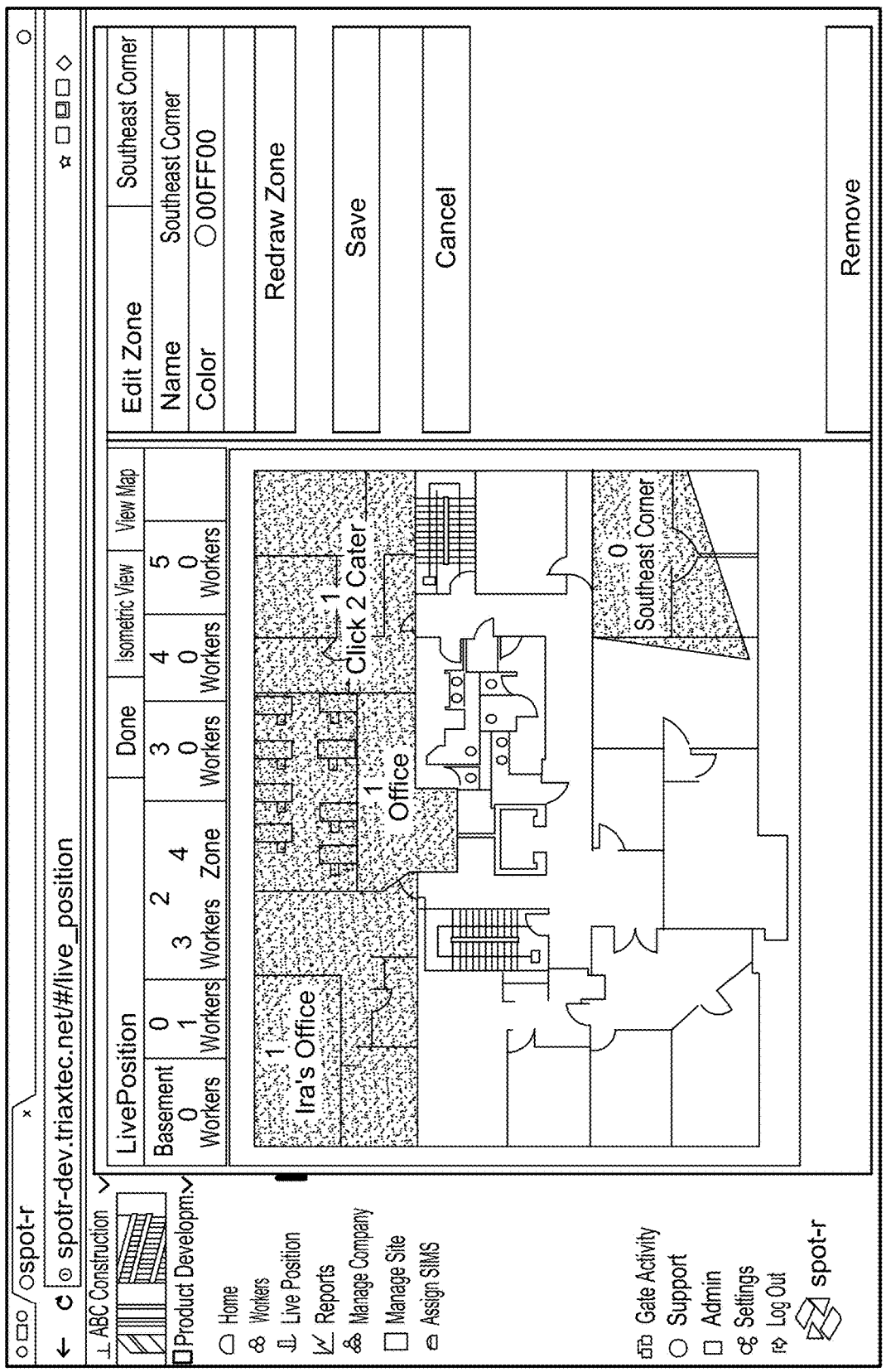

FIG. 14 shows an example interface that permits an administrator to define zones on a map showing the architectural view of a particular floor within the workplace. The system may include a control that allows the administrator to define the zones through a drag and drop interface. In the example shown, the user is permitted to resize the zone associated with the architectural view.

Figure 15:
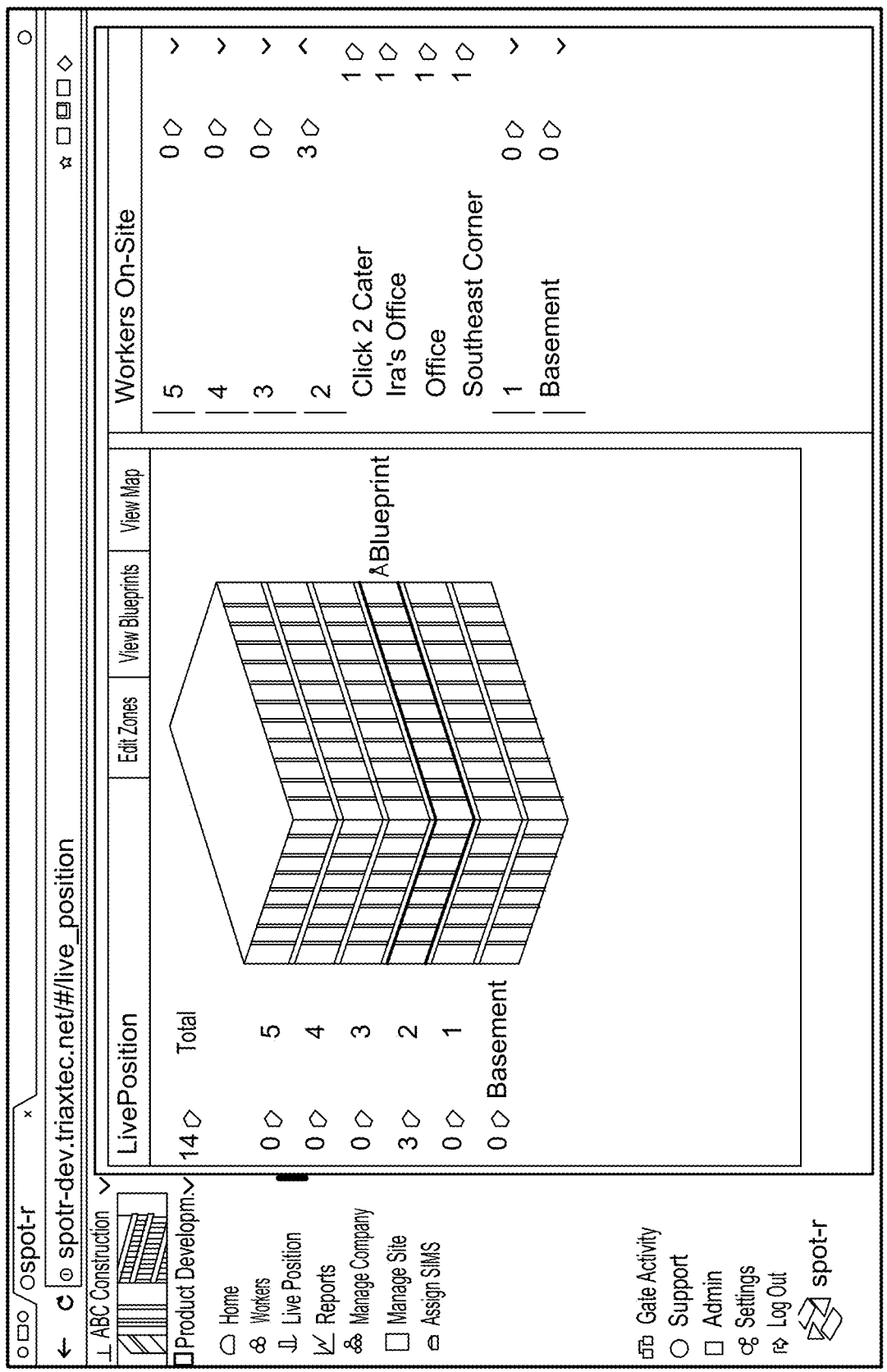

FIG. 15 shows an example interface that permits an administrator to view a 3D viewpoint of a particular workplace (e.g., via an isometric view interface). In this interface, the system may show the workers' and equipment's live positions within the workplace. This determination may be assisted by an altitude calculation as discussed above with respect to mesh network devices. Thus, there may be a capability of detecting certain workers and pieces of equipment on particular floors in real-time.

Figure 16:
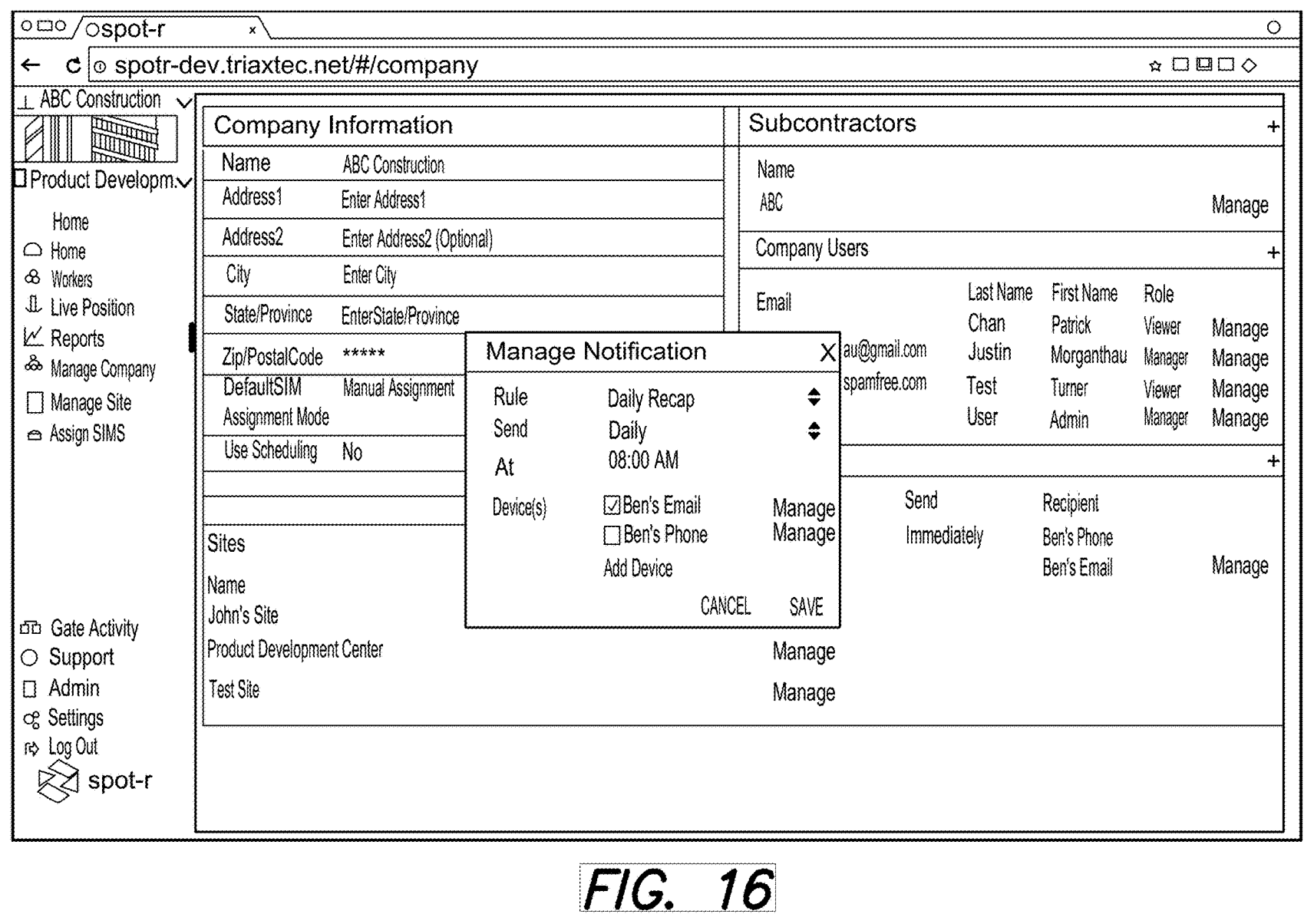

FIG. 16 shows an example interface that permits an administrator to manage notifications handled by the system. For instance, for a particular installation, the system may permit an administrator to configure alerts, determine the frequency and/or times alerts are generated, to whom they are sent, etc. Further, the system may be capable of defining rules that can have one or more parameters specified by a user, and these rules can be applied to one or more job sites, worker types, groups of workers, or individual workers.

Figure 17:
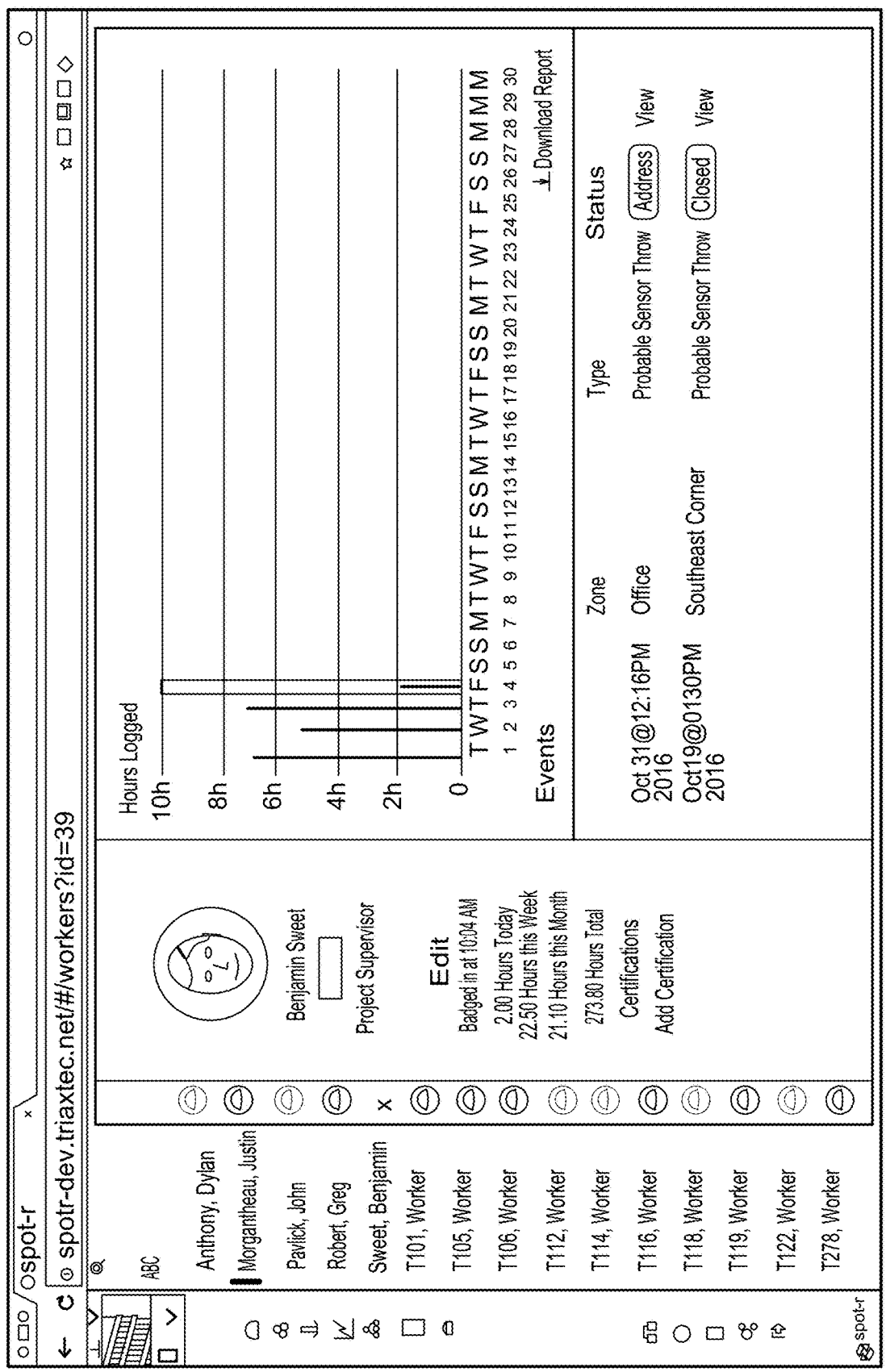

FIG. 17 shows an example interface that permits an administrator to view the onsite history of a particular worker. The interface may show specific performance information associated with the worker, such as hours worked over particular periods, events logged, types of events, among other performance information.

Figure 18:
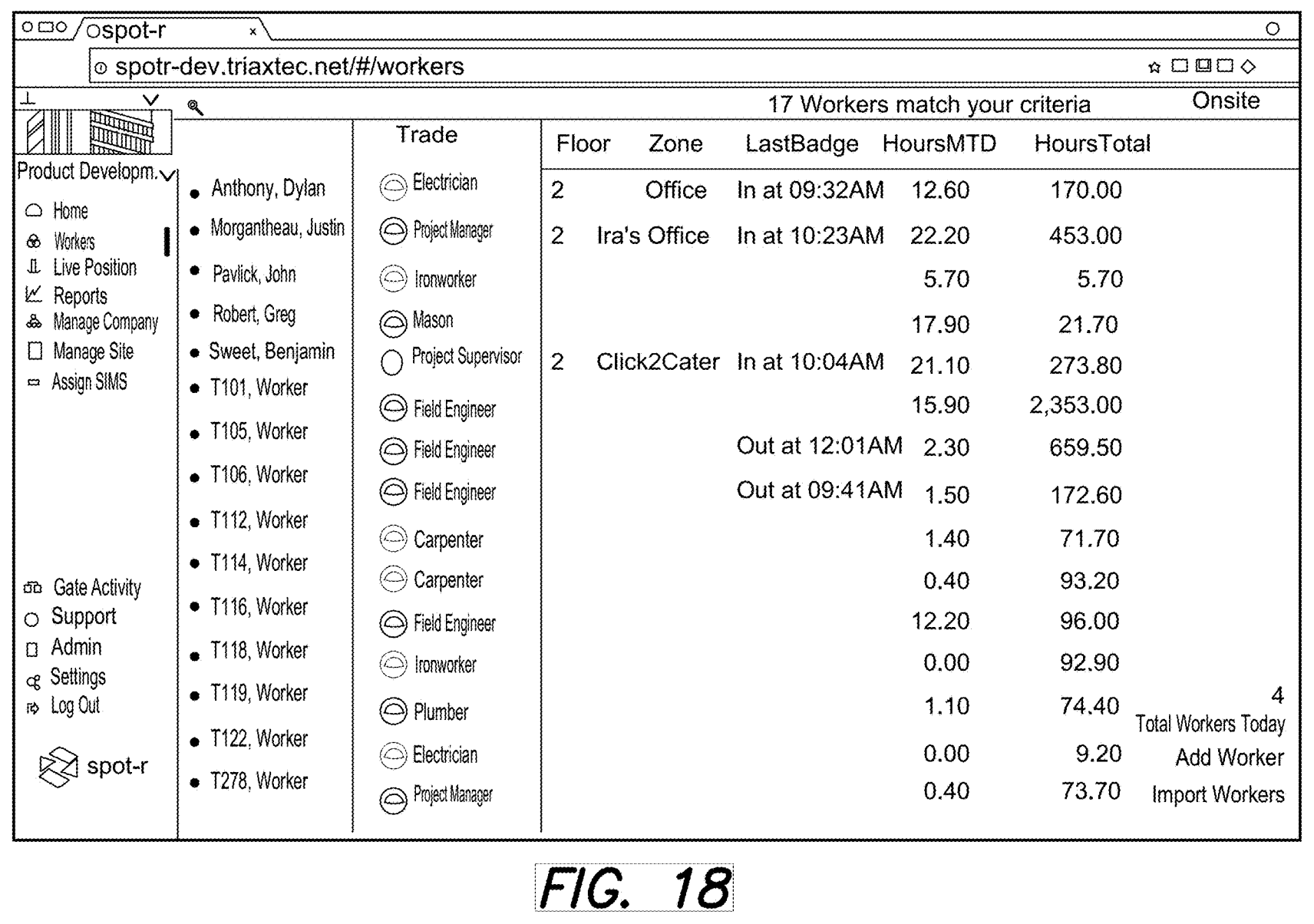

FIG. 18 shows an example interface that permits an administrator to view a list of workers (e.g., in a tabular form). From this list, individual workers may be selected, and the administrator may selectively view information relating to individual workers. In the tabular view, the user (administrator) may view a list of workers, along with their role (e.g., a trade, level, etc.), the floor where they are presently located, a zone (e.g., a logical association of an area which can be mapped to one or more physical locations), when the worker was last badged, and hours logged information (e.g., daily, monthly, or some other period).

Figure 19:
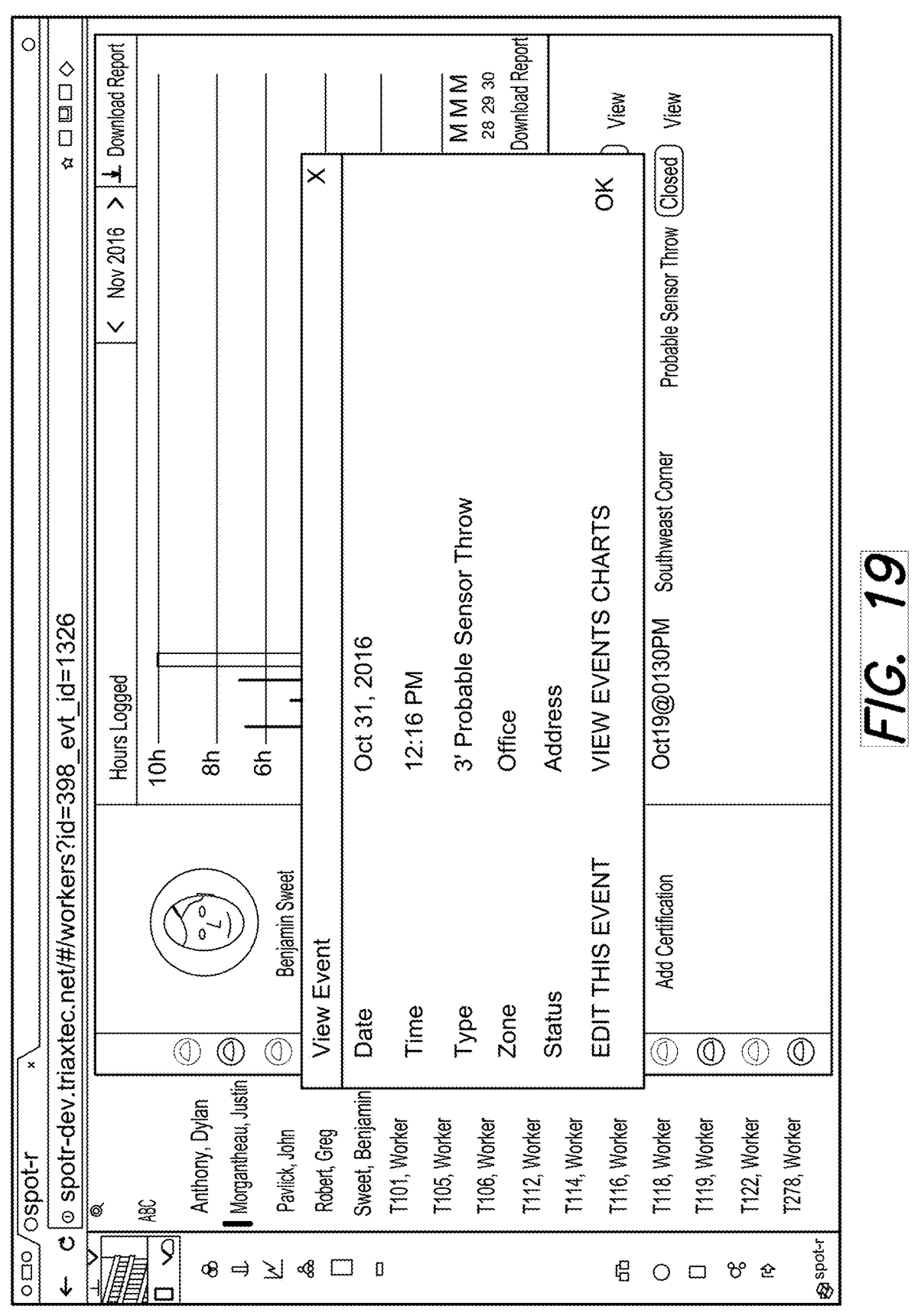

FIG. 19 shows an example interface that permits an administrator to view detailed event information associated with particular workers. For instance, from a worker view, the administrator may select a particular event, which causes a window to provide more detailed information, such as when the event occurred, the type of event (e.g., as determined by the sensor and/or system analysis), and any zone or other event information. The system may also track how supervisors address and deal with identified events.

Figure 20:
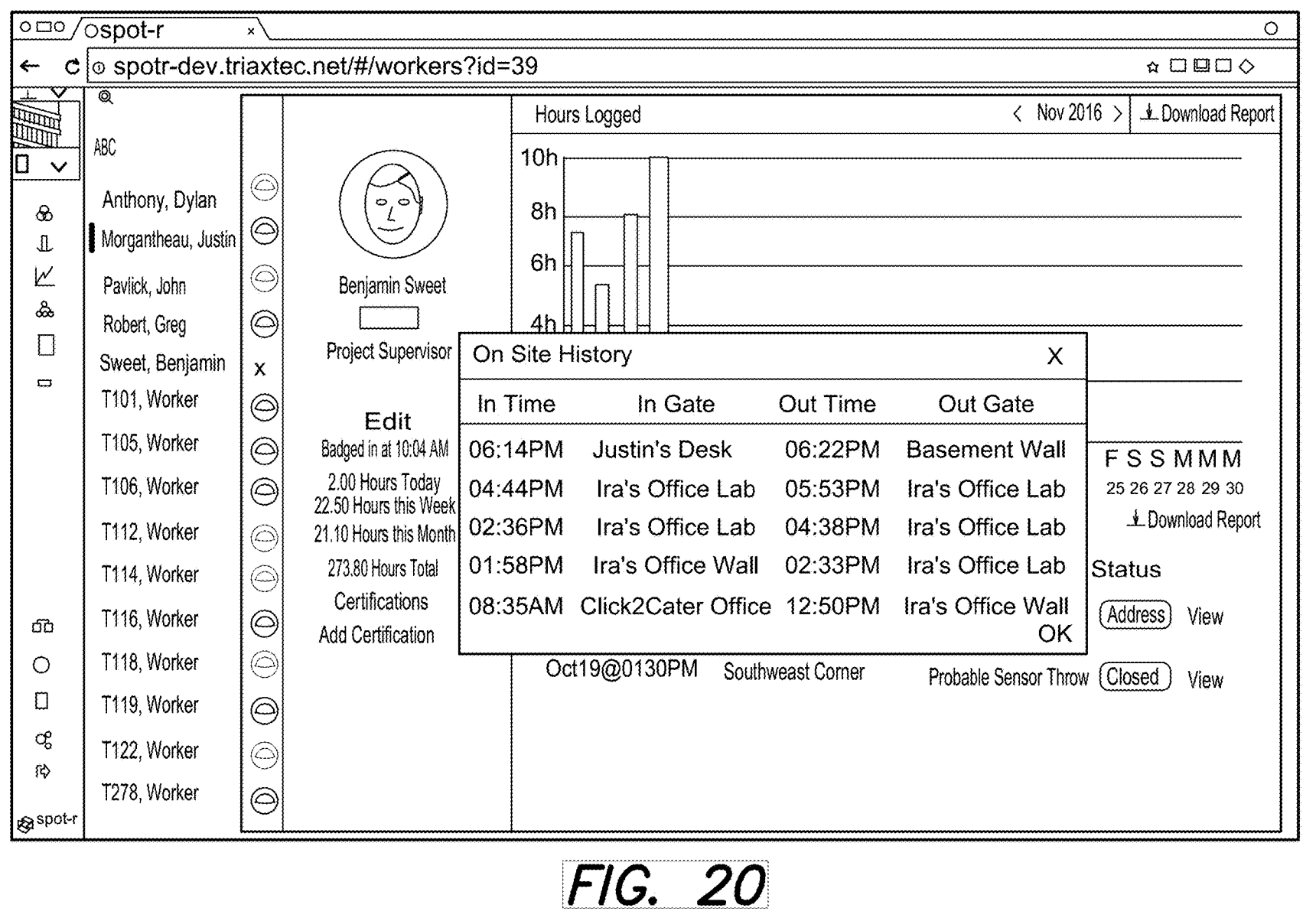

FIG. 20 shows an example interface that permits an administrator to view a history of particular workers during their times on the identified worksite. In particular, an administrator may be provided a listing of the worker's location, in-time, out-time, in-gates, out-gates, or other relevant information while onsite.

Figure 21:
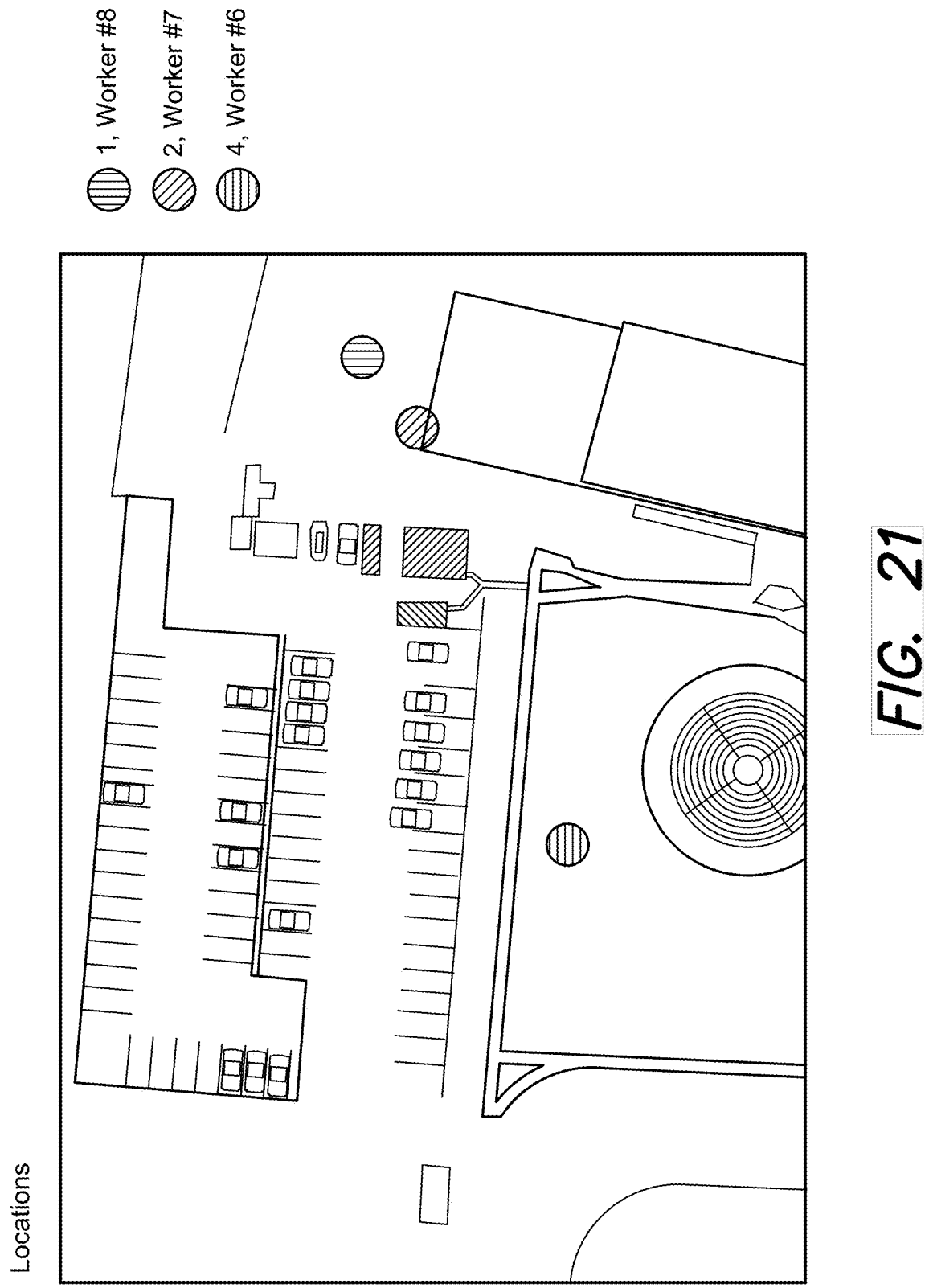

FIG. 21 shows an example interface that permits an administrator to view the actual location of the worker on a map. Similarly, the interface may permit the administrator to view the actual location of a piece of equipment on the map. The workers or equipment may be identified as pins superimposed on a logical and/or image map, allowing the administrator to quickly discern the worker's or piece of equipment's location.

Figure 22:
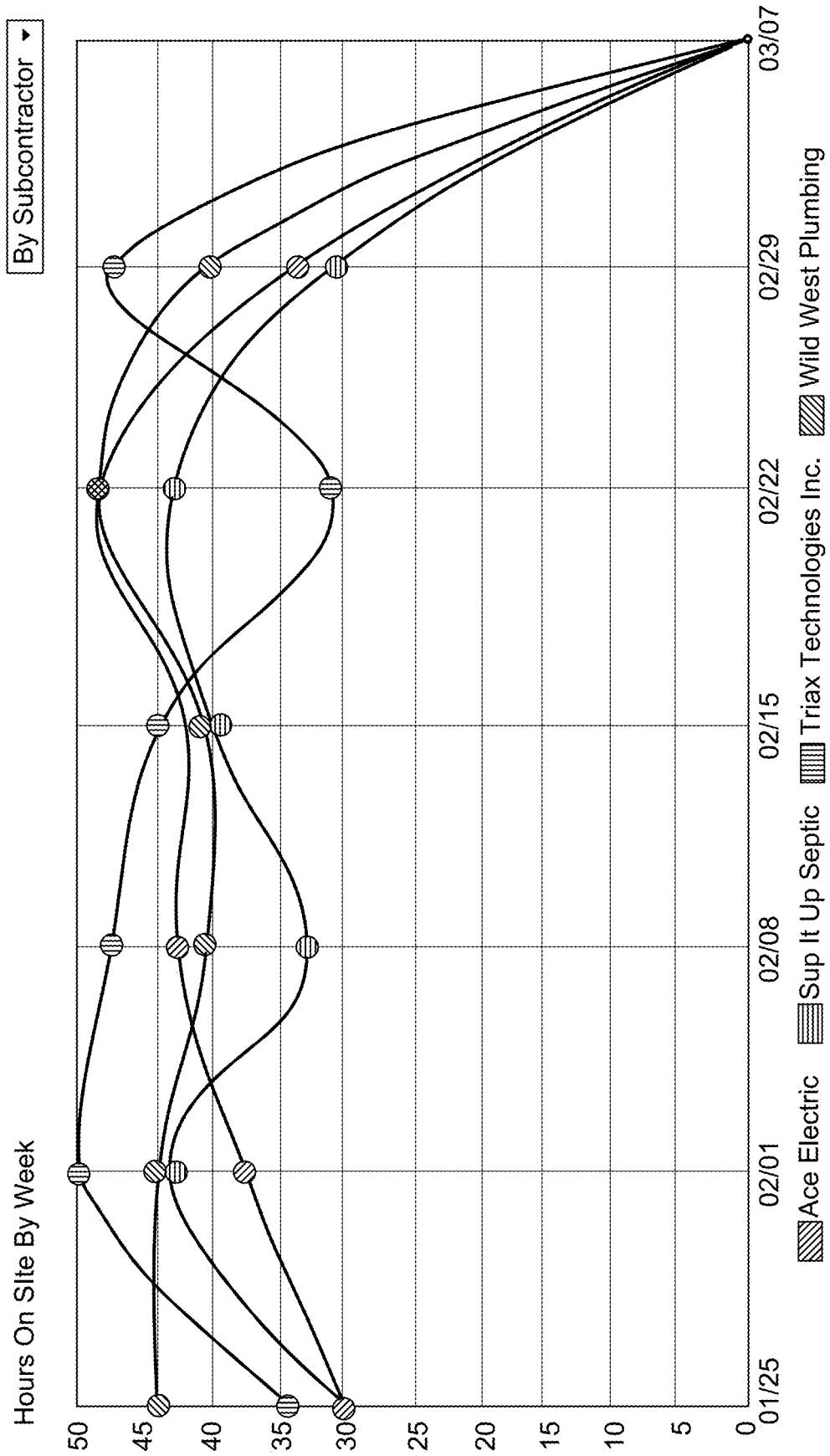

FIG. 22 shows an example interface that permits an administrator to view performance information relating to the presence (or absence) of particular workers or groups of workers on a particular jobsite. This information may aid in planning and/or monitoring workers either individually or as a group (e.g., particular subcontractors). Such capabilities may also be integrated with one or more other systems, such as project planning, accounting, cost recovery and/or other tools.

Figure 23:
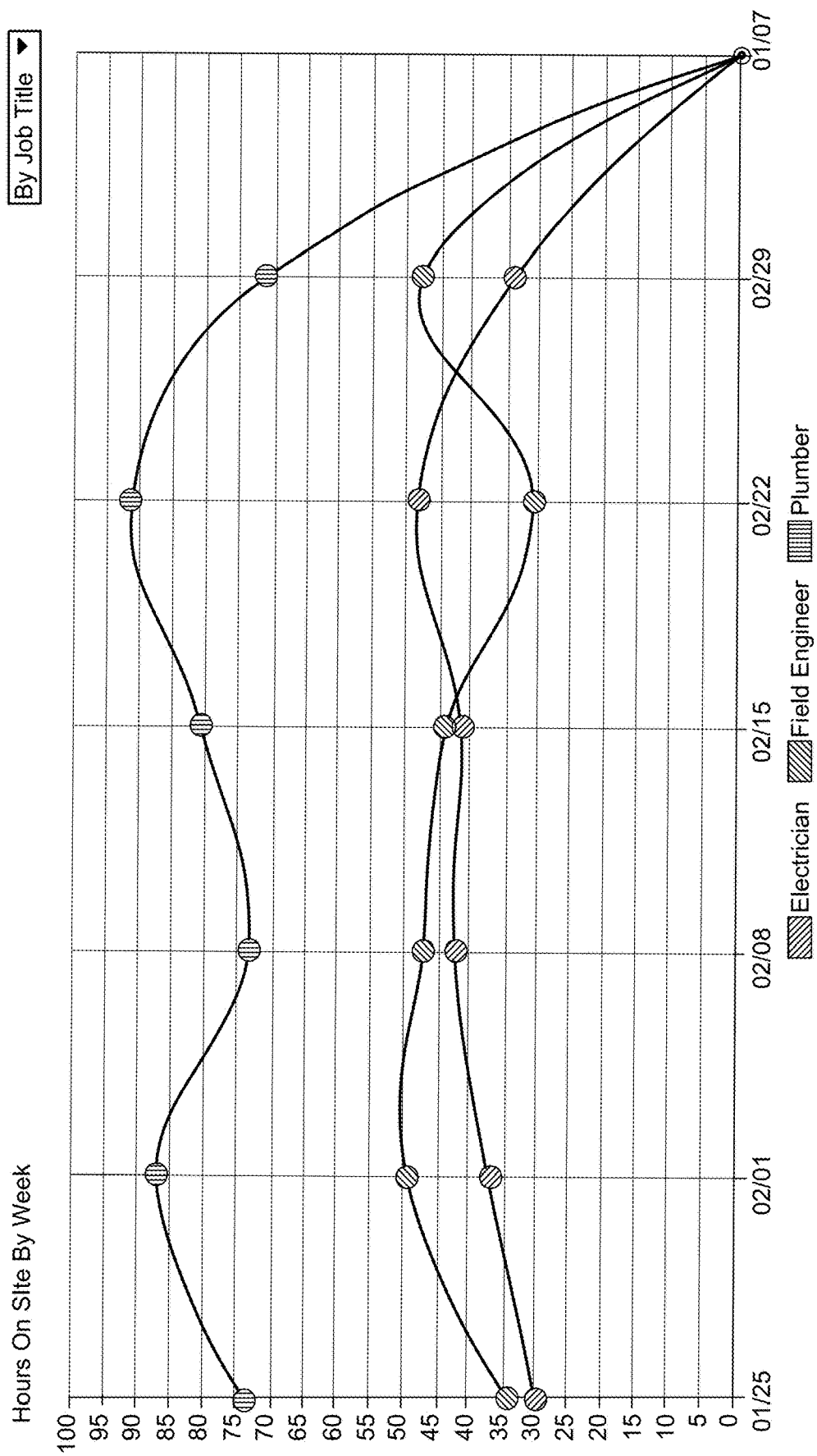

FIG. 23 shows an example interface that permits an administrator to view performance information relating to particular types of workers at a jobsite. Such a view may show quickly to an administrator and/or manager whether there are issues relating to insufficient oversight, inadequate coverage or integration between trades, budget issues, or other issues relating to particular allocations of jobs and roles.

FIG. 24 shows an example interface that permits an administrator to view, in a calendar view, what particular types of workers were present at a particular job site, job zone, or other identified work location. This capability may allow the administrator to identify resource allocation issues, and to more efficiently allocate resources.

It should be appreciated that the system may include other management features, and the invention is not limited to these features. Also, it should be appreciated that any of these features may be used alone or in conjunction with any other features described herein.

Equipment Sensors

Figure 25:
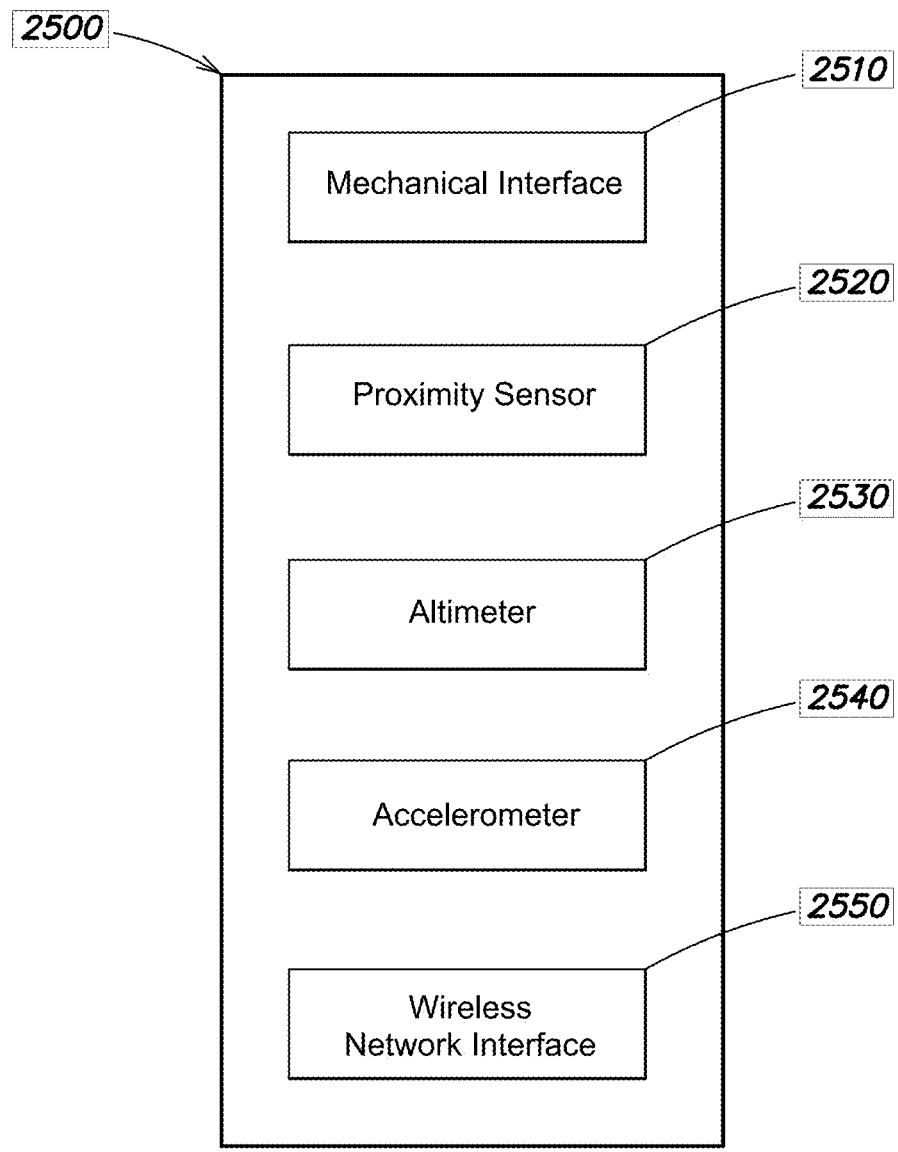
FIG. 25 shows an embodiment of an equipment sensor according to various embodiments of the present invention.
Figure 26:
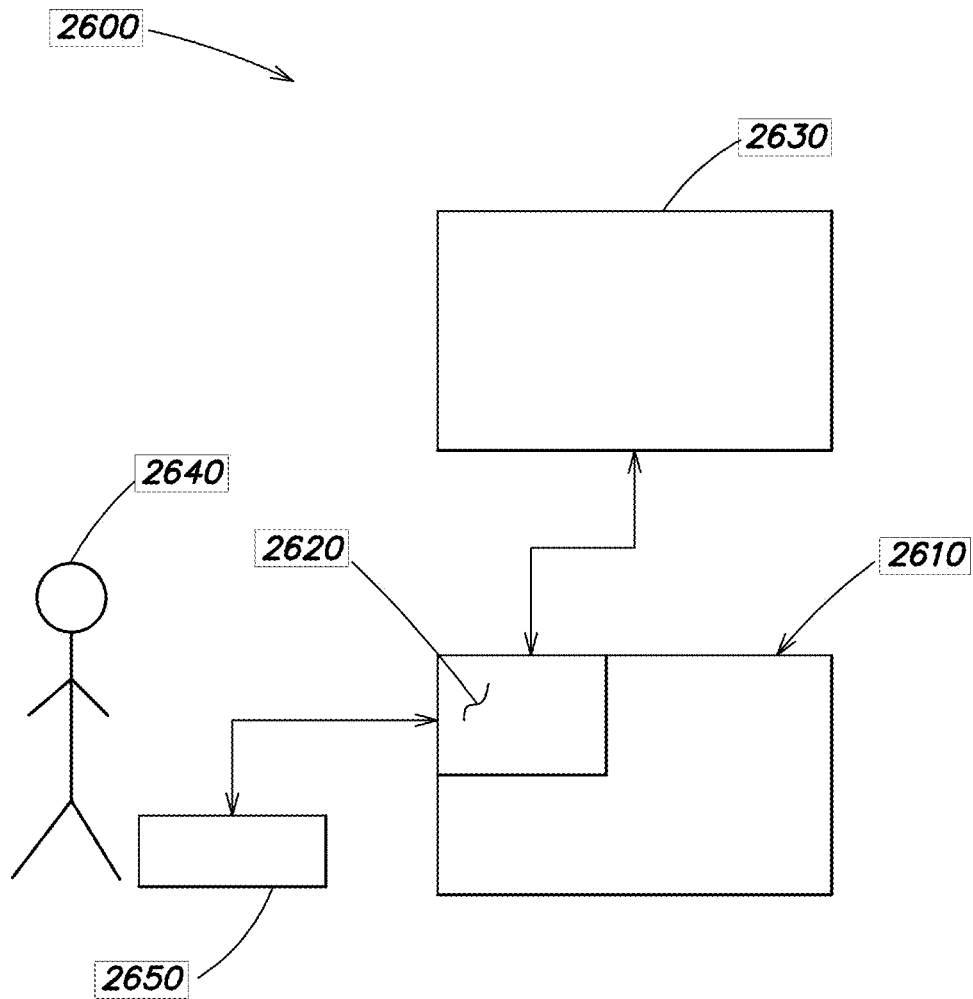
FIG. 26 shows an example system in which the equipment sensor may be used.

Another aspect of the present invention relates to equipment sensors. The equipment sensor may have one or more attachments that are used to affix the equipment sensor to an item of equipment. For example, the equipment sensor may have one or more attachments that are used to affix the equipment sensor to a forklift, a skidsteer, a scissor lift, or another item of equipment either larger or smaller. FIGS. 25-26 show various embodiments of an equipment sensor that may be used to monitor a particular piece of equipment. The equipment sensor may include, for example, a clip that attaches the equipment sensor to the piece of equipment. The clip may include an internal mechanism that, when clipped to the piece of equipment, a switch is activated. The switch may be used alone or in conjunction with other sensors (e.g., a proximity sensor) to determine whether the equipment sensor is coupled to the piece of equipment.

FIG. 25 shows an embodiment of an equipment sensor according to various embodiments of the present invention. In some embodiments, an equipment sensor 2500 may include one or more mechanical interfaces 2510, one or more proximity sensors 2520, one or more altimeters 2530, one or more accelerometers 2540, and one or more wireless network interfaces 2550.

The one or more mechanical interface 2510 may be configured to attach the equipment sensor 2500 to a piece of equipment. The mechanical interface 2510 may comprise at least one screw, at least one zip-tie, or double sided-tape, or any other suitable mechanical interface to attach the equipment sensor 2500 to the piece of equipment. The piece of equipment may have Velcro permanently affixed to the piece of equipment, and the mechanical interface 2510 may be designed to attach to the Velcro. The equipment sensor 2500 may include a physical holder or case, and the mechanical interface 2510 may be included in the physical holder or case.

The proximity sensor 2520 may be configured to detect a presence of an operator of the piece of equipment. In some embodiments, the proximity sensor 2520 may be configured to detect the presence of the operator when the operator is operating the piece of equipment. In some embodiments, the proximity sensor 2520 may be an infrared sensor or a capacitive proximity sensor, or any other suitable proximity sensor to detect the presence of the operator of the piece of equipment. When the proximity sensor 2520 detects the presence of an operator, the equipment sensor 2520 may determine if the operator is authorized to operate the piece of equipment. This may be useful as a supervisor may be alerted when an unauthorized operator, for example an operator with insufficient training to operate the piece of equipment, attempts to operate the piece of equipment. The equipment sensor 2500 may be capable of providing an alert when such an event occurs. The equipment sensor 2500 may include a speaker, sound module, transducer, or other type of sound generating component to generate audio alerts. For instance, in one embodiment, the sound generating component may be configured to generate sounds upon certain conditions (e.g. detection of an unauthorized operator). The equipment sensor 2500 may also include a mechanism for visually displaying an alert. For example, the equipment sensor 2500 may include an LED indicator to indicate that the operator is unauthorized to operate the piece of equipment.

The altimeter 2530 may be configured to detect an altitude of the piece of equipment. In some embodiments, the altimeter 2530 may be a barometric pressure sensor, or any other suitable pressure sensor to detect the altitude of the piece of equipment. The altimeter 2530 may determine the altitude of the piece of equipment by comparing the barometric pressure as measured by the equipment sensor 2500 with pressure measured by one or more nearby nodes of the external system. According to one implementation, the altitude of particular nodes in the external system is a known entity (e.g. they can be determined a priori during installation, or may be determined using a pressure detection element located within a node of the external system. These known These known heights may be used to determine what floor of a structure the piece of equipment is located using a table (or other data structure) including heights for each floor, the data being stored in a database accessible through a communication network. An absolute altitude may be determined by comparing the altimeter's pressure measurement to the values stored in the database. Once an altitude is determined, a floor of a particular structure may be determined based on a comparison with the pressure values of the known nodes of the external system. Once a floor is determined, possible regions/zones may be determined on that floor using relative signal strengths to nodes of the external system. By using both altitude an relative signal strengths, a more accurate location within the worksite of the piece of equipment may be determined.

The accelerometer 2540 may be configured to detect motion of the piece of equipment. In some embodiments, the accelerometer 2540 may be a 3-axis accelerometer, or any other suitable sensor to detect the motion of the piece of equipment. The detected motion of the piece of equipment may indicate whether the piece of equipment is in use. This may be useful in monitoring how long a specific piece of equipment is use, and thus determine its fuel consumption or determine when the specific piece of equipment is in need of routine maintenance.

The wireless network interface 2550 may be configured to communicate data to an external system, the data comprising at least one of a group of information including: the altitude of the piece of equipment, the presence of the operator of the piece of equipment, and the motion of the piece of equipment. To this end, the equipment sensor 2500 may include one or more antennas that permit the equipment sensor 2500 to communicate wirelessly to one or more nodes within the external system. The equipment sensor 2500 may also include a power source (e.g. a battery). The equipment sensor 2500 may be designed in order to minimize the amount of power drawn on the battery such that the equipment sensor 2500 need not be recharged as often.

The equipment sensor 2500 may be RFID capable and, to this end, may include an RFID transponder. When scanned, the RFID transponder may provide an identifier of the particular equipment sensor (e.g. equipment sensor 2500). The RFID transponder or tag may be an active tag, a passive tag, battery-assisted passive tag, or other implementation.

The RFID function may be implemented in conjunction with or separate from other functions of the equipment sensor 2500. In an alternative embodiment, RFID capability may be built in to one or more of the nodes of the external system, and a control on the node may be provided that permits the equipment sensor 2500 to be admitted to the network without a separate computer system. In such a case, the network node, after scanning the RFID of the equipment sensor, may send a message over an administration channel to admit the equipment sensor to the network.

FIG. 26 shows an example system in which the equipment sensor may be used. In some embodiments, a system 2600 may include a piece of equipment 2610, an equipment sensor 2620 attached to the piece of equipment 2610, an external system 2630, an operator 2640, and a wearable sensor 2650. In some embodiments, the external system 2630 may be a mesh network as described herein, and the wearable sensor 2650 may be a sensor device worn by the operator 2640 as described herein.

In some embodiments, the equipment sensor 2620 may communicate with the wearable sensor 2650 of the operator 2640. As discussed in connection with FIG. 25, the equipment sensor may include a proximity sensor configured to detect a presence of the operator. If the equipment sensor 2620 detects the presence of the operator 2640, the equipment sensor 2620 may attempt to communicate with the wearable sensor 2650 in order to detect and identify the wearable sensor 2650 and thus the operator 2640. In order to detect and identify the wearable sensor 2650, in some embodiments the equipment sensor 2620 may transmit a signal at a regular interval, but at a significantly reduced power level. This may cause nearby wearable devices to detect and report the equipment sensor 2620 if they receive its signal. In other embodiments, the equipment sensor 2620 may receive a signal from the wearable sensor 2650. In each embodiment, the equipment sensor 2620 may then determine which wearable sensor 2650, and thus which operator 2640, is at the controls of the piece of equipment 2610. This may be done by determining if a signal strength exceeds a threshold. This threshold may be set differently based on the type of equipment and the location of the equipment sensor on the piece of equipment relative to the operator position.

By communicating with the wearable sensor 2650, the equipment sensor 2620 may determine if the operator 2640 is authorized to operate the piece of equipment 2610. For each piece of equipment 2610 or for each class of equipment, there may be specific operators who are authorized to operate the piece of equipment. Authorization may be determined by whether the individual has completed certain training/certifications, work experience, trade/job description, subcontractor, team, or other criteria set by site management. In some embodiments, the equipment sensor 2620 may determine whether the operator 2640 is authorized to operate the piece of equipment 2610 at least by determining if the operator is wearing a wearable device, identifying the wearable device, and determining if the operator is authorized to operate the piece of equipment based at least on a signal received from the wearable device. In other embodiments, the equipment sensor 2620 may determine whether the operator 2640 is authorized to operate the piece of equipment 2610 at least by determining if the operator is wearing a wearable device, transmitting a first signal to the wearable device, and receiving a second signal indicating whether the operator 2640 is authorized to operate the piece of equipment 2610. The equipment sensor 2620 may also include an access control list of operators that are authorized to operate the piece of equipment 2610.

When an operator is determined to be unauthorized, the equipment sensor 2620 may perform various actions. The equipment sensor 2620 may send a notification to a supervisor. The notification may be an SMS message, an email, or a push notification, and may be sent to the supervisor's computer and/or mobile device(s). The equipment sensor 2620 may also play an audible alert or display a visual alert on the wearable device 2650 or the equipment sensor 2620. The equipment sensor 2620 may also be integrated with telematics and control systems of the piece of equipment 2610 and be configured to disable the piece of equipment 2610.

In other embodiments, the determination if the operator 2640 is authorized to operate the piece of equipment 2610 may be performed by the external system 2630. For example, the equipment sensor 2620 may determine the identity of the operator 2640, and send a signal to the external system 2630 indicating the identity of the operator 2640. The external system 2630 may then determine if the operator 2640 is authorized to operate the piece of equipment 2610. In such an embodiment, if it is determined that the operator 2640 is not authorized to operate the piece of equipment 2610, the external system 2630 may alert a supervisor of the worksite.

In some embodiments, the equipment sensor 2620 may communicate with the external system 2630 in order to determine a location of the piece of equipment 2610. The equipment sensor 2620 may determine the location of the piece of equipment 2610 at least by determining strengths of signals received from nodes of the external system 2630. In other embodiments, the location of the equipment sensor 2620 may be determined wherein the equipment sensor 2620 transmits a signal that may be received by at least one wearable device 2650. The equipment sensor 2650 may communicate with the external system 2630 to indicate the presence of the equipment sensor 2620, and thus the piece of equipment 2610. The relative location of the equipment sensor 2620 may be determined by the strength of the signal received by the wearable device 2650. Such an arrangement may improve battery performance for both the wearable device 2650 and the equipment sensor 2620.

In some embodiments, the equipment sensor 2620 may determine an activity level of the piece of equipment 2610. The equipment sensor 2620 may determine the activity level of the piece of equipment 2610 at least through motion measured by an accelerometer. Various levels of activity may be set by using filters and thresholds to measure specific types of activity. For example, a low-amplitude periodic acceleration within a particular frequency band may indicate idling of an engine of the piece of equipment 2610, while larger non-periodic acceleration may indicate driving or digging. The equipment sensor 2620 may also determine whether the piece of equipment 2610 is being operated by the operator 2640. The filter parameters and thresholds may be programmable, and may allow for activity detection to be optimized for a specific piece of equipment.

The equipment sensor 2620 may monitor the overall utilization of the piece of equipment 2610. This may be advantageous as it may allow for improved productivity and efficiency, for example by moving idle equipment to different sites and/or adjusting construction schedules in order to equalize the utilization of various pieces of equipment. This may be especially important to rental companies, who may reduce internal costs and pass savings to customers through even relatively small improvements in utilization.

The equipment sensor 2620 may also regulate scheduled maintenance. Maintenance of a piece of equipment 2610 may be correlated with the number of hours the piece of equipment 2610 is in use. Larger equipment typically have telematics devices that support this, but such devices are often expensive in both initial and ongoing costs. The equipment sensor 2620 may be less expensive, and may be smaller and thus better suited than typical telematics devices to be incorporated into smaller equipment.

The equipment sensor 2620 may also be able to monitor the fuel consumption and/or the carbon footprint of a piece of equipment 2610. Since the equipment sensor 2620 may be able to differ between different types of activity, such as an engine idling or active use, data from the equipment sensor 2620 may be able to accurately measure fuel usage as well as identify unnecessary time spent idling.

In addition to real-time alerts generated for unauthorized users, the equipment sensor 2620 may gather statistics and generate reports in order to provide the above information. The reports may be sent to a supervisor of the work site, and may be communicated through the external system 2630. Reports may be generated covering various time frames (e.g. daily, weekly, monthly, quarterly, etc.), and may be aggregated to various levels within an organization (by subcontractor/team, job site, geographic region, business unit, etc.). Statistics in the report may also be aggregated in various ways, such as by equipment type and whether the piece of equipment is owned or rented. The report may include at least a percent of utilization of the piece of equipment, a number of unauthorized usage events, a number of hours of unauthorized use, a number of hours of use in one or more geographical areas, a time spent in one or more operating modes, a number of hours of operation since a maintenance service, and an estimated fuel consumption and/or carbon output.

In some embodiments, the equipment sensor 2620 may also have the capability to be recharged without having to uninstall the equipment sensor 2620 from the piece of equipment 2610. While the equipment sensor 2620 may achieve many months of battery life, it may be advantageous to recharge the equipment sensor 2620 in-place, especially in cases when the equipment sensor 2620 is permanently mounted to the piece of equipment 2610. In some embodiments, the recharging may be accomplished with a standard connector (e.g., micro-USB) or with a proprietary clip-on adapter. The clip-on adapter may include spring-loaded contacts or a standard wireless charging technology (e.g., Qi). In such embodiments, the recharging may be performed from a USB battery pack, of the kind that may be used to recharge a phone or a tablet. By doing so, the equipment sensor 2620 may be recharged without being uninstalled from the piece of equipment 2610.

Herein, the equipment sensor 2620 has been described as comprising various sensors (e.g., an altimeter and an accelerometer) and as capable of performing various functions. In other embodiments, various functions of the equipment sensor 2620 may be performed by the external system 2630 (for example, determining if an operator 2640 is authorized to operate a piece of equipment 2610, determining a location of the piece of equipment 2610, determining if the piece of equipment 2610 is in use, monitoring fuel consumption of the piece of equipment 2610, and gathering statistics and generating reports relating to the piece of equipment 2610). The equipment sensor 2620 may transmit at least one signal to the external system 2630 indicating measurements from the various sensors. The external system 2630 may perform the various functions of the equipment sensor 2640 using the measurements from the various sensors of the equipment sensor 2640 as inputs.

Over-the-Air Programming Using Accelerometer-Based Unlock Sequence

Another aspect of the present invention relates to configuration and programming of sensor devices and more generally, electronic devices that include the ability to detect movement and/or orientation. In one implementation of the sensor-based system, there may be included wearable sensors which are sealed at the factory, which may be updated with new firmware/software either at a distribution facility or in the field. To facilitate this, a system may be provided that uses the device's accelerometer to unlock and enable programming mode, so that the device can receive a firmware or other type of programming update via radio communication via a communication network.

In its simplest form, a device which has not had application firmware installed will remain in a low-power sleep state, periodically waking up to measure the acceleration measured by the accelerometer sensor. When at rest, this acceleration measures 1.0 g from gravity, in a direction dependent on the orientation of the device. According to one embodiment, the sensor may use this information to identify if the sensor is placed in a particular orientation, and if that orientation is detected, the sensor starts searching for a signal from the programming device. The orientation may be detected, for example, responsive to a wake-up event, such as movement, an outside signal, or other activity. When such a signal is detected, the programming process is started from the programming device.

Because this process does not require any direct interaction with the device other than placing the sensor in a known orientation, this capability makes it ideal for programming a large number of devices that are packaged together, or programming a device while it remains within its packaging without having to take the device out of the packaging. For instance, according to one embodiment, an administrator can take a box of devices off the warehouse shelf, put the box in a fixture to hold it in the activation orientation, and program all the devices in the box without unsealing the packaging.

Further, it should be appreciated that other methods may be used that incorporate this feature in a variety of options, such as implementing a multi-step sequence for unlocking programming mode, requiring two (2) or more orientations. Further, the orientations may also require specific timing, which lessens the possibility that the devices can be accidentally placed in the programming mode (e.g., during shipping) and providing for additional security. However, it should be appreciated that various aspects may use the single-orientation system in combination with other orientations and/or programming modes.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An equipment sensor, comprising:
    a mechanical interface configured to attach the equipment sensor to a piece of equipment;
    a processor configured to detect whether an operator is authorized to operate the piece of equipment, wherein detecting whether the operator is authorized to operate the piece of equipment comprises:
    receiving, from a wearable sensor of the operator, a signal including an identifier for the wearable sensor;

retrieving, from a memory local to the equipment sensor, an access control list of operators that are authorized to operate the piece of equipment;

determining whether the identifier for the wearable sensor corresponds to an entry in the access control list; and based on determining that the identifier for the wearable sensor corresponds to an entry in the access control list, without additional authentication, authorizing the operator to operate the piece of equipment based on detecting a presence of the operator within a range of the piece of equipment, the presence of the operator being detected within the range of the piece of equipment based on the signal received from the wearable sensor of the operator exceeding a threshold, the threshold being set differently based on a type of the piece of equipment and a location of the equipment sensor on the piece of equipment relative to a position of the operator;

at least one altimeter adapted to detect an altitude of the piece of equipment;

at least one accelerometer adapted to detect motion of the piece of equipment; and a wireless network interface adapted to communicate data to an external system, the data comprising:
the altitude of the piece of equipment;
the presence of the operator of the piece of equipment; and
the motion of the piece of equipment.

2. The equipment sensor of claim 1, wherein the wireless network interface communicates with the external system to determine the location of the equipment sensor.

3. The equipment sensor of claim 2, wherein the location of the equipment sensor is determined at least by determining strengths of signals received from nodes in the external system.

4. The equipment sensor of claim 1, wherein the at least one accelerometer is a 3 axis accelerometer.

5. The equipment sensor of claim 1, wherein the equipment sensor is configured to determine an activity level of the piece of equipment, based at least on data from the at least one accelerometer.

6. The equipment sensor of claim 1, wherein the equipment sensor is configured to determine whether the piece of equipment is being operated, based at least on data from the at least one accelerometer.

7. The equipment sensor of claim 1, further comprising an infrared sensor configured to detect the presence of the operator within the range of the piece of equipment.

8. The equipment sensor of claim 1, wherein the equipment sensor is configured to alert a supervisor if the operator is not authorized to operate the piece of equipment.

9. The equipment sensor of claim 8, wherein the alert is an SMS message, an email, or a push notification, and the equipment sensor is configured to send the alert to the supervisor.

10. The equipment sensor of claim 8, wherein the alert is an audible alert.

11. The equipment sensor of claim 8, wherein the alert is a visual alert.

12. The equipment sensor of claim 5, wherein the equipment sensor tracks a number of hours that the piece of equipment is in operation, based at least on the activity level of the piece of equipment.

13. The equipment sensor of claim 12, wherein the equipment sensor notifies a supervisor that the piece of equipment is in need of maintenance, based at least on the number of hours that the piece of equipment is in operation.

14. The equipment sensor of claim 12, wherein the equipment sensor is configured to measure fuel consumption of the piece of equipment, based at least on the number of hours that the piece of equipment is in operation.

15. The equipment sensor of claim 1, wherein the equipment sensor is configured to generate a report, the report providing a status and history of the piece of equipment.

16. The equipment sensor of claim 15, wherein the report includes at least one statistic selected from the group comprising:
a percent of utilization for the piece of equipment;
a number of unauthorized usage events;
a number of hours of unauthorized use;
a number of hours of use in one or more geographical areas;
a time spent in one or more operating modes;
a number of hours of operation since a maintenance service; and
an estimated fuel consumption and/or carbon output.

17. The equipment sensor of claim 1, wherein the mechanical interface comprises screws, zip-ties, or double-sided tape.

18. The equipment sensor of claim 1, wherein the altimeter is a barometric pressure sensor.

19. The equipment sensor of claim 1, wherein the data communicated to the external system is the altitude of the piece of equipment.

20. The equipment sensor of claim 1, wherein the data communicated to the external system is the presence of the operator of the piece of equipment.

21. The equipment sensor of claim 1, wherein the data communicated to the external system is the motion of the piece of equipment.

22. The equipment sensor of claim 1, wherein detecting whether the operator is authorized to operate the piece of equipment further comprises:
determining if the operator is wearing the wearable sensor;
transmitting a first signal to the wearable sensor;
receiving a second signal indicating whether the operator is authorized to operate the piece of equipment.

23. The equipment sensor of claim 2, wherein the location of the equipment sensor is determined at least by transmitting a signal to nodes in the external system, wherein the external system determines the location of the equipment sensor at least by determining the strength of the signal.

24. The equipment sensor of claim 1, further comprising a recharging interface adapted to receive power and recharge the equipment sensor.

25. The equipment sensor of claim 24, wherein the recharging interface is adapted to receive power wirelessly.

26. The equipment sensor of claim 24, wherein the recharging interface is adapted to receive power over a wired connection.

27. The equipment sensor of claim 24, wherein the recharging interface allows the equipment sensor to be recharged while attached to the piece of equipment.

28. The equipment sensor of claim 1, wherein the equipment sensor is configured to detect the wearable sensor by transmitting a reduced power signal at a regular interval.

* * * * *